United States Patent
Lee et al.

(10) Patent No.: US 10,326,309 B2
(45) Date of Patent: Jun. 18, 2019

(54) WIRELESS POWER SYSTEM COMPRISING POWER TRANSMITTER AND POWER RECEIVER AND METHOD FOR RECEIVING AND TRANSMITTING POWER OF THE APPARATUSES

(75) Inventors: Kyung-Woo Lee, Seoul (KR);
Kang-Ho Byun, Gyeonggi-do (KR);
Young-Min Lee, Gyeonggi-do (KR);
Se-Ho Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 1187 days.

(21) Appl. No.: 13/470,756

(22) Filed: May 14, 2012

(65) Prior Publication Data

US 2012/0306284 A1   Dec. 6, 2012

Related U.S. Application Data

(60) Provisional application No. 61/485,925, filed on May 13, 2011.

(51) Int. Cl.
*H02J 50/00* (2016.01)
*H02J 50/12* (2016.01)
(Continued)

(52) U.S. Cl.
CPC ............... *H02J 50/12* (2016.02); *H02J 5/005* (2013.01); *H02J 7/025* (2013.01); *H02J 17/00* (2013.01);
(Continued)

(58) Field of Classification Search
CPC ... H01F 38/00; H02J 7/00; H02J 50/00; H02J 5/00; H02J 17/00; H04B 7/00
(Continued)

(56) References Cited

U.S. PATENT DOCUMENTS 5,329,274 A   7/1994   Donig et al.
7,443,057 B2 *   10/2008   Nunally ....................... 307/149
(Continued)

FOREIGN PATENT DOCUMENTS

CN   1625018   6/2005
CN   101911029   12/2010
(Continued)

OTHER PUBLICATIONS

Chinese Office Action dated Aug. 7, 2015 issued in counterpart application No. 201280034756.7, 16 pages.
(Continued)

*Primary Examiner* — Fritz M Fleming
*Assistant Examiner* — Joseph N Inge
(74) *Attorney, Agent, or Firm* — The Farrell Law Firm, P.C.

(57) ABSTRACT

Provided is a transmitter in a wireless power transmission system, the transmitter including a Transmission (Tx) power converter for converting a Direct Current (DC) voltage into a first Alternating Current (AC) voltage, and converting the converted first AC voltage into a second AC voltage by amplifying the converted first AC voltage, a Tx matching circuit for matching an impedance thereof with that of a receiver for receiving the second AC voltage to transmit the second AC voltage, a Tx resonator for resonating the second AC voltage into resonant waves to transmit the second AC voltage to the receiver, and a Tx controller for determining an amplification rate of the first AC voltage and controlling the Tx power converter to convert the first AC voltage into the second AC voltage according to the determined amplification rate.

13 Claims, 78 Drawing Sheets

(51) Int. Cl.
  *H02J 50/40* (2016.01)
  *H02J 50/80* (2016.01)
  *H02J 17/00* (2006.01)
  *H02J 5/00* (2016.01)
  *H02J 7/02* (2016.01)
  *H04B 5/00* (2006.01)
  *H02J 7/00* (2006.01)

(52) U.S. Cl.
  CPC .............. *H02J 50/40* (2016.02); *H02J 50/80* (2016.02); *H04B 5/0037* (2013.01); *H02J 7/0013* (2013.01)

(58) Field of Classification Search
  USPC ................................. 307/104, 149; 370/389
  See application file for complete search history.

(56) References Cited

U.S. PATENT DOCUMENTS

| | | |
|---|---|---|
| 2005/0135129 A1 | 6/2005 | Kazutoshi |
| 2005/0152358 A1* | 7/2005 | Giesberts et al. ............. 370/389 |
| 2006/0113955 A1 | 6/2006 | Nunally |
| 2007/0008671 A1* | 1/2007 | Picaud et al. ................. 361/93.1 |
| 2007/0021140 A1* | 1/2007 | Keyes, IV .............. H02J 17/00 455/522 |
| 2009/0127937 A1* | 5/2009 | Widmer et al. ............... 307/149 |
| 2009/0230777 A1* | 9/2009 | Baarman ................ H01F 38/14 307/104 |
| 2009/0251008 A1 | 10/2009 | Sugaya |
| 2009/0271048 A1 | 10/2009 | Wakamatsu |
| 2009/0284082 A1 | 11/2009 | Mohammadian |
| 2009/0286475 A1 | 11/2009 | Toncich et al. |
| 2010/0084918 A1 | 4/2010 | Fells et al. |
| 2010/0109443 A1* | 5/2010 | Cook et al. ................... 307/104 |
| 2010/0109843 A1 | 5/2010 | Sugaya |
| 2010/0142423 A1 | 6/2010 | Zhu et al. |
| 2010/0181961 A1 | 7/2010 | Novak et al. |
| 2010/0184371 A1* | 7/2010 | Cook et al. ................... 455/41.1 |
| 2010/0216524 A1* | 8/2010 | Thomas ............ H04W 52/0264 455/574 |
| 2010/0253281 A1* | 10/2010 | Li ......................... H02J 7/0027 320/108 |
| 2011/0169337 A1 | 7/2011 | Kozakai |
| 2011/0195666 A1* | 8/2011 | Forsell ................ A61B 5/0031 455/41.2 |
| 2011/0260682 A1 | 10/2011 | Low et al. |
| 2011/0267002 A1 | 11/2011 | Baarman et al. |
| 2012/0223589 A1* | 9/2012 | Low ..................... H04B 5/0037 307/104 |
| 2013/0154386 A1* | 6/2013 | Bae ........................ H02J 5/005 307/104 |
| 2014/0183969 A1 | 7/2014 | Cook et al. |
| 2017/0139000 A1 | 5/2017 | Yehle et al. |

FOREIGN PATENT DOCUMENTS

| | | |
|---|---|---|
| CN | 102027685 | 4/2011 |
| EP | 1 548 990 | 6/2005 |
| JP | 09-200979 | 7/1997 |
| JP | 09-307361 | 11/1997 |
| JP | 2000-016200 | 1/2000 |
| JP | 2006-246633 | 9/2006 |
| JP | 2007-336710 | 12/2007 |
| JP | 2009-112153 | 5/2009 |
| JP | 2009-251895 | 10/2009 |
| JP | 2009-268311 | 11/2009 |
| JP | 2010-028938 | 2/2010 |
| JP | 2010-503379 | 2/2010 |
| JP | 2010-074992 | 4/2010 |
| JP | 2010-114961 | 5/2010 |
| KR | 1020050065387 | 6/2005 |
| KR | 1020070104777 | 10/2007 |
| KR | 1020100026075 | 3/2010 |
| KR | 1020100066339 | 6/2010 |
| KR | 100976163 | 8/2010 |
| WO | WO 2008/038203 | 4/2008 |
| WO | WO 2008/137996 | 11/2008 |
| WO | WO 2010/025156 | 3/2010 |
| WO | WO 2010/033727 | 3/2010 |
| WO | WO 2010/108191 | 9/2010 |
| WO | WO 2011/100759 | 8/2011 |

OTHER PUBLICATIONS

European Search Report dated Mar. 30, 2015 issued in counterpart application No. 12785298.6-1804.
Japanese Office Action dated Dec. 26, 2016 issued in counterpart application No. 2014-511290, 7 pages.
Chinese Office Action dated Nov. 1, 2017 issued in counterpart application No. 201610046529.6, 16 pages.
Japanese Office Action dated Sep. 10, 2018 issued in counterpart application No. 2017-195268, 10 pages.
Japanese Office Action dated Feb. 22, 2016 issued in counterpart application No. 2014-511290, 15 pages.
European Search Report dated Apr. 19, 2016 issued in counterpart application No. 12785298.6-1804, 13 pages.
Japanese Office Action dated Aug. 8, 2016 issued in counterpart application No. 2014-511290, 8 pages.

* cited by examiner

[도43]

| Byte \ Bit | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type | | | | Short ID | | | Reserved |
| Byte 1 | Sequence Number | | | | | | | |
| Variable | Frame Payload | | | | | | | |
| Variable +2 | Checksum | | | | | | | |
| Variable +3 | | | | | | | | |

Bytes 0–1 are the MAC Frame Header.

FIG.85

| Byte \ Bit | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type(Notice) | | | | Short ID | | | Reserved |
| Byte 1 | Sequence Number | | | | | | | |
| Byte 2 | Notice Type | | | Reserved | | | | |
| Byte 3 | Notice Info | | | | | | | |
| Byte 4 | Checksum | | | | | | | |

FIG.86

| Bit<br>Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type(Report) | | | | | | | Reserved |
| Byte 1 | Sequence Number | | | | | | | |
| Byte 2 | Charge Status | | | Reason | | | | Reserved |
| Byte 0/2/4 +3 | Power Info | | | | | | | |
| Byte 0/2/4 +4 | Checksum | | | | | | | |
| Byte 0/2/4 +5 | | | | | | | | |

| Bit / Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type(Report) | | | | Short ID | | | Reserved |
| Byte 1 | Sequence Number | | | | | | | |
| Byte 2 | Charge Status (Error) | | | | Reason | | | Reserved |
| Byte 3 | Checksum | | | | | | | |
| Byte 4 | | | | | | | | |

FIG.91

| Bit / Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type(ACK) | | | | Short ID | | | Reserved |
| Byte 1 | Sequence Number | | | | | | | |
| Byte 2 | Checksum | | | | | | | |
| Byte 3 | | | | | | | | |

| Bit<br>Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type | | | | | | | Reserved |
| Byte 1 | Sequence Number | | | | | | | |
| Byte 2 | Interactive Type | | | Short ID | | | | |
| Variable | Variable | | | | | | | |
| Variable +3 | Checksum | | | | | | | |
| Variable +4 | | | | | | | | |

FIG.92

| Bit \ Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type (Interactive) | | | | | | | Reserved |
| Byte 1 | Short ID | | | | | | | |
| Byte 2 | Interactive Type (Request Join) | | | | ID Size Type | | ID Size Type | |
| Byte 3 | Load Characteristic | | | | | | | |
| Variable | ID (4byte/8byte/12byte) | | | | | | | |
| Variable +4 | Checksum | | | | | | | |
| Variable +5 | | | | | | | | |

FIG.93

| Bit\Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type (Interactive) | | | | Short ID | | | Reserved |
| Byte 1 | Interactive Type (Response Join) | | | Sequence Number | | | | |
| Byte 2 | | | | Permission | Allocated Short ID | | | |
| Byte 3 | | | | Checksum | | | | |
| Byte 4 | | | | | | | | |

FIG.94

| Bit / Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type (Interactive) | | | Short ID | | | | Reserved |
| Byte 1 | Sequence Number | | | | | | | |
| Byte 2 | Interactive Type (Request Charge) | | | Reserved | | | | |
| Byte 3 | Current Characteristic | | | | | | | |
| Byte 4 | Voltage Characteristic | | | | | | | |
| Byte 5 | Efficiency Characteristic | | | | | | | |
| Byte 6 | Checksum | | | | | | | |
| Byte 7 | | | | | | | | |

FIG.95

| Bit / Byte | Bit 0 | Bit 1 | Bit 2 | Bit 3 | Bit 4 | Bit 5 | Bit 6 | Bit 7 |
|---|---|---|---|---|---|---|---|---|
| Byte 0 | Frame Type (Interactive) | | | | | | | Reserved |
| Byte 1 | Interactive Type (Response Charge) | | | Sequence Number | | | | |
| Byte 2 | | | | Permission | | Reason | | Reserved |
| Byte 3 | Checksum | | | | | | | |
| Byte 4 | | | | | | | | |

FIG. 96

WIRELESS POWER SYSTEM COMPRISING POWER TRANSMITTER AND POWER RECEIVER AND METHOD FOR RECEIVING AND TRANSMITTING POWER OF THE APPARATUSES

PRIORITY

The present application claims a priority under 35 U.S.C. § 119(e) to U.S. Provisional Application No. 61/485,925 which was filed in the United States Patent and Trademark Office on May 13, 2011, the entire disclosures of which are incorporated herein by reference.

BACKGROUND OF THE INVENTION

Field of the Invention

The present invention relates to a wireless power transmission system, and more particularly, to a transmitter and a receiver in a wireless power transmission system capable of having high resonance characteristics and a wireless power transmission and reception method for the transmitter and the receiver.

Description of the Related Art

With the development of wireless communication technologies, a ubiquitous information environment is now provided in which anyone can exchange any desired information regardless of time and place. Even now, however, most communication information devices depend on batteries and are supplied with power through wired power codes, such that use of communication and information devices is limited. Therefore, a wireless information network environment cannot be free in the true sense without solving a problem regarding terminal's power.

To solve this problem, a lot of techniques for wirelessly transmitting power have been developed. Among them, a microwave reception-type technique using microwaves, a magnetic induction-type technique using a magnetic field, and a magnetic resonance technique based on energy conversion between a magnetic field and an electric field are representative techniques.

Herein, the microwave reception-type technique has an advantage of transmitting power a remote distance by radiating microwaves over the air, but due to large radiation loss caused by the microwaves consumed in the air, there is a limitation in the efficiency of power transmission. The magnetic induction-type technique is a technique which uses magnetic energy coupling based on a transmission-side primary coil and a reception-side secondary coil, and has a high efficiency of power transmission. However, for power transmission, the transmission side primary coil and the reception side secondary coil have to be adjacent to each other within a short distance of several mms therebetween. The efficiency of power transmission rapidly changes with coil alignments of the transmission-side primary coil and the reception-side secondary coil, and the amount of heat generation is large.

Therefore, a magnetic resonance technique has been recently developed, which is similar to the magnetic induction-type technique, but is such that energy is concentrated at a particular resonance frequency by a coil-type inductor (L) and a capacitor (C) to transmit power in the form of a magnetic energy. This technique, in spite of transmission of relatively large power several meters, requires a high quality factor. As a result, a design of a wireless power transmission system having high resonance characteristics is required.

SUMMARY OF THE INVENTION

Accordingly, the present invention provides a transmitter and a receiver in a wireless power transmission system capable of having high resonance characteristics and a wireless power transmission and reception method for the transmitter and the receiver.

According to an aspect of the present invention, there is provided a transmitter in a wireless power transmission system, the transmitter including a Transmission (Tx) power converter for converting a Direct Current (DC) voltage into a first Alternating Current (AC) voltage, and converting the converted first AC voltage into a second AC voltage by amplifying the converted first AC voltage, a Tx matching circuit for matching an impedance thereof with that of a receiver for receiving the second AC voltage to transmit the second AC voltage, a Tx resonator for resonating the second AC voltage into resonant waves to transmit the second AC voltage to the receiver, and a Tx controller for determining an amplification rate of the first AC voltage and controlling the Tx power converter to convert the first AC voltage into the second AC voltage according to the determined amplification rate.

According to another aspect of the present invention, there is provided a receiver in a wireless power transmission system, the receiver including a Reception (Rx) resonator for receiving an Alternating Current (AC) voltage resonated as resonant waves by a transmitter, an Rx matching circuit for matching an impedance thereof with that of the transmitter to receive the AC voltage from the transmitter, an Rx power converter for rectifying the AC voltage into a first Direct Current (DC) voltage, and converting the first DC voltage into a second DC voltage by amplifying the first DC voltage, and an Rx controller for determining an amplification rate of the first DC voltage and controlling the Rx power converter to convert the first DC voltage into the second DC voltage according to the determined amplification rate.

According to still another aspect of the present invention, there is provided a transmitter in a wireless power transmission system, the transmitter including a Transmission (Tx) power converter comprising a Class-E amplifier for converting a Direct Current (DC) voltage into a first Alternating Current (AC) voltage and a driver amplifier for converting the converted first AC voltage into a second AC voltage by amplifying the converted first AC voltage, a Tx matching circuit for matching an impedance thereof with that of a receiver for receiving the second AC voltage to transmit the second AC voltage, a Tx resonator for resonating the second AC voltage into resonant waves to transmit the second AC voltage to the receiver, and a Tx controller for determining an amplification rate of the first AC voltage and controlling the Tx power converter to convert the first AC voltage into the second AC voltage according to the determined amplification rate, in which the Tx controller monitors a driving voltage of a transistor included in the Class-E amplifier to determine whether at least one of an over-voltage, an over-current, and an over-temperature occurs in the Class-E amplifier due to the driving voltage applied to the transistor, and stops an operation of the transmitter if at least one of the over-voltage, the over-current, and the over-temperature occurs.

According to further another aspect of the present invention, there is provided a receiver in a wireless power transmission system, the receiver including a Reception (Rx) resonator for receiving an Alternating Current (AC) voltage resonated as resonant waves by a transmitter, an Rx matching circuit for matching an impedance thereof with that of the transmitter to receive the AC voltage from the transmitter, an Rx power converter for rectifying the AC voltage into a first Direct Current (DC) voltage, and converting the first DC voltage into a second DC voltage by amplifying the first DC voltage, and an Rx controller for determining an amplification rate of the first DC voltage and controlling the Rx power converter to convert the first DC voltage into the second DC voltage according to the determined amplification rate, in which the Rx controller monitors the AC voltage received through the Rx resonator to determine whether at least one of an over-voltage, an over-current, and an over-temperature occurs in at least a part of the receiver, and stops an operation of the receiver if at least one of the over-voltage, the over-current, and the over-temperature occurs.

According to yet another aspect of the present invention, there is provided a wireless power transmission and reception method for a transmitter in a wireless power transmission system, the wireless power transmission and reception method including a detection step of, to monitor a load variation in an interface, supplying a first power every predetermined time and checking if the load variation occurs, a registration step of, if the load variation occurs, supplying a second power larger than the first power to the interface, and if receiving a response from a receiver having received the second power, allocating to the receiver a Short Identification (SID) and a time slot corresponding to the receiver, a configuration step of receiving information comprising at least one of an output voltage and an output current from the receiver, calculating a required power required from the receiver according to the information, and determining whether the required power can be transmitted to the receiver, and a charge step of, if the required power can be transmitted to the receiver, transmitting the required power to the receiver.

According to yet another aspect of the present invention, there is provided a wireless power transmission and reception method for a receiver in a wireless power transmission system, the wireless power transmission and reception method including receiving a first power supplied every predetermined time from a transmitter and requesting joining from the transmitter by using the first power, receiving a second power larger than the first power from the transmitter and requesting charging from the transmitter, being allocated with a Short Identification (SID) and a time slot from the transmitter and transmitting information comprising at least one of an output voltage and an output current to the transmitter to request transmission of a required power, and receiving the required power from the transmitter.

According to yet another aspect of the present invention, there are provided a transmitter and a receiver in a wireless power transmission system, in which the transmitter and the receiver transmit and receive data by using a Medium Access Control (MAC) frame comprising a MAC frame header, a frame payload, and a checksum.

BRIEF DESCRIPTION OF THE DRAWINGS

The above and other features and advantages of an exemplary embodiment of the present invention will be more apparent from the following detailed description taken in conjunction with the accompanying drawings, in which:

FIG. 85 is a view showing a Media Access Control (MAC) frame structure;

FIG. 86 is a view showing a structure of a packet Notice_Frame according to the present invention;

FIG. 87 is a view showing a structure of a packet Report_Frame according to the present invention;

FIG. 90 is a view showing a structure of a packet Report_Frame in an error state;

FIG. 91 is a view showing a structure of a packet ACK_Frame according to the present invention;

FIG. 92 is a view showing a general structure of a packet Interactive_Frame according to the present invention;

FIG. 93 is a view showing a structure of a packet Interactive_Request_Join_Frame according to the present invention;

FIG. 94 is a view showing a structure of a packet Interactive_Response_Join_Frame according to the present invention;

FIG. 95 is a view showing a structure of a packet Interactive_Request_Charge_Frame according to the present invention;

FIG. 96 is a view showing a structure of a packet Interactive_Response_Charge_Frame according to the present invention.

DETAILED DESCRIPTION OF THE EXEMPLARY EMBODIMENT

Hereinafter, an exemplary embodiment of the present invention will be described in detail with reference to the accompanying drawings. In the following description, specific details such as detailed configuration and components are merely provided to assist the overall understanding of the exemplary embodiment of the present invention. Therefore, it should be apparent to those skilled in the art that various changes and modifications of the exemplary embodiment described herein can be made without departing from the scope and spirit of the invention.

The present invention relates to a wireless power transmission system which operates with resonant coupling between two devices. In the power transmission system according to the present invention, a device which provides power is defined as a power transmitting platform, i.e., a power transmitter, and a device which receives power is defined as a power receiving unit, i.e., a power receiver. In the following description, for convenience' sake, a power transmitting platform for providing power is called shortly as a 'transmitter' and a power receiving unit for receiving power as a 'receiver'.

The resonant coupling happens between resonators in a near-field range of $\lambda/2\pi$ and in the present invention, wireless power is transmitted from the transmitter to the receiver by using the resonant coupling phenomenon. By doing so, the transmitter can provide power to the receiver without using a conventional power capable built in the transmitter and the receiver. Moreover, the wireless power transmission system using the resonant coupling phenomenon provides more useful advantages such as freedom of placement of impedances for impedance matching, when compared to conventional inductive coupling between a transmitter and a receiver. The wireless power transmission system according to the present invention also provides ease of multiple charging to users, such that multiple receivers are charged at a time, thus providing user convenience.

Figure 1:
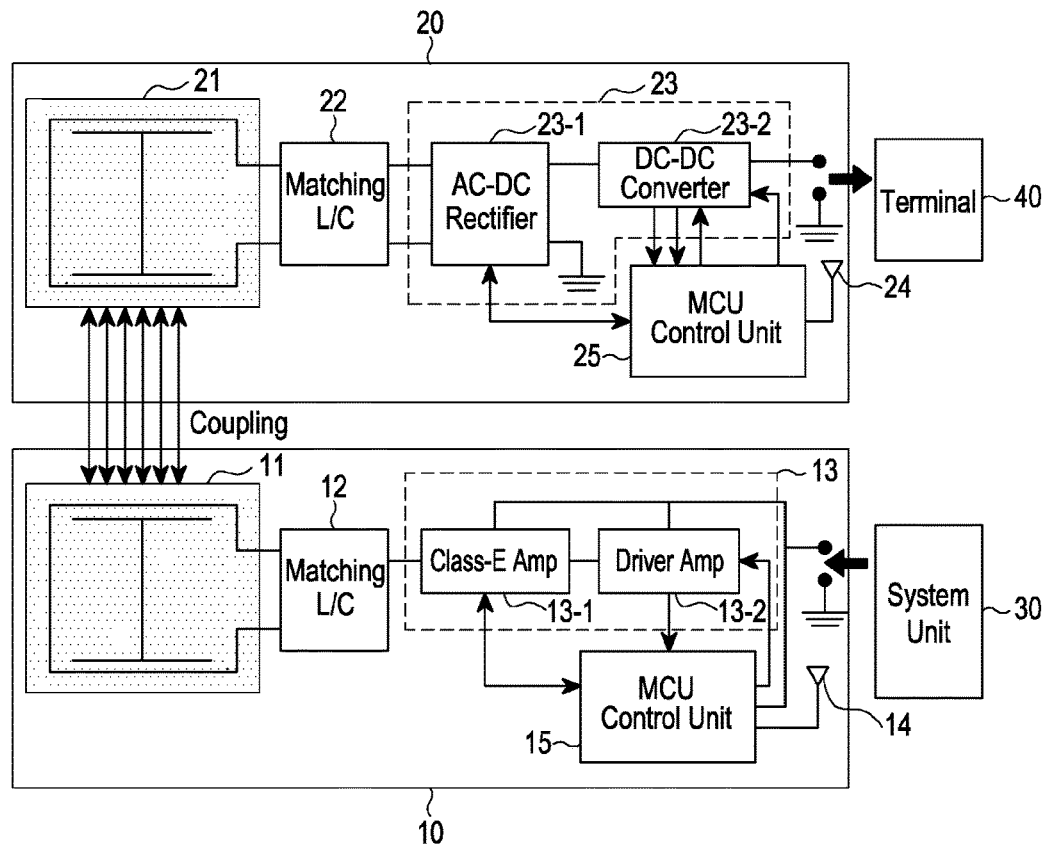
FIG. 1 is a block diagram showing structures of a transmitter and a receiver in a wireless power transmission system according to an embodiment of the present invention.

FIG. 1 is a block diagram showing structures of a transmitter and a receiver in a wireless power transmission system according to an embodiment of the present invention. Although not shown in FIG. 1, a transmitter 10 may serve, i.e., transmits power to at least one receivers 20.

The transmitter 10 may include a transmission (Tx) resonator 11, a Tx matching circuit (Matching L/C) 12, a Tx power converter 13, which includes a Class-E amplifier (Class-E Amp) 13-1, which is a power amplifier and a driver amplifier (Driver Amp) 13-2, a Tx communication unit 14, and a Tx controller (MCU control unit) 15.

The transmitter 10 receives a Direct Current (DC) voltage of 7-15V from a system unit 30, which is a DC adaptor for outputting the DC voltage of 7-15V. Upon input of the DC voltage, the Tx controller 15 controls the Tx power converter 13 to convert the DC voltage into an Alternating Current (AC) voltage and to amplify the converted AC voltage. According to an embodiment, the Tx controller 15 may control an amplification rate of the AC voltage at the Tx power converter 13. The amplified AC voltage is transmitted to a reception (Rx) resonator 21 of the receiver 20 by means of the Tx resonator 11.

The Tx controller 15 controls the overall operation of the transmitter 10. The Tx controller 15 controls the transmitter 10 to receive the DC voltage from the system unit 30 and controls the Tx power converter 13 to control a amplification rate of the amplified AC voltage. Upon completion of charging of the receiver 20, the Tx controller 15 may control the transmitter 10 not to transmit power to the receiver 20 any longer. According to an embodiment, the Tx controller 15 may control an impedance of the Tx matching circuit 12 to facilitate power transmission of the transmitter 10. The Tx controller 15 may calculate the power transmitted from the transmitter 10 with the power transmitted to the receiver 20 to calculate a power efficiency. Based on the calculated power efficiency, the Tx controller 15 may control an impedance of the Tx matching circuit 12 to maximize the power efficiency.

The Tx communication unit 14 performs wired or wireless communication of the transmitter 10. The Tx communication unit 14 may receive a power supply request or a power supply stop request from the receiver 20.

The Tx resonator 11 is coupled with an Rx resonator 21 of the receiver 20 to resonate an AC voltage into resonant waves, thereby supplying power to the receiver 20.

The receiver 20 may include an Rx resonator 21, an Rx matching circuit (Matching L/C) 22, an RX power converter 23 including an AC/DC rectifier (AC-DC Rectifier) 23-1 and a DC/DC converter (DC-DC Converter) 23-2, an Rx communication unit 24, and an Rx controller (MCU Control Unit) 25.

Once an impedance of the Tx matching circuit 12 and an impedance of the Rx matching circuit 22 are matched, the Rx resonator 21 is coupled with the Tx resonator 11 of the transmitter 10 to be supplied with an AC voltage from the transmitter 10.

The Rx power converter 23 converts the AC voltage received through the Rx resonator 21 into a DC voltage through the AC/DC rectifier 23-1. The Rx power converter 23 amplifies the converted DC voltage through the DC/DC converter 23-2. The Rx power converter 23 allows a terminal 40 to be driven using the DC voltage by transmitting the converted and amplified DC voltage to the terminal 40.

The Rx controller 25 controls the overall operation of the receiver 20. The Rx controller 25 controls the receiver 20 to transmit a DC voltage for driving the terminal 40 connected with the receiver 20.

The Rx controller 25 controls the Rx power converter 23 to control an amplification rate of the DC voltage to be amplified. The Rx controller 25 also controls an impedance of the Rx matching unit 22 to facilitate reception of the power transmitted through the Tx resonator 11 of the transmitter 10.

The Rx communication unit 24 performs wired or wireless communication of the receiver 20. The Rx communication unit 13 may request power supply or power supply stop from the transmitter 10.

In the present invention, the transmitter 10 may supply power to the multiple receivers 20. To this end, the transmitter 10 includes several design parameters to be carefully considered. The most important thing is to select a resonant frequency for power transmission since it affects system performance as well as Bill of Material (BOM) costs. In addition, the transmitter 10 includes the Tx resonator 11 or the Class-E amplifier 13-1 to provide variable output power to the receiver 20 with high efficiency, and may adopt a Switching Mode Power Supply (SMPS) scheme or the like.

(Selection of Resonant Frequency)

Hereinafter, a description will be made of a method for the Tx controller 15 of the transmitter 10 to determine a resonant frequency, such that the Tx resonator 11 can perform resonant coupling with the Rx resonator 21.

Generally, in a wireless power transmission system, due to of high inductance and low resistance, a ferrite and an inductor have been widely used but the cost is rapidly increased over a frequency of 10 MHz or more. In this regard, in the present invention, the wireless power transmission system will be implemented using a resonant frequency of 10 MHz or lower. Preferably, in the wireless power transmission system according to the present invention, power can be transmitted and received using a frequency of 6.78 MHz.

In general, as the resonant frequency increases, a resonant system with a higher Q value (which is an index indicating selectivity of the resonant frequency) can be easily achieved. Especially in the range of MHz frequencies, an Industrial Scientific Medical (ISM) band frequency such as 6.78 MHz, 13.56 MHz, and 27.12 MHz may be desirable as a resonant frequency.

To design a Coss (international capacitance) values in an efficient Field Effect Transistor (FET), high power Power Amplitude (PA) is required. Coss, because decreasing frequency values, is available to low-cost FETs. Unique efficiencies of the FETs are better at the low-frequency band than the high-frequency band, such that an efficiency in the 6.78 MHz frequency range is approximately 3% better than in the 27.12 MHz frequency range.

The AC power induced at the Tx resonator 11 is needed for a power diode rectifier included in the receiver 20, that is, the AC/DC rectifier 23-1, and the higher the frequency the lower the efficiency of the AC power induction. By using the diode included in the AC/DC rectifier 23-1, the receiver 20 may rectify the AC power transmitted from the Rx resonator 21 to the AC/DC rectifier 23-1. The diode included in the AC/DC rectifier 23-1 may degrade frequency characteristics in spite of high efficiency. In particular, since self-heating increases at low frequency, when considering self-heating effects, it is safe to use the resonant frequency of approximately 2-3 MHz above the original frequency. Conclusively, in the present invention, to meet the above conditions, a resonant frequency of a 6.78 MHz band will be used.

For the Tx resonator 11 used in the present invention, two types of resonators may be considered according to connecting methods of a resistor, a capacitor, and an inductor.

Figure 2A:
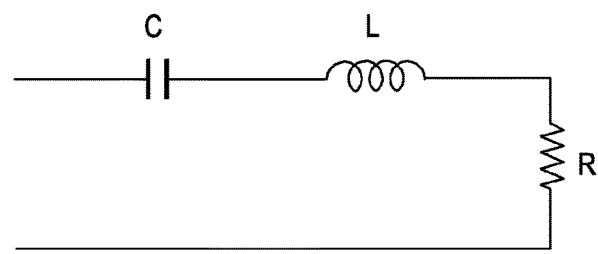
FIG. 2A is a circuit diagram of a serial resonator in which a resistor (R), a capacitor (C), and an inductor (L) are connected in series.

First, FIG. 2A is a circuit diagram of a serial resonator in which a resistor (R), a capacitor (C), and an inductor (L) are serially connected. The serial resonator as shown in FIG. 2A generally has a small loop antenna having a magnetic dipole.

Figure 2B:
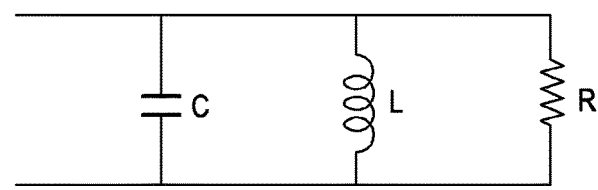
FIG. 2B is a circuit diagram of a parallel resonator in which a resistor (R), a capacitor (C), and an inductor (L) are connected in parallel.

FIG. 2B is a circuit diagram of a parallel resonator in which a resistor (R), a capacitor (C), and an inductor (L) are connected in parallel. The parallel resonator as shown in FIG. 2B generally has a small wire antenna having a magnetic dipole. The resonant frequency of the serial resonator shown in FIG. 2A or the parallel resonator shown in FIG. 2B may be controlled according to the inductance (L), and a quality factor of the resonant frequency may be defined as:

$$Q = \frac{R}{\omega L} \qquad (1)$$

Meanwhile, to minimize the effect of wireless power transmission to the human body, a serial resonator having a dominant magnetic field in a near-field is appropriate. This is because human bodies and almost all materials in the world are non-magnetic materials.

To implement an artificial Meta-material Transmission Line (MTL), an artificial via hole, a gap and a stub may be added to a typical transmission line (not shown) of the transmitter 10. In the following description, two methods for designing the Tx resonator 11 by using the MTL will be described. The first is an Epsilon-negative (ENG) MTL and the second is a Mu-negative (MNG) MTL.

Figure 3A:
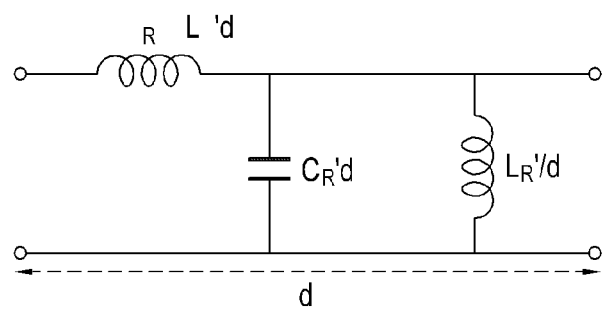
FIG. 3A is a circuit diagram of an Epsilon-negative (ENG) circuit.
Figure 3B:
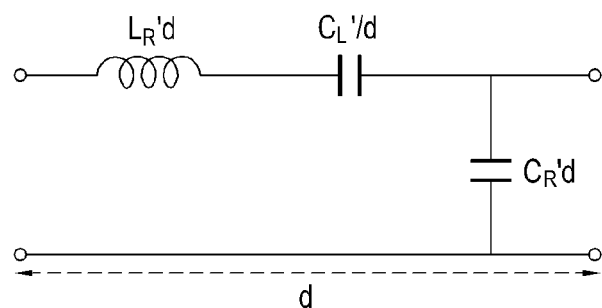
FIG. 3B is a circuit diagram of a Mu-negative (MNG) circuit.

FIG. 3A is a circuit diagram showing an ENG MTL, and FIG. 3B is a circuit diagram showing an MNG MTL.

As shown in FIG. 3A, an artificial ENG transmission line can be achieved by adding a parallel inductance $L'_L$ to a transmission line-equivalent circuit.

As shown in FIG. 3B, an artificial MNG transmission line can be achieved by adding a serial capacitance ($C'_L$, $C'_R$) to a transmission line-equivalent circuit. Assuming that the Tx resonator 11 according to the present invention is a lose-less transmission line, then a propagation constant of the transmission line is given as $\gamma=j\beta=\sqrt{Z'Y'}$, in which Z' and Y' are impedance and admittance with unit length, respectively. Once the propagation constant is calculated, permeability μ and permittivity ε of the transmission line are calculated. The permeability and the permittivity can be expressed as follows:

$$\mu = \frac{Z'}{j\omega}:$$ (2)

$$\mu_{ENG} = L'_R,$$

$$\mu_{MNG} = L'_R - \frac{1}{\omega^2 C'_L}$$

$$\varepsilon = \frac{Y'}{j\omega}:$$ (3)

$$\varepsilon_{MNG} = C'_R,$$

$$\varepsilon_{ENG} = C'_R - \frac{1}{\omega^2 L'_L}$$

As can be seen in Equation 3, the permeability μ of the ENG transmission line is a positive value at all times, but the permittivity ε may be zero, negative and positive, depending on frequency. Similarly, an MNG transmission line has zero, negative and positive values of permeability just as an ENG transmission line.

As a result, each of the ENG and MNG transmission lines has a stop band in a low frequency. This is because permittivity ε and permeability μ become zero as the frequencies of the transmission lines increase, respectively, so that the propagation constant of each transmission line may become zero. As such, the propagation constant becomes zero and thus two transmission lines, that is, the ENG and MNG transmission lines, have a wavelength with an infinite value.

The resonant frequency of the Tx resonator 11 is given as below.

$$\omega_E = \frac{1}{\sqrt{L_L C_R}},$$ (4)

$$\omega_M = \frac{1}{\sqrt{L_R C_L}}$$

$$\omega_E = \frac{1}{\sqrt{L_L C_R}},$$

$$\omega_M = \frac{1}{\sqrt{L_R C_L}}$$

Figure 4:
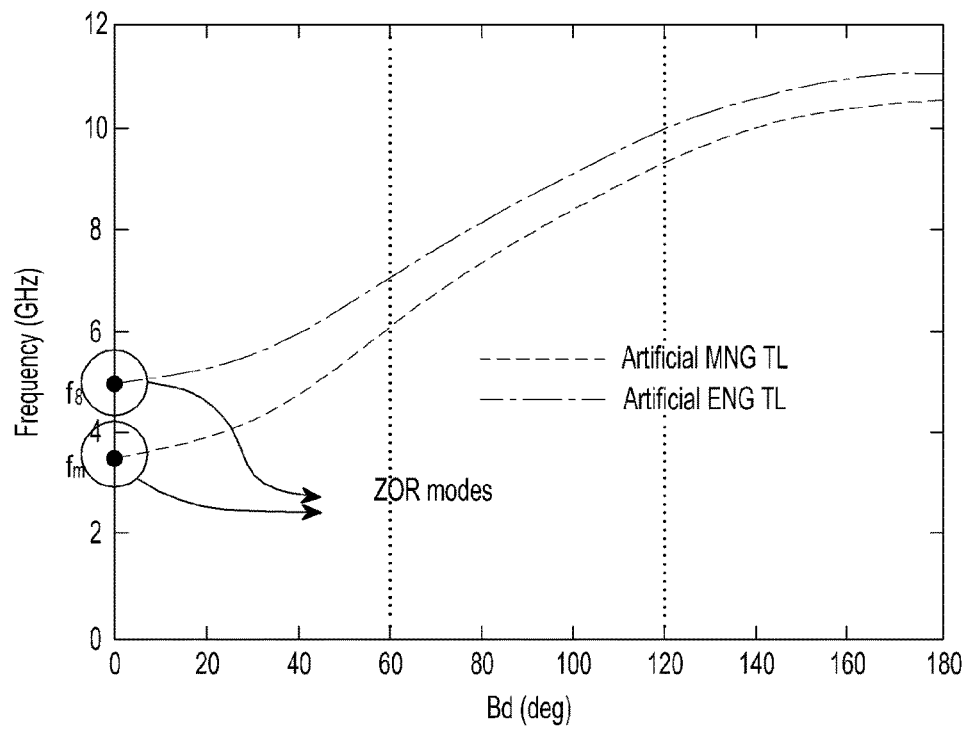
FIG. 4 is a graph showing characteristics of a resonance frequency.

Generally, a resonant frequency of a resonator depends on the size of the resonator, such that it is hard to tune the frequency and make a small resonator. FIG. 4 is a graph showing characteristics of a resonant frequency. Referring to FIG. 4, through zero-th order resonance of ENG and MNG, a resonator can be designed without any restriction for a size of a resonator. For example, since the resonant frequency of a meta-material resonator is independent of the size of the resonator, it is easy to make a small resonator and tune the frequency.

Meanwhile, resonators according to ENG and MNG transmission lines have a dominant electric and magnetic field in a near-field, respectively. A resonator according to the MNG transmission line, which has a dominant magnetic field in a near-field, is appropriate for a wireless power transmission system because it affects little other materials, especially human bodies.

(MNG Transmission Line (TL) Resonator)

The main benefit of a meta-material resonator is that its resonant frequency is not dependent on the real size of the resonator. For example, for a Helix resonator, to obtain a resonant frequency of 10 MHz, a resonator of a 0.6 meter diameter is needed. Likewise, for a spiral coil-structure resonator, the resonator of the same diameter is needed. In general, to reduce the resonant frequency of a receiver, the size of the resonator should be increased. Such a disadvantage does not meet a demand for implementing a portable wireless power transmission system.

Figure 5:
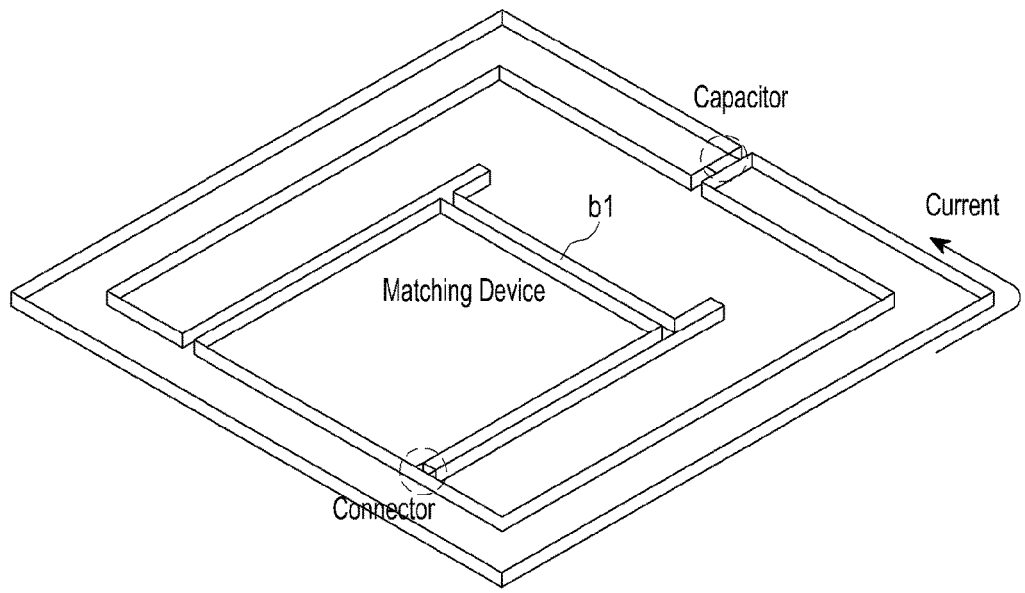
FIG. 5 is a view showing an example of a meta material MNG resonator.

FIG. 5 is a view showing an example of a meta-material MNG resonator.

A MNG resonator basically consists of an MNG transmission line and a capacitor. In the present invention, the capacitor is disposed at a random position in the MNG transmission line and an electric field is captured by the capacitor. Also, current flows through the MNG transmission line. When the resonator is far smaller than a wavelength, the current becomes uniform regardless of the location of the MNG transmission line. Therefore, a magnetic field may be strongly formed to a y-axis direction from the center of the resonator by a direction of the current.

As shown in FIG. 5, a MNG resonator typically has 3-dimensional structure. However, if a MNG transmission line is disposed in an x-z surface, the resonator may have a 2-dimentional structure. For high efficiency, a resonator needs to use a structure having a very small ohmic loss. When the resonator has a 2-dimensional structure, to reduce a corresponding ohmic loss, the width of the transmission line may be increased in an x-axis direction or a z-axis direction or may use a parallel-structure resonator.

In a real designing process, the capacitor may be inserted into the MNG transmission line by alumped element or distributed element, which is an inter-digital capacitor or gap capacitor with a high permittivity board in the center. The insertion of the capacitor in the MNG transmission line makes the resonator show characteristics of meta materials.

The resonant frequency can be easily achieved by changing the capacitance with a fixed transmission line length of the MNG transmission line and the resonator size of the MNG resonator. The MNG resonator preferably includes a matching device b1 in a feed through. The loop size of the matching device b1 needs to be adjustable as shown in FIG. 5. In this case, the matching device can adjust the strength of magnetic coupling with the MNG resonator. The current input to a connector flows to the MNG resonator through the matching device b1.

Figure 6:
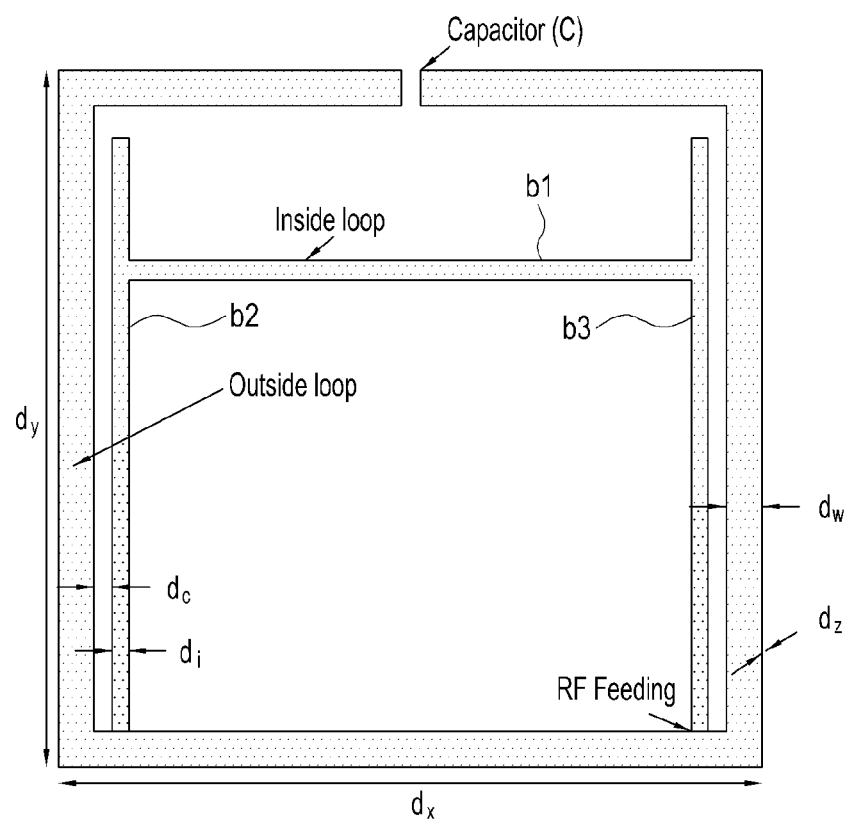
FIG. 6 is a view showing a structure of two types of MNG resonators according to the present invention.

To match a resonant frequency between the transmitter 10 and the receiver 10 and to increase the efficiency, in the resonator according to the present invention, a top bar b1 of an inside loop can be moved up and down. FIG. 6 is a view showing a structure of MNG resonators of two types according to the present invention. Referring to FIG. 6, in the resonator according to the present invention, the top bar b1 of an inside loop can be moved up and down and left and right bars b2 and b3 of the inside loop can also be moved to the left and to the right.

Figure 7:
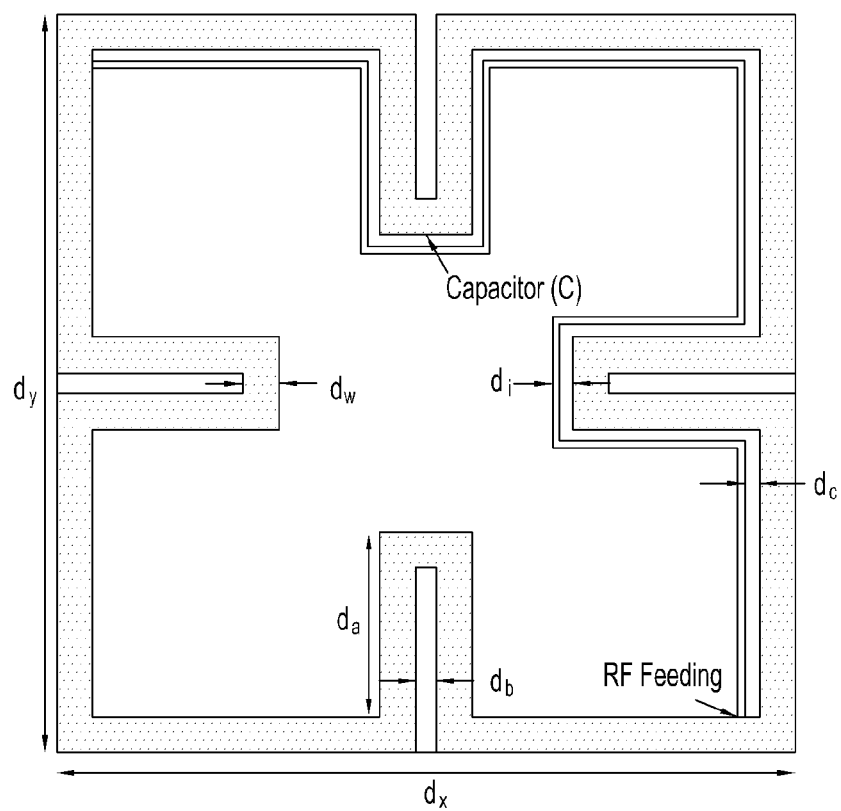
FIG. 7 is a view showing an example of a Tx resonator according to the present invention.

FIG. 7 is a view showing an example of a Tx resonator according to the present invention. A resonator according to the present invention also preferably achieves wide-area matching characteristics. Therefore, the Tx resonator 11 may be implemented in the form of a clover as shown in FIG. 7. Mechanical and electrical parameters of resonators according to the present invention are listed in Tables 1 and 2.

TABLE 1

| Parameter | Symbol | Value |
|---|---|---|
| Material | — | copper |
| Width | dx | 200 mm |
| Length | dy | 200 mm |
| Thickness | dz | 2 mm |
| Outside Loop Width | dw | 10 mm |
| Inside Loop Width | di | 5 mm. |
| Inside-Outside Loop Space | dc | 5 mm |
| Capacitor | C | 1230 pF |
| Parameter | Symbol | Value |

TABLE 2

| Parameter | Symbol | Value |
|---|---|---|
| Material | — | copper |
| Width | dx | 200 mm |
| Length | dy | 200 mm |
| Thickness | dz | 2 mm |
| Outside Loop Width | dw | 10 mm |
| Inside Loop Width | di | 2 mm |
| Inside-Outside Loop Space | dc | 3 mm |
| Inner Corner Width | da | 50 mm |
| Inner Corner Space | db | 5 mm |
| Capacitor | C | 5700 pF |

(Power Amplifier)

Figure 8A:
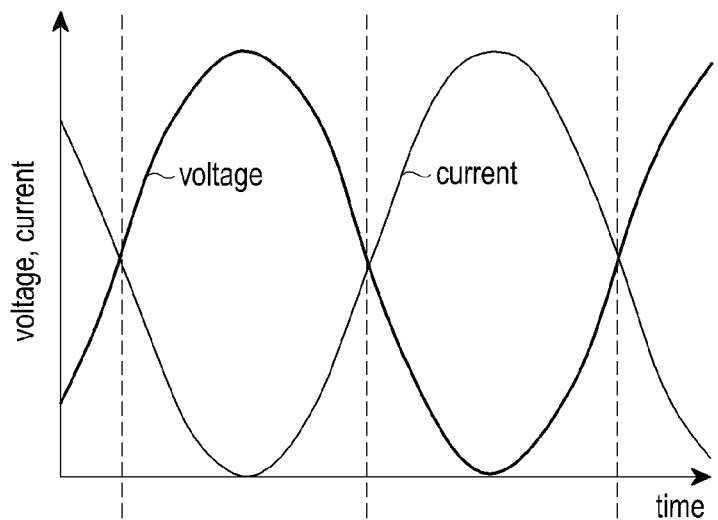
FIGS. 8A through 8C are graphs of a voltage and a current between a drain and a source of a transistor included in each of a Class-A amplifier, a Class-B amplifier, and a Class-E amplifier.
Figure 8B:
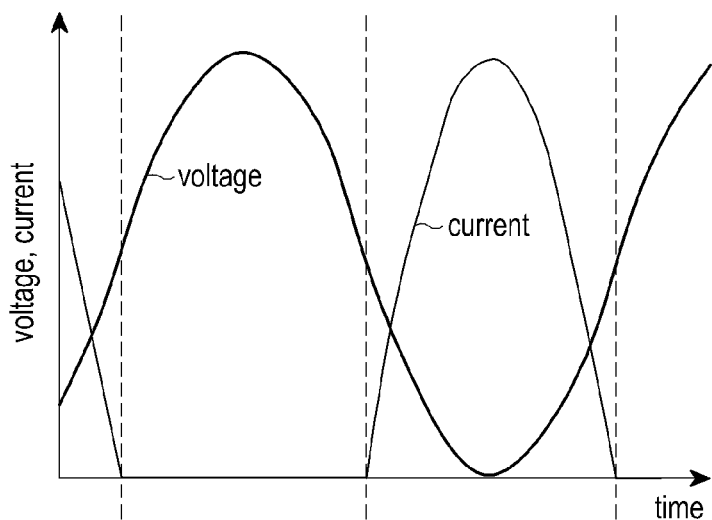
Figure 8C:
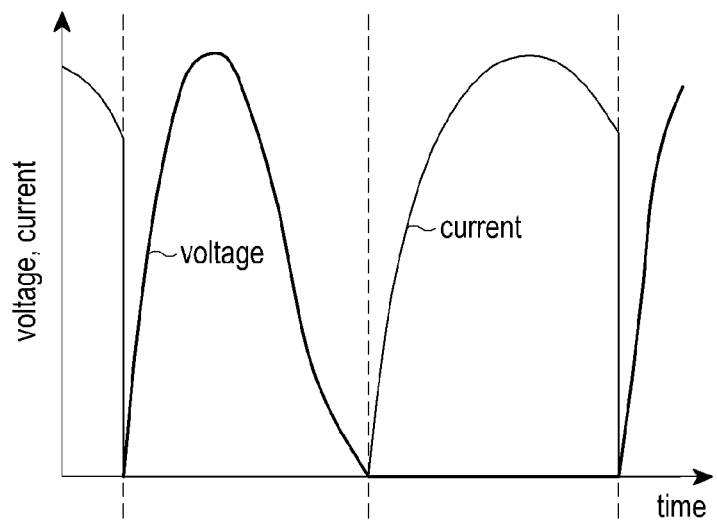

FIGS. 8A through 8C are graphs showing a voltage and a current between a drain and a source of a transistor included in each of a Class-A amplifier, a Class-B amplifier, and a Class-E amplifier. In general, the efficiency of an amplifier drops mostly due to a power loss which can be calculated with the multiplication of a voltage and a current between the drain and the source of the transistor. Referring to FIGS. 8A through 8C, theoretically, in the Class-E amplifier shown in FIG. 8C, a maximum efficiency of 100% can be achieved. Therefore, in the present invention, the transmitter 10 is designed to include the Class-E amplifier 13-1.

Figure 9:
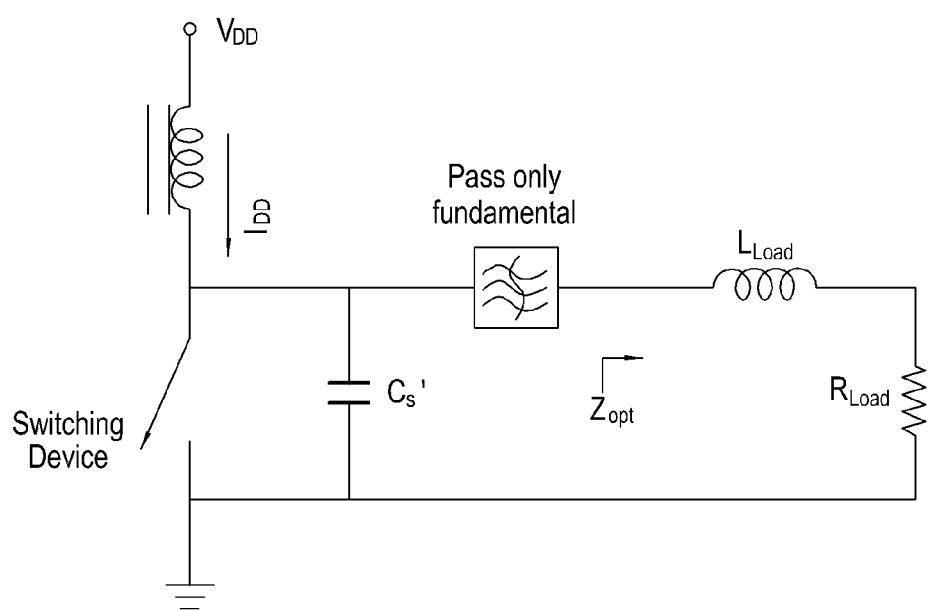
FIG. 9 is a circuit showing a Class-E amplifier, which is a power amplifier of a switching type.
Figure 10:
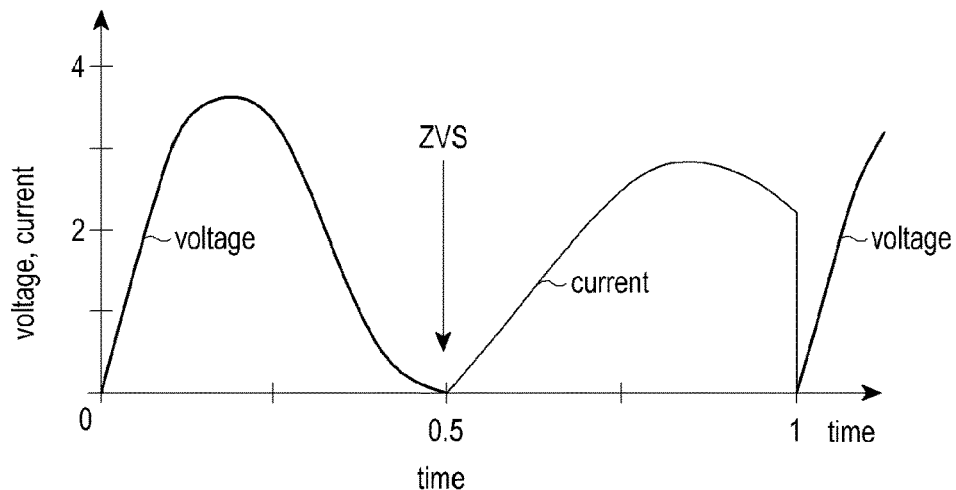
FIG. 10 is a graph showing a voltage wave and a current wave when a switching operation is performed in a switching-type power amplifier of FIG. 9.

FIG. 9 is a circuit diagram showing the Class-E amplifier 13-1, which is a power amplifier of a switching type. FIG. 10 is a graph showing a voltage wave and a current wave when the switching-type power amplifier shown in FIG. 9 performs a switching operation. As shown in FIG. 10, the Class-E amplifier 13-1, which is the switching-type power amplifier, may eliminate the overlap of the voltage wave and the current wave by performing the switching operation, such that the power loss in the Class-E amplifier 13-1 can be minimized. According to an embodiment, in the Class-E amplifier 13-1 shown in FIG. 9, to reduce energy loss at a capacitor C's during a switching period, zero-voltage switching should occur, that is, the switching should occur at the zero voltage.

Figure 11:
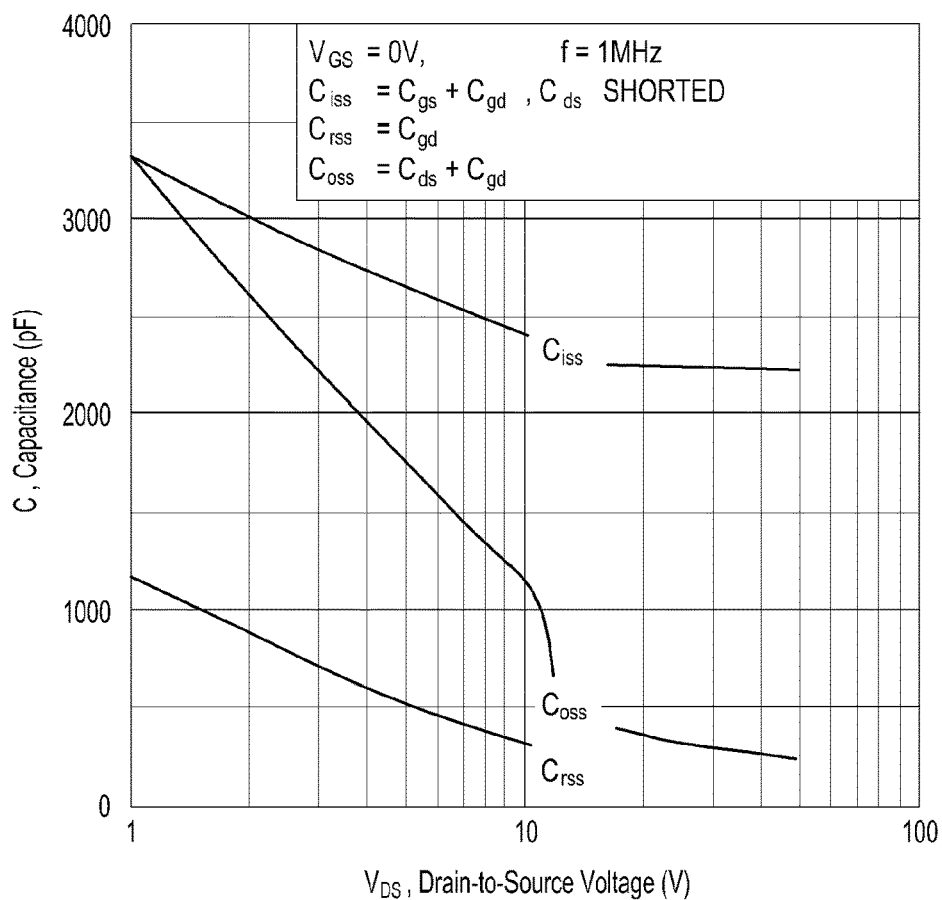
FIG. 11 is a graph showing a voltage between an internal capacitance (Coss) and an external shunt capacitance (C's) between a drain and a source of an FET in a Class-E amplifier.

FIG. 11 is a graph showing a voltage between an internal capacitance Coss and an external shunt capacitance C's between a drain and a source of an FET in the Class-E amplifier 13-1.

Referring to FIG. 11, a sum of Coss and C's can be a characteristic capacitance of the Class-E amplifier 13-1, and also an optimal value Copt of the sum of Coss and C's can be derived from Cs expressed by:

$$C_S = C_{oss} + C'_S = \frac{P_{out}}{\pi \omega V_{DD}^2} \quad (5)$$

However, even when Equation 5 is used, it is not easy to find a proper MOSFET having Coss less than Copt in the range of $V_{DD}$.

For example, for the Copt of 374 pF and 15 pF, to design the Class-E amplifier 13-1 having an output power of 10 W, $V_{DD}$ should be 10V and 50V, respectively. However, a typical MOSFET has Coss of 1100 pF and 250 pF for $V_{DD}$ of 10V and 50V, respectively.

As such, Coss of the MOSFET has a larger value than Copt when a Zero-Voltage Switching (ZVS) operation is performed. Therefore, in the present invention, a type of a Laterally Diffused Metal Oxide Semiconductor (LDMOS) having a much smaller Coss than that of a typical MOSFET is used.

Hereinafter, the Class-E amplifier 13-1 shown in FIG. 9 will be described. First, an inductance of an RF Choke inductor should be large enough at a resonant frequency and a small Direct Conversion Receiver (DCR) of the inductor is preferred. A breakdown voltage of a FET should be larger than a peak to peak voltage at a source of the FET which is given by Equation 6. The Copt can be expressed with Vp instead of $V_{DD}$ as in Equation 7. $R_{Load}$ and $L_{Load}$ can be calculated by Equations 8 and 9.

$$V_p = 3.562 \, V_p \quad (6)$$

$$C_s = \frac{P_{out}}{0.2476 \, \omega V_p^2} \quad (7)$$

$$R_{LOAD} = \frac{8}{\pi(\pi^2 + 4)} \frac{1}{\omega C_s} \quad (8)$$

$$L_{LOAD} = \frac{\pi^2 - 4}{2(\pi^2 + 4)} \frac{1}{\omega^2 C_s} \quad (9)$$

Figure 12:
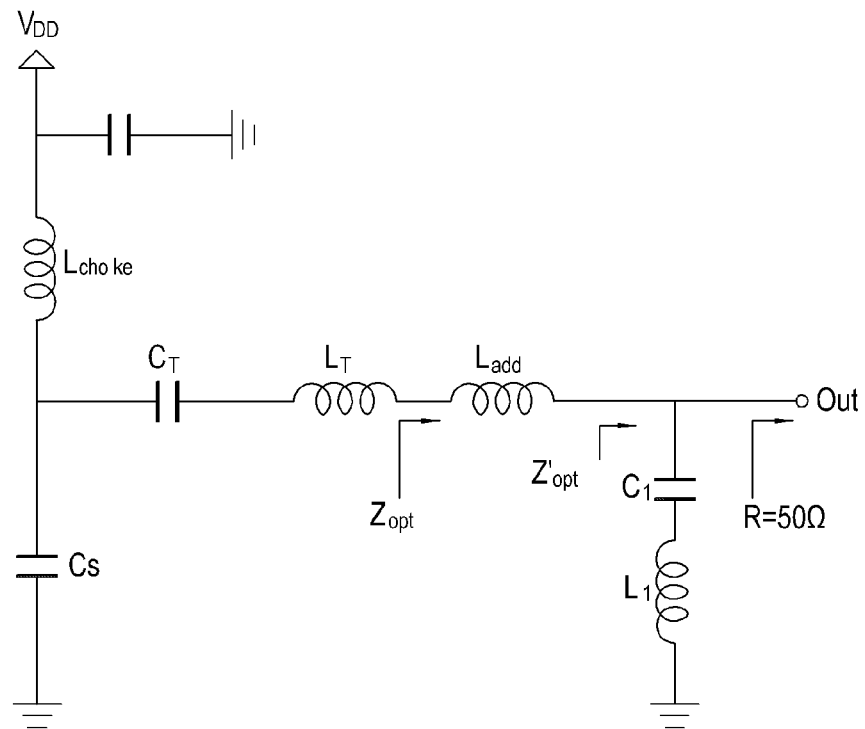
FIG. 12 is a circuit diagram of an output matching circuit.

However, a characteristic impedance of a resonator which is designed to 50Ω does not match a load impedance. As such, if the characteristic impedance and the load impedance do not coincide with each other, $2^{nd}$ and $3^{rd}$ harmonics of the Class-E amplifier 13-1 should be eliminated when a matching circuit for resonance is designed. Therefore, in the present invention, as shown in FIG. 12, an impedance matching circuit is inserted between the Class-E amplifier 13-1 and the resonator. FIG. 12 is a circuit diagram showing an example of the Tx matching circuit 12, that is, the impedance matching circuit according to the present invention. Through the impedance matching circuit shown in FIG. 12, the present invention can achieve the Class-E amplifier 13-1 with higher efficiency. FIG. 12 is a circuit diagram showing an output matching circuit. Values of respective components shown in FIG. 12 can be calculated through the following equations, and in particular, a value of an inductance $L_{add}$ can be calculated by:

$$Z'_{opt} = \frac{R(1 - \omega^2 L_1 C_1)}{(1 - \omega^2 L_1 C_1) + (\omega R C_1)^2}[(1 - \omega^2 L_1 C_1) - j\omega R C_1] \quad (10)$$

$$Z'_{opt} = \frac{\frac{3}{4}R}{\frac{9}{16} + (\omega R C_1)^2}\left[\frac{3}{4} - j\omega R C_1\right] = R_{LOAD} + jX_{LOAD} - j\omega L_{add}$$

$$L_1 C_1 = \frac{1}{(2\pi f_{2nd})^2} = \frac{1}{(2\omega)^2}$$

$$C_1 = \frac{1}{\omega R} \sqrt{\frac{9}{16}\left(\frac{R}{R_{LOAD}} - 1\right)},$$

$$L_1 = \frac{1}{(2\omega)^2 C_1}$$

$$L_{add} = \frac{X_{LOAD}}{\omega} + \frac{\frac{3}{4}R^2 C_1}{\frac{9}{16} + (\omega R C_1)^2}$$

Figure 13:
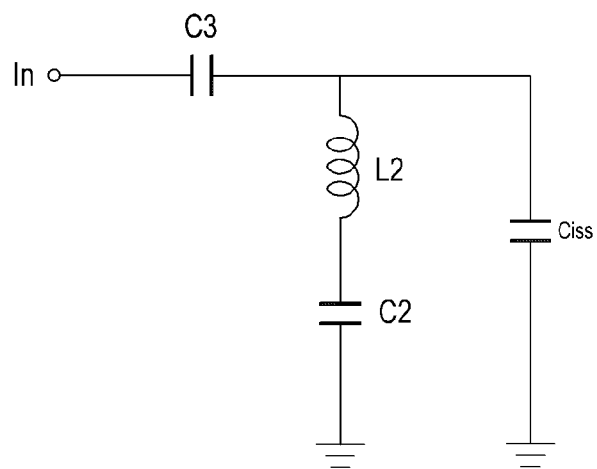
FIG. 13 is a circuit diagram of an input matching circuit.

In the same manner, in the present invention, input matching is necessary to increase a Power Amplifier Efficiency (PAE) as shown in Equation 11. FIG. 13 is a circuit diagram showing an input matching circuit. In FIG. 12, a capacitance applied to a gate of a transistor is assumed to be a capacitor $C_{iss}$. A resonant input drive circuit is designed to remove the effect of $C_{iss}$.

$$PAE = \frac{(P_{out} - P_{in})}{P_{DC}} \quad (11)$$

Figure 14:
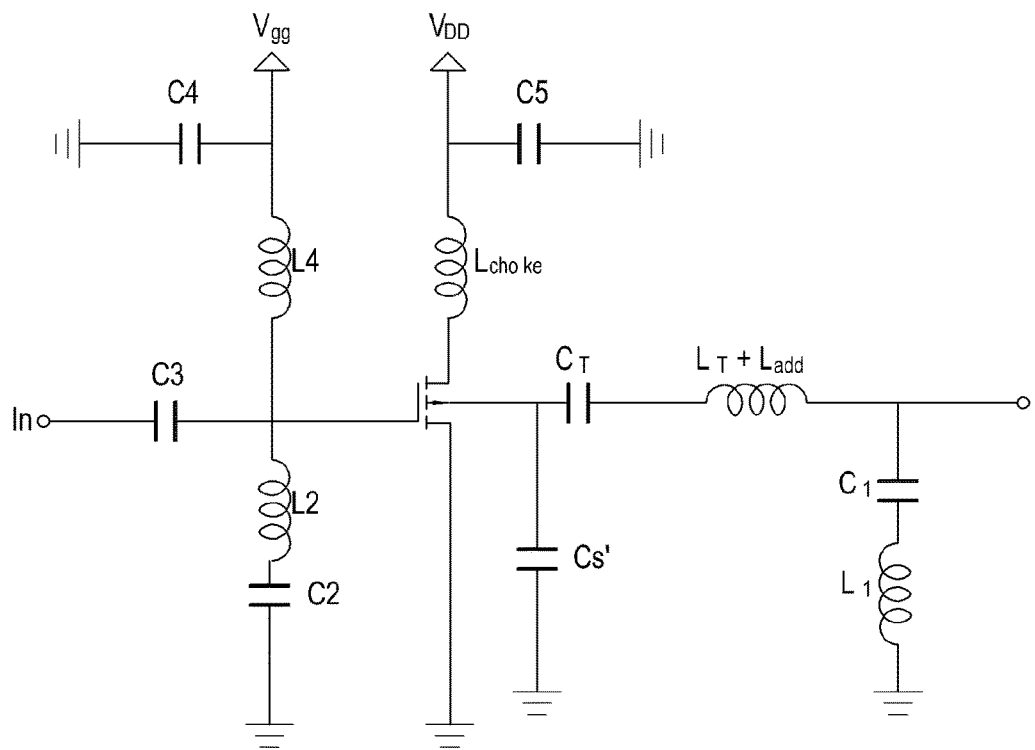
FIG. 14 is a circuit diagram of a final equivalent circuit of a Class-E amplifier including matching circuits of FIGS. 12 and 13.
Figure 15:
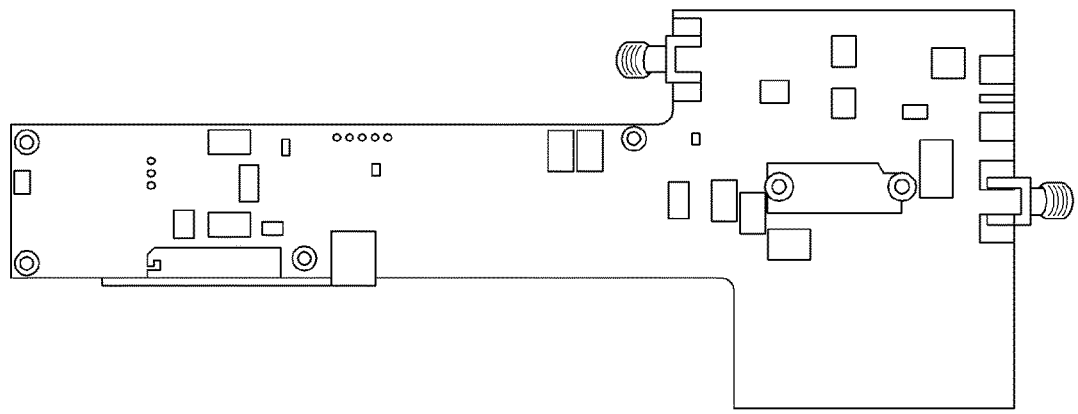
FIG. 15 is a view showing a proto type of a Class-E amplifier manufactured according to the present invention.

FIG. 14 is a circuit diagram showing a final-equivalent circuit of the Class-E amplifier 13-1 including the above-described matching circuits. Respective components included in the circuit of FIG. 14 may have, for example, values listed in the following Table 3. FIG. 15 is a view showing a proto type of the Class-E amplifier 1301 manufactured according to the present invention.

TABLE 3

| Component | Value |
| --- | --- |
| FET | Freescale, MRF6S9125NRB1 |
| CT | 3.8 nF |
| C1 | 603 pF |
| C2 | 100 nF |
| C3 | 112 pF |
| C4, C5 | 22 uF |
| Cs | 230 pF |
| LT + Ladd | 1 uH |
| L1 | 228 nH |
| L2 | 1350 nH |
| L3 | 22 uH |
| L4 | 10 uH |

(Power Tracking SMPS)

Figure 16:
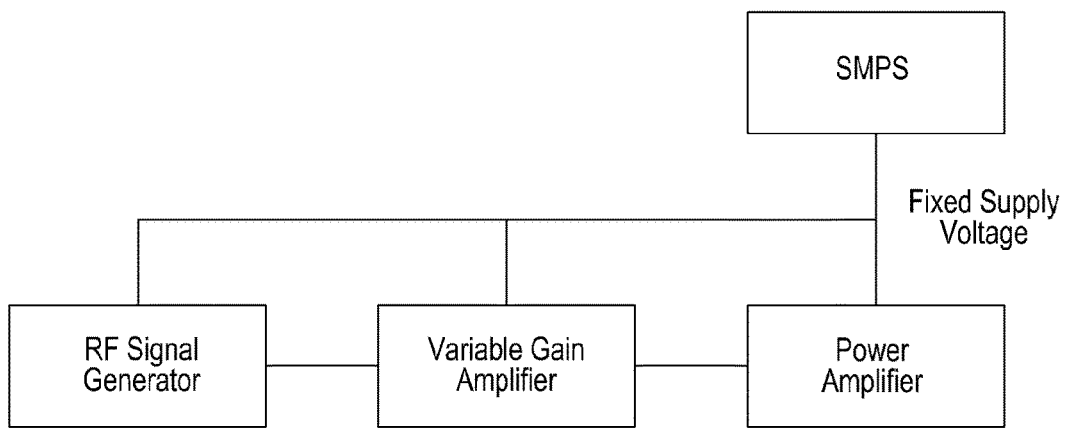
FIG. 16 is a block diagram of a general transmitter.

FIG. 16 is a block diagram of the general transmitter 10. Referring to FIG. 16, the transmitter 10 includes a Radio Frequency (RF) signal generator, a variable gain amplifier, and a power amplifier, and may be supplied with a fixed supply voltage from the system unit 30, e.g., the SMPS.

The Tx controller 15 of the transmitter 10 adjusts an input level of the Class-E amplifier 13-1 to meet an output power required by the receiver 20. A fixed supply voltage output from the SMPS is provided to the power amplifier. The maximum efficiency of the transmitter 10 is generally obtained around the region of the maximum output power. In addition, the transmission efficiency falls rapidly in the region of low output power.

Figure 17:
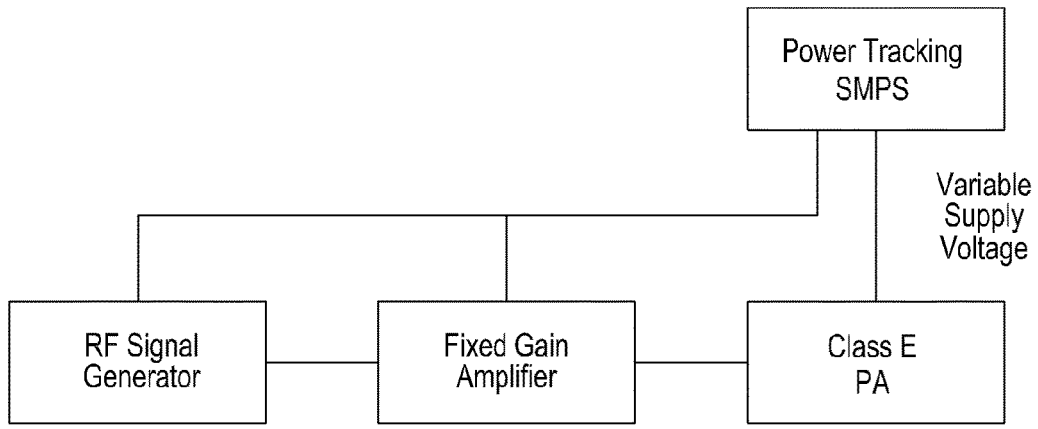
FIG. 17 is a block diagram showing a structure of a transmitter including a power tracking Switching Mode Power Supply (SMPS)

To overcome this problem, in the present invention, the transmitter 10 may include a power tracking SMPS to maintain high efficiency over all range of the output power, as shown in FIG. 17. Referring to FIG. 17, the transmitter 10 includes an RF signal generator, a variable gain amplifier, and a Class-E PA, and may be provided with a fixed supply voltage from the power tracking SMPS. The output power of the transmitter 10 depends on the number of receives 20 which are supplied with power from the transmitter 10.

Figure 18:
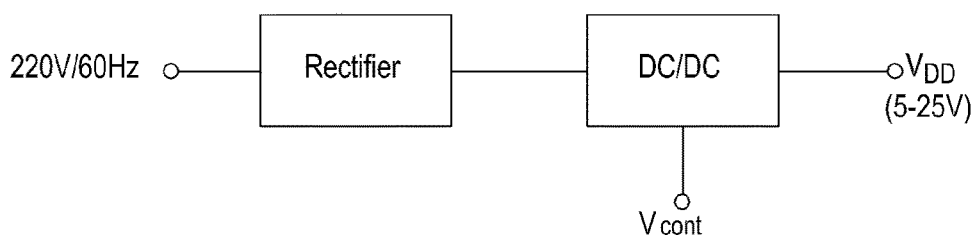
FIG. 18 is a block diagram showing a structure of a power tracking SMPS shown in FIG. 17.

FIG. 18 is a block diagram showing a structure of the power tracking SMPS shown in FIG. 17. Referring to FIG. 18, the power tracking SMPS may include a rectifier and a DC/DC converter. Referring to FIG. 18 for description, a 220V DC voltage of 60 Hz is input to the rectifier and is converted into an AC voltage. The converted AC voltage is input to the DC/DC converter and is output after being converted back into a DC voltage. In FIG. 18, the voltage output from the DC/DC converter is $V_{DD}$ which is 5-25V.

Figure 19:
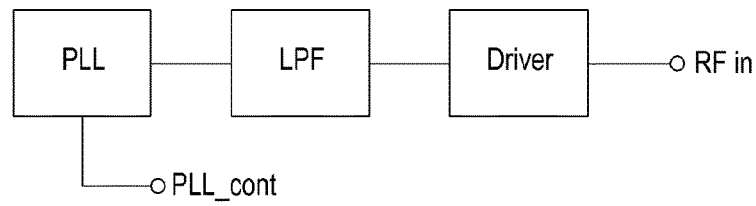
FIG. 19 is a block diagram showing a structure of a frequency generator for generating a frequency of 6.78 MHz in a transmitter according to the present invention.

FIG. 19 is a block diagram showing a structure of a frequency generator for generating a 6.78 MHz frequency at the transmitter 10 according to the present invention. Referring to FIG. 19, the frequency generator includes a Phase Locked Loop (PLL) block, a Low Pass Filter (LPF), and a driver. The frequency of a power signal generated at the PLL block is controlled by a 'PLL_cont' signal sent at the Tx controller 15. The RF signal generated in the PLL block is filtered by the LPF having a 10 MHz cutoff frequency to reduce the harmonics and noises. The filtered RF signal is input to the driver. To allow the power amplifier, that is, the Class-E amplifier 13-1 to output sufficient current, sufficient current may be provided to the driver.

(Protection Method for Transmitter or Receiver in Power Transmission System)

The power transmission system according to the present invention transmits and receives power by using the resonant phenomenon between the transmitter 10 and the receiver 20. However, the resonant frequency of the power transmission system may be affected by an unwanted accident or abnormal operation and it may make the power transmission system fall into a fatal problem. For example, the variation of coupling characteristic due to entry of inappropriate objects or misplacement on the interface (e.g., a charging pad (not shown)) of the transmitter 10 degrades the efficiency of power transmission. Since the transmitter 10 has to increase the input power to maintain the output power, the driving voltage of a transistor included in the power amplifier, that is, the Class-E amplifier 131 should be increased. As the driving voltage increases, the transistor may reach a breakdown voltage. As a result, the increased voltage on transistor may cause fatal problems to the transmitter 10 due to over voltage, over current and over temperature. Therefore, in the present invention, a system protection function for protecting the power transmission and reception system is provided.

Figure 20:
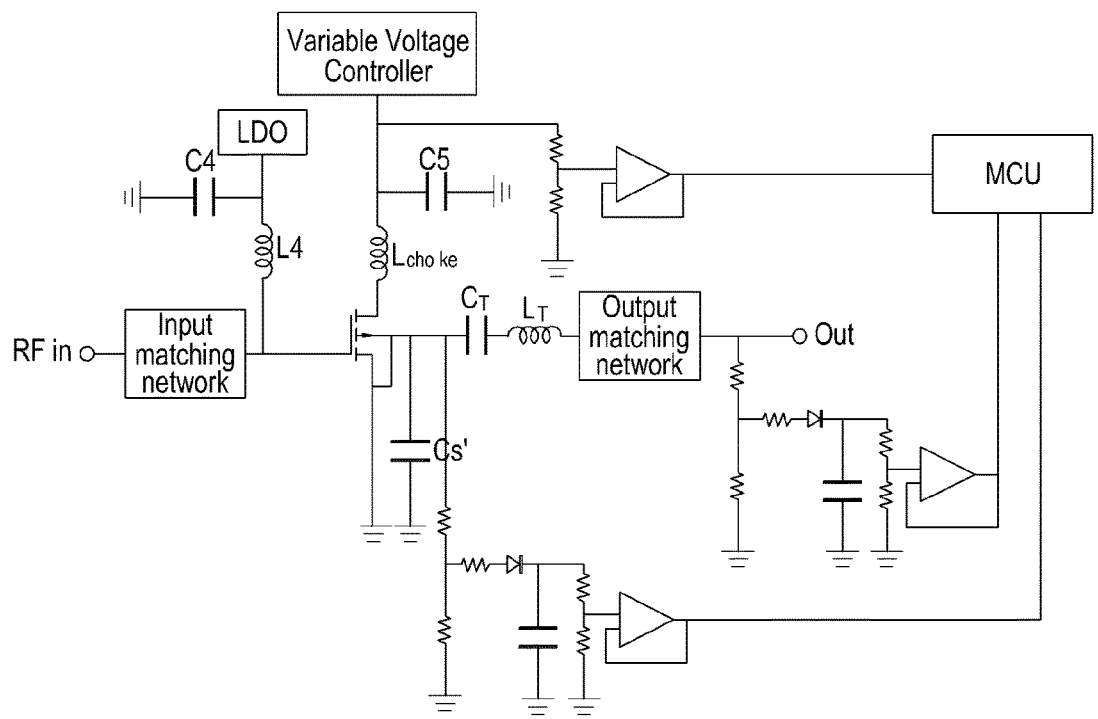
FIG. 20 is a circuit diagram showing an example of an over-voltage protection circuit in a transmitter according to the present invention.
Figure 21:
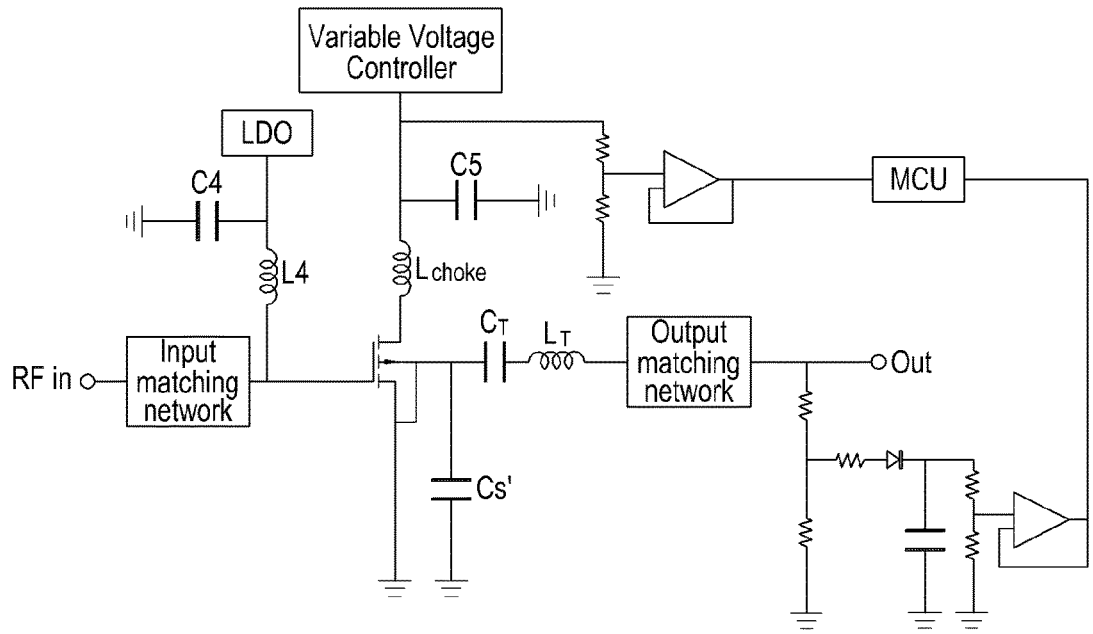
FIG. 21 shows a circuit for showing a basic operating principle of an over-voltage protection circuit.

FIG. 20 is a circuit diagram showing an example of an over-voltage protection circuit in a transmitter according to the present invention, and FIG. 21 shows a circuit for showing a basic operating principle of an over-voltage protection circuit.

Referring to FIG. 21, a DC bias voltage of an FET drain and an AC output voltage of a resonator will be described. The DC bias voltage and the AC output voltages are sampled by a high-impedance resistive divider without causing performance loss of the power amplifier. In case of the resonator voltage monitoring, the AC sampled output voltage is rectified to a DC voltage by a half rectifier. Two monitored voltages, that is, values of the DC bias voltage and the AC output voltage are transmitted to the Tx controller 15. Then, if these monitored voltage levels, that is, the voltage levels of the DC bias voltage and AC output voltage are higher than respective thresholds, protection is required. For OVP, the Tx controller 15 transmits a control signal for reducing a drain bias voltage of the FET to the SMPS. Then, the transmitter 10 starts to recharge and monitors the monitoring voltage levels if they exceed the respective thresholds. If the over-voltage occurs again, the Tx controller 15 may shutdown the operation of the transmitter 10.

Figure 22:
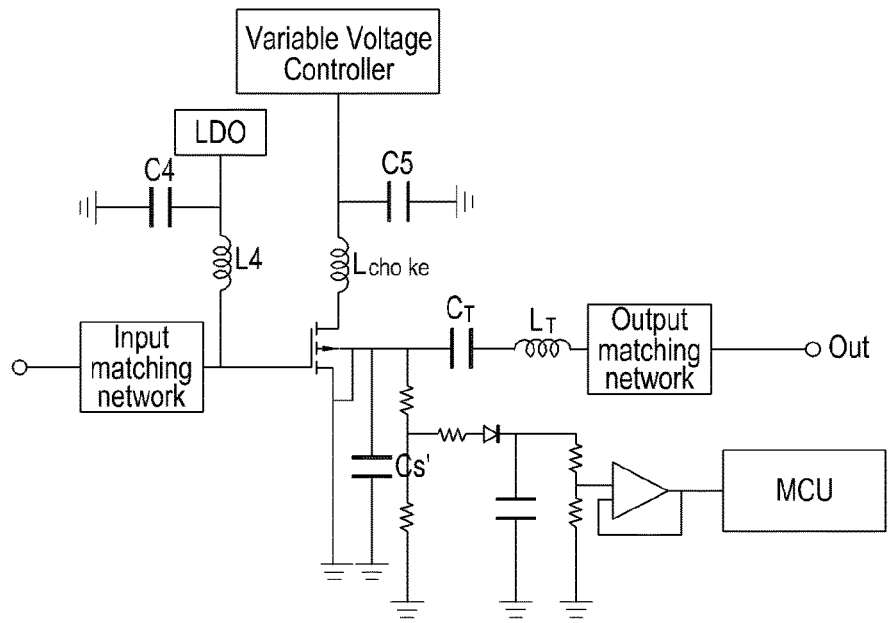
FIG. 22 is a circuit diagram showing another example of a protection circuit in a transmitter according to the present invention.

FIG. 22 is a circuit diagram showing another example of a protection circuit in a transmitter according to the present invention.

The circuit shown in FIG. 22 is an example of a protection circuit for protecting a circuit from an over-current. Since a power device, that is, the transmitter 10 has on-resistance, a small voltage is applied to the power device in a switch-on regime even in a high-efficient power amplifier at which the power device operates as a switch. The voltage level of the voltage applied to the power device, that is, the transmitter 10 is proportional to the level of a current flowing in the transmitter 10. Thus, the level of the voltage applied to the transmitter 10 increases when an over-current flows. Since the voltage level needs to be measured in the turn-on state in which the transmitter 10 is powered on, a switch for detecting the voltage level may be included in the current embodiment of the present invention. This switch is controlled by a synchronized pulse with an input signal, so that a desirable pulse on/off time can be controlled by a comparison device (not shown) having hysteresis. The comparison device may be implemented in a form included in the Tx controller 15.

Since a resistance in an on-mode is very small, an output voltage level of the switch is also low. Therefore, in the current embodiment, an amplifier for amplifying an output voltage of the switch may be further included. By using a signal amplified through the amplifier, that is, an output voltage of the switch, the Tx controller 15 determines whether protection of the circuit is needed. When a peak current level of the transmitter 10 increases, a peak voltage of the signal amplified by the amplifier, that is, the output voltage of the switch also increases so that the Tx controller 15 may set a protection level by setting an appropriate hysteresis threshold level.

Figure 23:
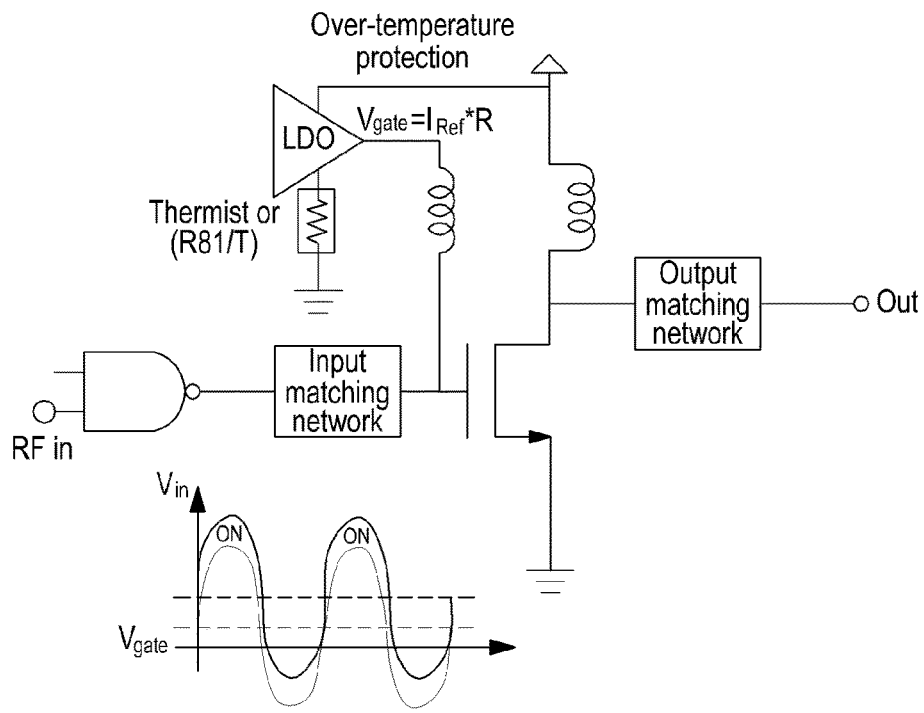
FIG. 23 is a circuit diagram of further another example of a protection circuit in a transmitter according to the present invention.

FIG. 23 is a circuit diagram of further another example of a protection circuit in a transmitter according to the present invention.

The circuit shown in FIG. 23 is an over-temperature protection circuit. Referring to FIG. 23, the circuit includes a temperature sensor (e.g., a thermistor) near the FET switch to detect an over-temperature of the transmitter 10. According to an embodiment, a TMP302B series temperature sensor switch may be used as the temperature sensor. When an ambient temperature goes up to a specific temperature, an output of the temperature sensor switch is switched to a low level from a high level. As such, when the output of the temperature sensor switch is switched to the low level, the Tx controller 15 recognizes that the over-temperature occurs. The Tx controller 15 applies an SMPS control signal to the voltage $V_{DD}$ corresponding to a command applied to the FET as an idle mode status voltage. When the voltage applied to the FET decreases, the Tx controller 15 may protect the transmitter 10 while reducing the over-temperature.

According to an embodiment, contaminants other than the transmitter 10 may come up. It is assumed that contaminants other than the transmitter 10 come up on the Tx resonator 11 of the wireless power transmission system and the Tx power is transmitted to the receiver 20 through the Tx resonator 11. When the power is transmitted in this way, Eddy current may be generated in the transmitter 10, such that the surface temperature of metal may increase and damage the system.

The transmitter 10 determines whether a material causing the Eddy current, that is, a metallic contaminant is a foreign substance or the Rx resonator 21 to control power transmission. When particular contaminants come up on the TX resonator 11, a voltage or a current inside the transmitter 10 may be changed from a varying resonance impedance due to the contaminant. After the transmitter 10 recognizes a change of the varying resonance impedance, the transmitter 10 sends a control signal for informing the change of the impedance to the receiver 20.

The receiver 20 receives a control signal and power transmitted from the transmitter 10, e.g., an electric signal. However, if the contaminant is a metallic contaminant, the transmitter 10 cannot transmit the control signal. The Tx controller 15 of the transmitter 10 may determine whether the contaminant disposed on the Tx resonator 11 is the receiver 20 or other substances.

According to an embodiment, a Q value and resonant frequency of the power transmission system 1 can be easily affected by metal which disturbs an electromagnetic field around a resonating conductor of the Tx resonator 11. In the case of the Tx resonator 11 of the transmitter 10, the disturbance of the electromagnetic field may degrade the performance of the Tx resonator 11 drastically. Therefore, it is essential to implement an electromagnetic shielding technique into the transmitter 10 or the receiver 20 to minimize the impact of an external environment on the transmitter 10.

(Power Transmission Efficiency (PTE))

To check the performance of the transmitter 10 in the power transmission system according to the present invention, a description will be made of simulation with respect to the power amplifier, which is the Class-E amplifier 13-1, the SMPS, and the Tx resonator 11.

Figure 24:
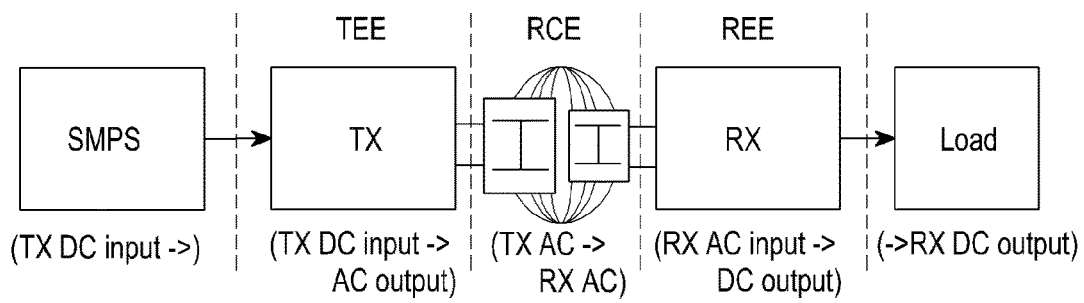
FIG. 24 is a view showing a ratio of a DC power of a receiver for receiving the DC power with respect to a DC power transmitted from a transmitter in a power transmission system according to the present invention.

FIG. 24 is a view showing a ratio of a DC power of the receiver 20 for receiving the DC power with respect to a DC power transmitted from the transmitter 10 in the power transmission system according to the present invention. The power transmitted by the transmitter 10 to the receiver 20 will be referred to as a 'DC transmission power', and the power actually received by the receiver 20 out of the DC transmission power will be referred to as a 'DC reception power'.

A Transmitter Electronic Efficiency (TEE) of the transmitter 10 may be defined as a ratio of an AC output of the transmitter 10 with respect to a Dc input (Tx DC input) input to the transmitter 10 from the SMPS. Equation 12 provided below is intended to obtain the TEE.

A Resonance Coupling Efficiency (RCE) may be defined as the efficiency of resonant coupling between the Tx resonator 11 and the Rx resonator 21, that is, a ratio between an AC power (Tx AC) output from the Tx resonator 11 and an AC power (Rx AC) input to the Rx resonator 21. Equation 13 provided below is intended to calculate the RCE. A Receiver Electronic Efficiency (REE) may be defined as a ratio between an AC power (Rx AC input) input from the receiver 20 and a DC power (DC output) output from the receiver 20. Equation 14 is intended to obtain the REE. A Power Transfer Efficiency (PTE) is a function of multiplication of TEE, RCE, and REE, as shown in Equation 15.

$$TEE = \frac{AC\ output\ power\ @\ TX}{DC\ input\ power\ @\ TX} \qquad (12)$$

$$RCE = \frac{AC\ input\ power\ @\ RX}{AC\ input\ power\ @\ TX} \qquad (13)$$

-continued $$REE = \frac{DC\ output\ power\ @\ RX}{AC\ input\ power\ @\ RX} \quad (14)$$

$$PTE = TEE \times RCE \times REE \quad (15)$$

Figure 25:
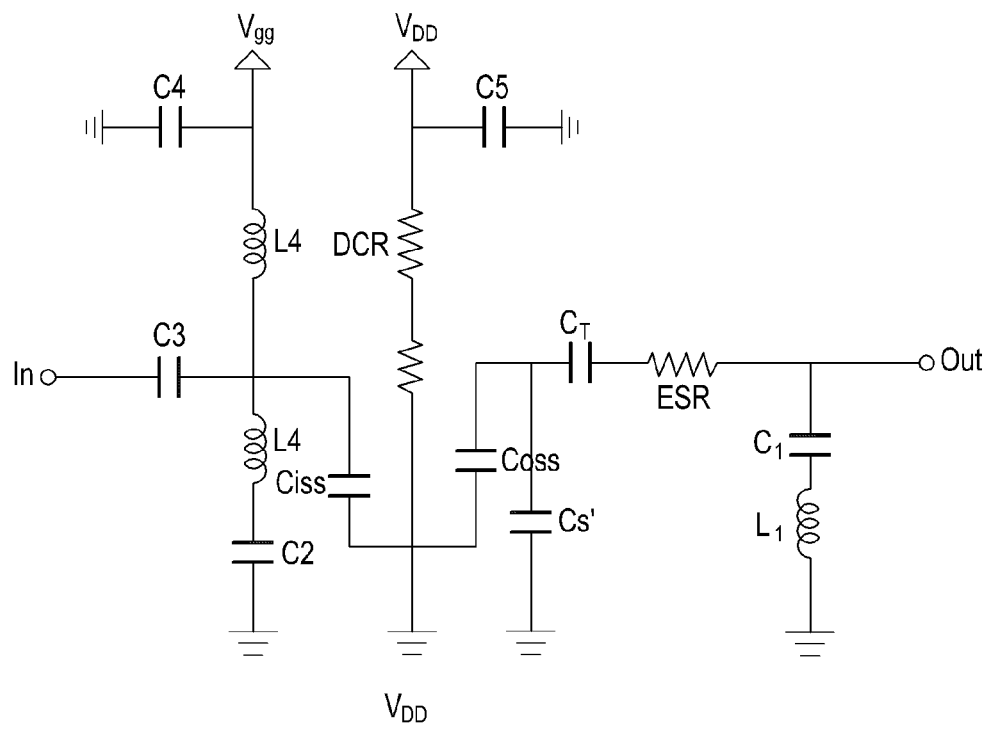
FIG. 25 is a circuit diagram for describing a loss generated in a transmitter.

As an implementation result of the transmitter 10, even if the power amplifier, that is, the Class-E amplifier 13-1 has an efficiency of 88%, a slight loss still occurs. FIG. 25 is a circuit diagram for describing a loss occurring in the transmitter 10.

Input and output capacitances have been removed by a resonant gate derive and Zero-Voltage Switching (ZVS), but as shown in FIG. 25, a loss caused by the DCR of the choke inductor (Lchoke), a resistance $R_{DS}$ between the drain and the source of the transistor, and the Electron Spin Resonance (ESP) of the inductor L is not removed. FIG. 25 is a circuit diagram for describing a remaining loss occurring in the power amplifier, and Table 4 shows the efficiency of the Power Amplifier (PA), that is, the Class-E amplifier 13-1 corresponding to the Q value $L_T$.

TABLE 4

| Q Value $L_T$ | PA Efficiency |
| --- | --- |
| Ideal Value | 86% |
| 70 | 82% |
| 30 | 78% |
| 10 | 66% |

When only $R_{DS}$ is considered, then the efficiency of the Class-E amplifier 13-1 may reach up to 95%. However, if an Electrical Series Resistance (ESR) is also included, an efficiency of up to about 86% can be achieved. To further increase the efficiency of the power amplifier, the change of the power amplifier's efficiency according to the Q value $$Q = \frac{\omega L}{ESR}$$

may be seen.

Figure 26:
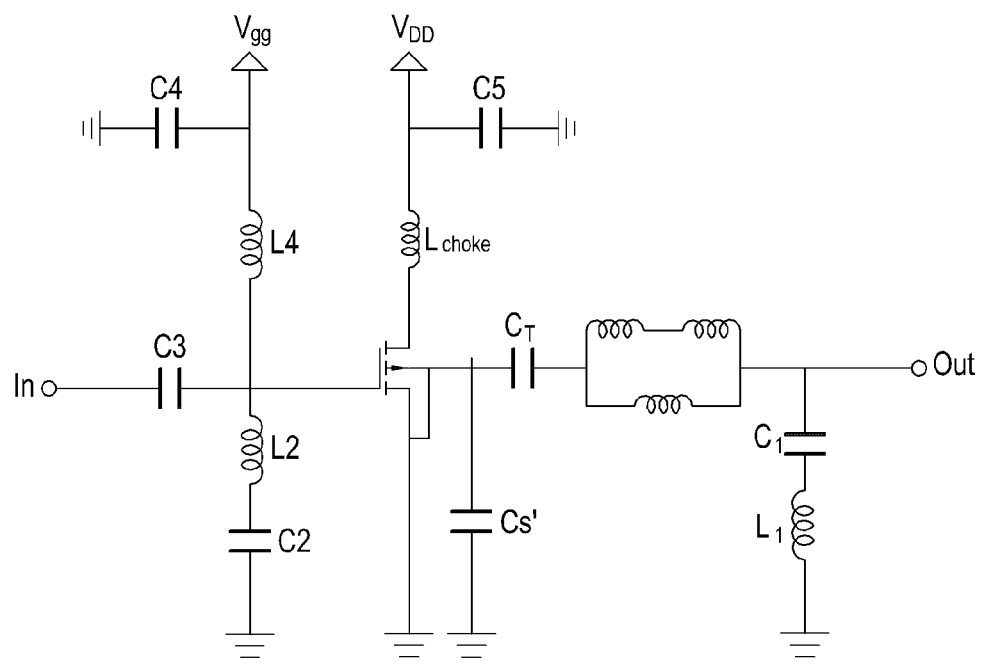
FIG. 26 is a view showing a circuit in which inductors (LP1, LP2, and LP3) are connected in parallel to increase a Q value.
Figure 27:
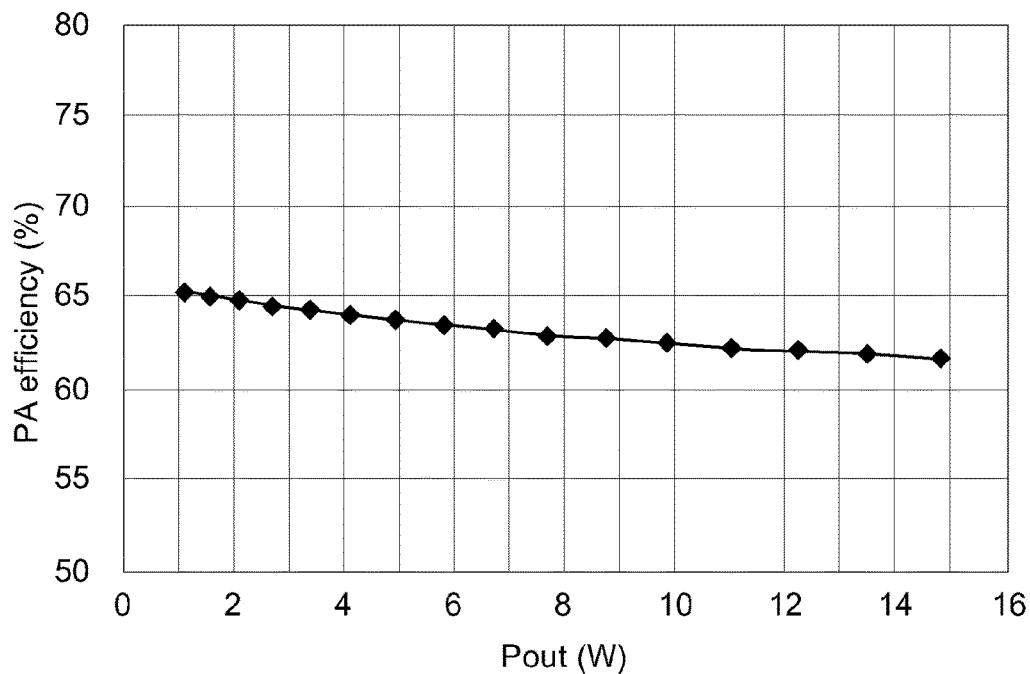
FIG. 27 is a graph showing a level of an output power per power amplifier efficiency.

As the Q value increases, the power amplifier may have higher efficiency. To increase the Q value of a serial inductor while maintaining a small thickness (less than 15 mm), high-Q inductors may be connected in parallel as shown in FIG. 26. FIG. 26 shows a circuit in which inductors $L_{P1}$, $L_{P2}$, and $L_{P3}$ are connected in parallel to increase Q values. As shown in FIG. 26, when the inductors $L_{P1}$, $L_{P2}$, and $L_{P3}$ are connected in parallel as shown in FIG. 26, the ESR may be reduced and the Q value may be increased by about 5. FIG. 27 is a graph showing a level of an output power per efficiency of the power amplifier.

When the parallel inductors $L_{P1}$, $L_{P2}$, and $L_{P3}$ as shown in FIG. 26 are applied to the power amplifier, a loss originating from the ESR is reduced, such that the efficiency of the power amplifier may be increased from 88% to 89%.

Meanwhile, since the Class-E amplifier 13-1 is considered as a 16Ω load in SMPS's perspective, the efficiency of the SMPS according to an output power with a 16Ω impedance at an output load may be estimated. For example, the SMPS has an efficiency of about 67% at a low-mode operation regime in which a voltage of 9V is input. In a high-mode operation regime in which 15V is input, the SMPS may have an 80% SMPS efficiency.

Table 5 shows an efficiency of the SMPS according to the output power $V_{DD}$.

TABLE 5

| $V_{DD}$ (V) | IDD(A) | PAC(W) | Efficiency (%) |
| --- | --- | --- | --- |
| 8 | 0.501 | 6.3 | 63.61 |
| 9 | 0.569 | 7.63 | 67.11 |
| 10 | 0.634 | 9.18 | 69.07 |
| 11 | 0.697 | 10.84 | 70.72 |
| 12 | 0.761 | 12.66 | 72.13 |
| 13 | 0.825 | 14.47 | 74.11 |
| 14 | 0.887 | 16.18 | 76.74 |
| 15 | 0.95 | 17.76 | 80.23 |

Figure 28:
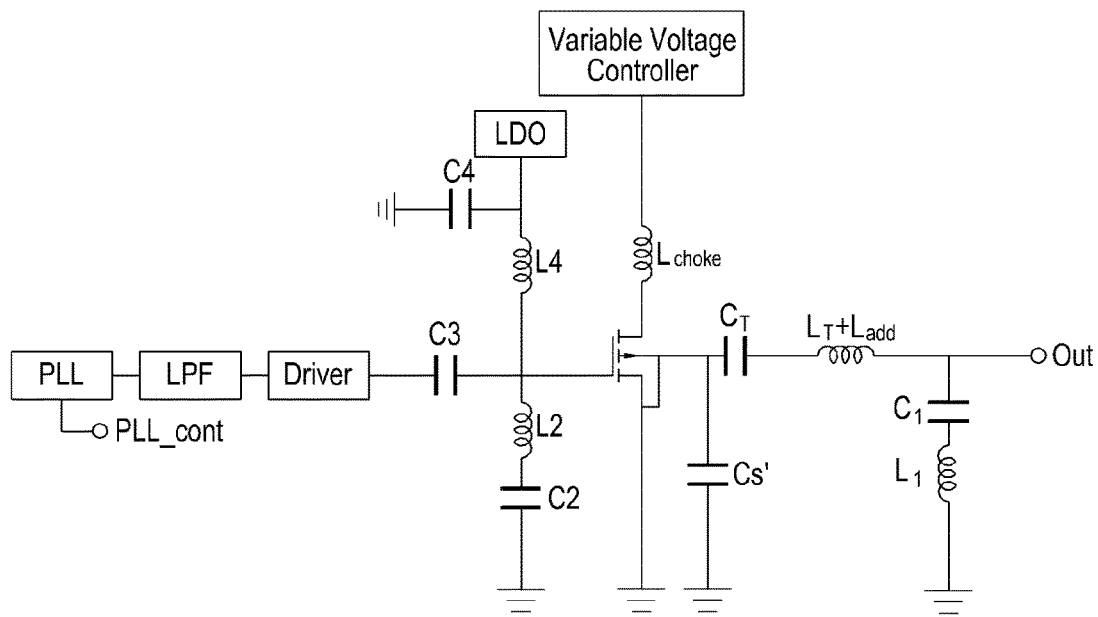
FIG. 28 is a circuit diagram showing a circuit for measuring an efficiency of a transmitter including a 6.78 MHz frequency generator and a power amplifier.
Figure 29:
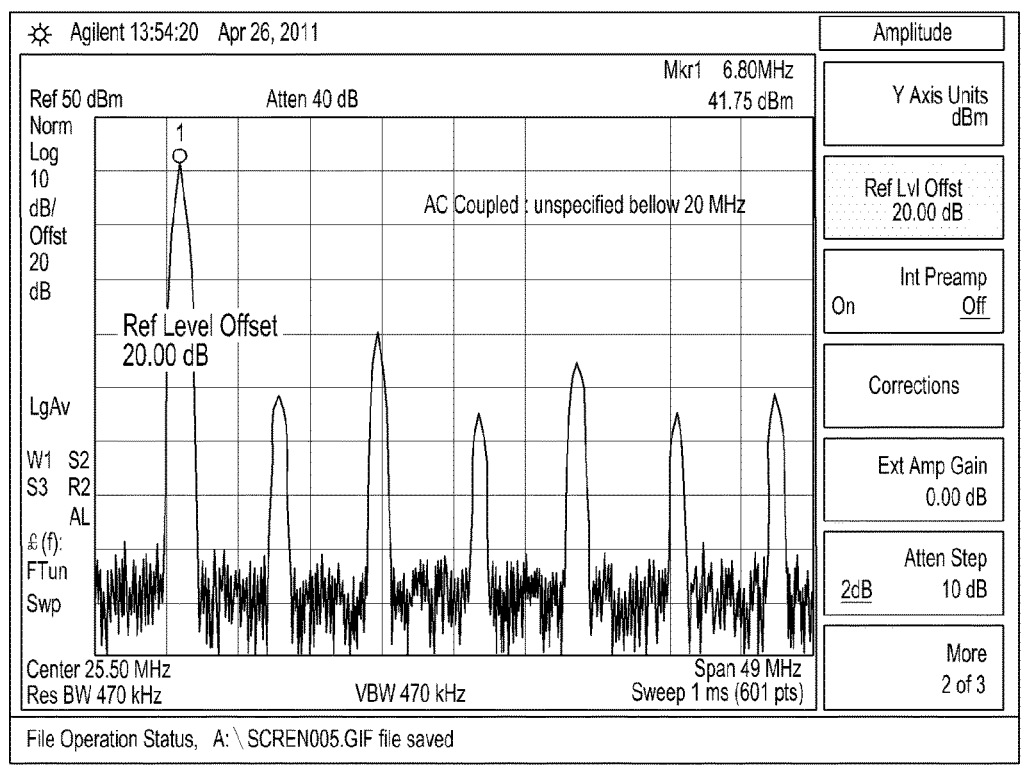
FIG. 29 is a graph showing an amplitude of a frequency generated in a power amplifier shown in FIG. 28.

FIG. 28 is a circuit diagram showing a circuit for measuring an efficiency of the transmitter 10 which includes a frequency generator at 6.78 MHz and a power amplifier, and FIG. 29 is a graph showing an amplitude of harmonics generated in the power amplifier shown in FIG. 28.

The circuit diagram shown in FIG. 28 has an efficiency of about 65% within an output power range of 3-10 W. FIG. 29 shows an amplitude of output harmonics of ×2 or ×3 frequencies with respect to a center frequency of 6.78 MHz. The output harmonics are −52.51 dBc at $2^{nd}$ harmonic and −35.29 dBc at $3^{rd}$ harmonic.

As described above, the transmitter 10 according to the present invention may have an SMPS efficiency of about 67% at the low-mode operation regime (9V input voltage) and an SMPS efficiency of about 80% at the high-mode operation regime (15V input voltage). As such, there are 2 operating modes in the current transmitter 10, i.e., low/high-mode operations. Table 6 summarizes input voltage/input current/input power on the transmitter 10 in the low mode or high mode according to the present invention.

TABLE 6

| Mode | Input Voltage | Input Current | Input Power |
| --- | --- | --- | --- |
| Low Mode | 9 V | 0.569 A | 7.63 W |
| High Mode | 15 V | 0.95 A | 17.76 W |

Figure 30A:
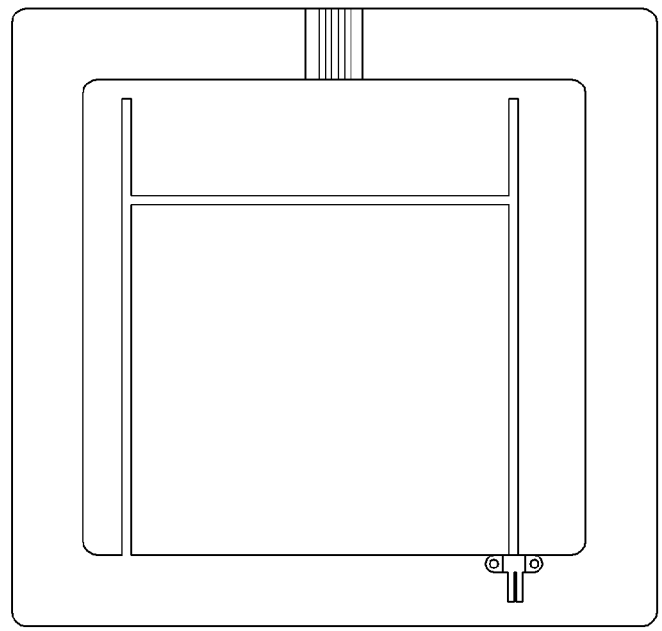
FIGS. 30A and 30B are views showing resonators included in a transmitter and a receiver implemented according to the present invention.
Figure 30B:
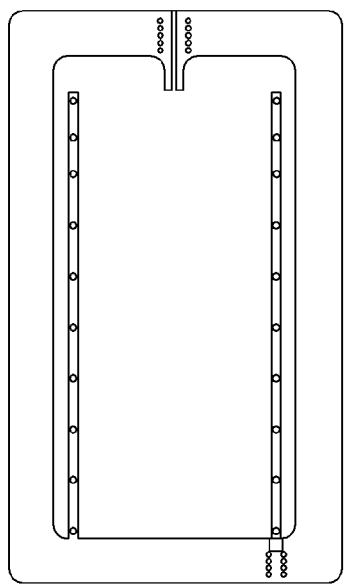

FIGS. 30A and 30B are views showing the resonators 11 and 21 included in the transmitter 10 and the receiver 20 implemented according to the present invention. Table 7 shows dimensions of the transmitter 10 and the receiver 20 shown in FIGS. 30A and 30B, respectively.

TABLE 7

| | Size (mm) | f1 (MHz) | f2 (MHz) | Q | f0 (MHz) | Cap (pF) |
| --- | --- | --- | --- | --- | --- | --- |
| 6 Sheet (0.53 mm) | 70 × 40 × 0.52 | 6.836 | 6.563 | 36.6 | 6.47 | 5130 |
| Transmitter | 200 × 200 × 2 | 6.828 | 6.842 | 488.6 | 6.84 | 1700 |

In both of the resonators 11 and 21 of the transmitter 10 and the receiver 20, capacitors are connected in parallel instead of using a single capacitor to reduce a total Electrical Series Resistance (ESR) value. In case of the receiver 20, a parallel conductor structure is used to reduce the resistance of the conductor. The size and characteristics of the resonators 11 and 21 of the transmitter 10 and the receiver 20 are as described in Table 7. f0 represents the resonant frequencies of the resonators 11 and 21. In case of f0 of a 3 dB bandwidth, lower and upper frequencies are defined as f1 and f2, respectively. Q values of the transmitter 10 and the receiver 20 are about '~900' and '~200', respectively. A Q factor may be measured when the receiver 20 inserted into the device is put on the Rx resonator 21.

FIG. 30B shows an example of the Rx resonator 21 in the receiver 20 which can be inserted into a mobile communication terminal. Referring to FIG. 30B, a shielding sheet (μ=130, μ"=1.15, loss tangent=0.00884) is placed below the Rx resonator 21. The size of the masking reagent is 2 mm larger than the Rx resonator (74 mm×44 mm). Also, the thickness of the masking reagent may be set to 1 mm.

In case of charging of the mobile communication terminal, it is desirable to measure coupling characteristics and transmission efficiency with a transmission distance of 3 mm or more between the transmitter 10 and the receiver 20 when the transmitter 10 and the receiver 20 are packed. Moreover, the mobile communication terminal may be implemented such that a communication module, a rectifier and a matching circuit are inserted in the mobile communication terminal.

Figure 31:
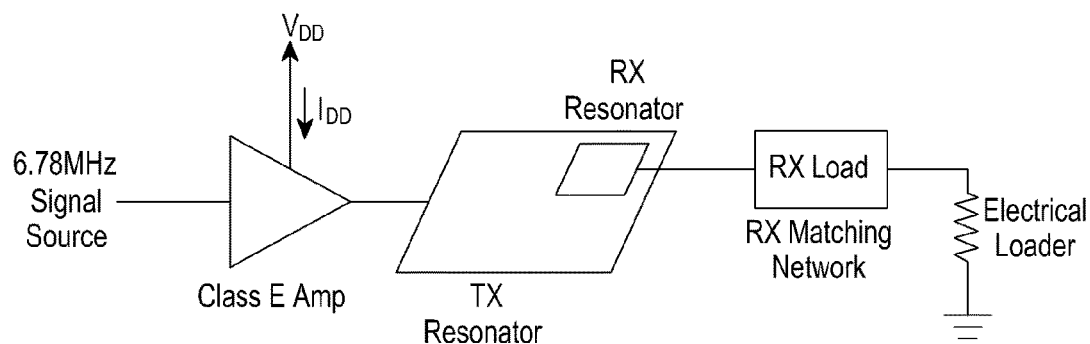
FIG. 31 is a view showing a measurement setup for measuring coupling characteristics and a transmission efficiency for a receiver which is a single receiver.

FIG. 31 is a view showing a measurement setup for measuring coupling characteristics and a transmission efficiency for the receiver 20 which is a single receiver. The Rx resonator 21 is coupled to the Tx resonator 11 connected with the Class-E amplifier 13-1 to which a signal source of 6.78 MHz, a voltage $V_{DD}$, and a current $I_{DD}$ are applied. To the Rx resonator 21 are connected an Rx load, which is an Rx matching network, and an electric loader. Such components may be inserted in the mobile communication terminal as shown in FIG. 32.

Figure 32:
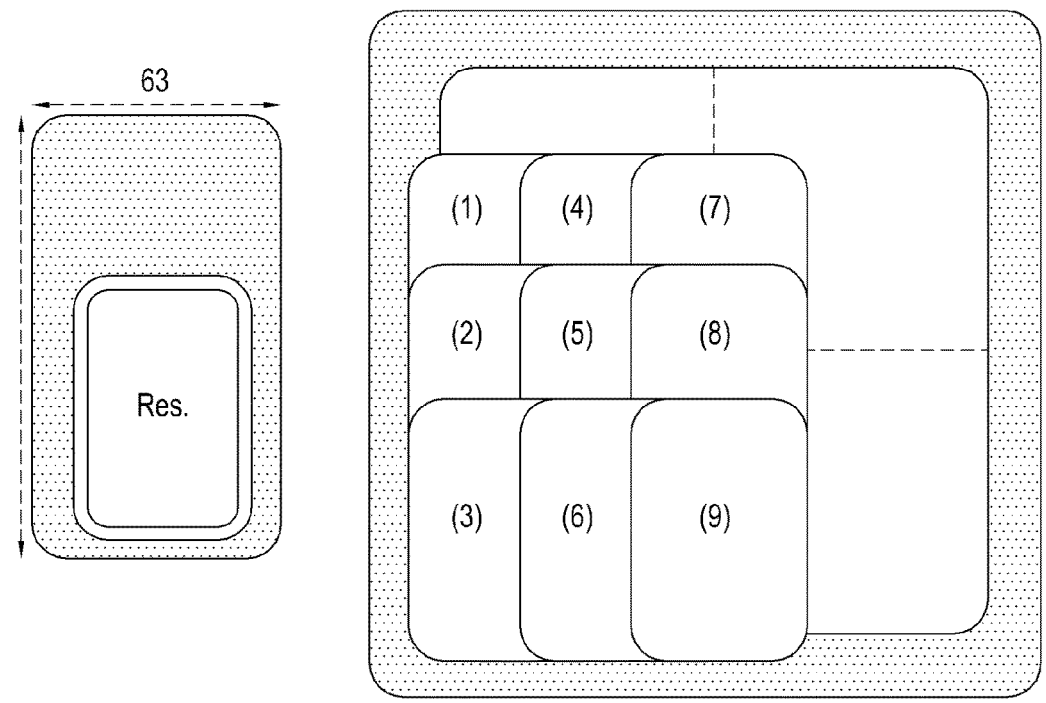
FIG. 32 is a view showing a measurement region for measuring a signal input from an Rx resonator.

FIG. 32 is a view showing a measurement region for measuring a signal input from the Rx resonator 21. To measure resonance energy at the Rx resonator 21, the Rx resonator 21 may be divided into two halves and measured after being divided into 9 regions 1 through 9 except for a symmetric portion like in FIG. 32. Considering the size of the mobile communication terminal and the location of the Rx resonator 21 installed in the mobile communication terminal, regions (5), (7) and (8) correspond to a center position at which the Rx resonator 21 of the receiver 20 may be located. Table 8 shows a simulated efficiency, a measured efficiency and a DC/DC efficiency considering power amplifier's efficiency at the Rx resonator 21. In the case of the receiver 20 which is a single receiver, an efficiency distribution is measured as 74.35%~91.83%.

TABLE 8

| | Measurement Efficiency (%) | |
|---|---|---|
| Location | TRX Resonator | System (PA + Resonator + RX) |
| (1) | 71.2 | 38.5 |
| (2) | 70.7 | 38.2 |
| (3) | 71.7 | 38.4 |
| (4) | 59.3 | 32.0 |
| (5) | 51.2 | 28.0 |
| (6) | 58.5 | 31.6 |

Figure 33:
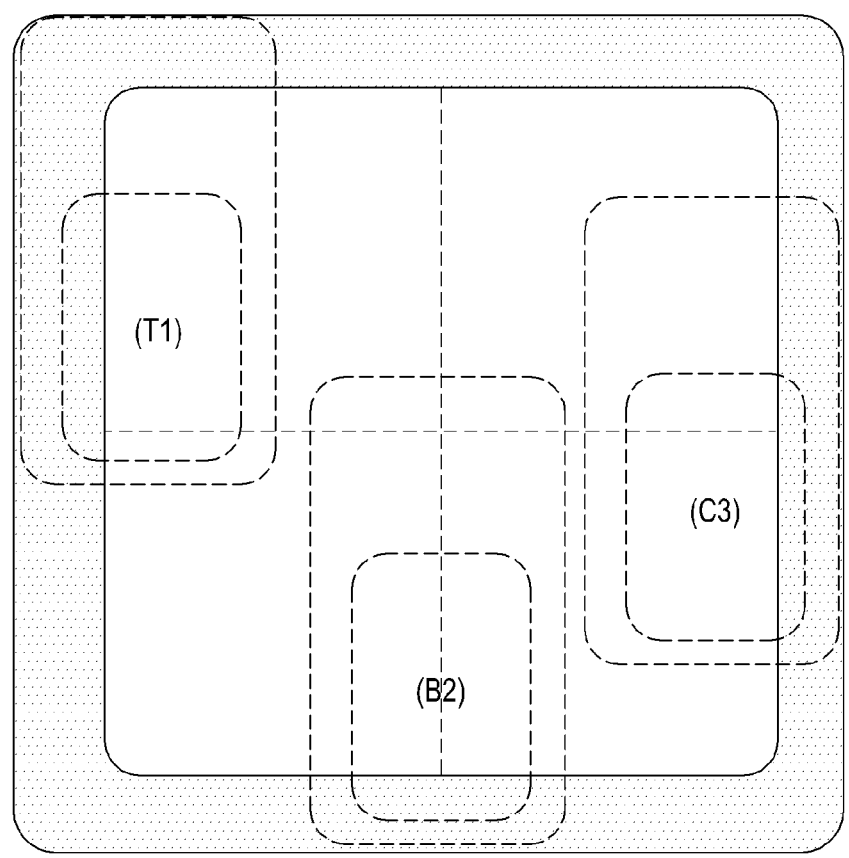
FIG. 33 is a view showing a measurement region for measuring a signal input to an Rx resonator included in each receiver for multiple receivers, i.e., multiple receivers.

FIG. 33 is a view showing a measurement region for measuring a signal input to the Rx resonator 21 included in each receiver 20 for multiple receivers 20, i.e., multiple receivers. Referring to FIG. 33, in the measurement region shown in FIG. 33, a description is made of a measurement location when 3 receivers are located symmetrically and asymmetrically. In FIG. 33, it is assumed that T indicates the top of the Tx resonator 11 included in the transmitter 10, C indicates the center, and B indicates the bottom. In FIG. 33, with respect to the Tx resonator 11, a mobile communication terminal located at T1, a mobile communication terminal located at B2, and a mobile communication terminal located at C3 are shown. In FIG. 33, locations from center to edge are represented by numbers from 0 to 7.

Table 9 shows power reception efficiency and power distribution of the receiver 20 in each measurement region in case of multiple receivers.

TABLE 9

| | Measurement Efficiency (%) (Resonator Efficiency, System Efficiency) | | | | | | | |
|---|---|---|---|---|---|---|---|---|
| Location | (T2) | (T3) | (C1) | (C2) | (C3) | (B1) | (B2) | (B3) |
| (T1) | (?, ?) | (50.5, 27.3) | (?, ?) | (?, ?) | (50.7, 27.4) | (?, ?) | (?, ?) | (51.5, 27.8) |
| (T2) | — | (44.4, 24.0) | (?, ?) | (?, ?) | (35.0, 18.9) | (?, ?) | (?, ?) | (24.8, 13.4) |
| (T3) | — | — | (52.8, 28.5) | (50.4, 27.2) | (?, ?) | (45.9, 24.8) | (40.1, 21.7) | (?, ?) |
| (C1) | — | — | — | (?, ?) | (56.1, 30.3) | (?, ?) | (?, ?) | (36.7, 19.8) |
| (C2) | — | — | — | — | (47.4, 25.6) | (?, ?) | (?, ?) | (43.0, 23.2) |
| (C3) | — | — | — | — | — | (42.9, 23.2) | (44.3, 23.9) | (?, ?) |
| (B1) | — | — | — | — | — | — | (?, ?) | (50.5, 27.3) |
| (B2) | — | — | — | — | — | — | — | (25.0, 13.5) |

As can be seen from Table 9, simulated and measured efficiencies for symmetric multi-receivers are 81.11%~90.53% and 80.24%~88.1%, respectively, which has a difference of 8% or less. As shown in Table 9, power is well distributed to 2 receivers 20. It can also be seen from Table 9 that in the case of asymmetric multi-receivers, a total efficiency is measured as 84%~86.59% and power is well distributed to 2 receivers 20 as well.

(Receiver)

Hereinafter, a power transmission system based on near-field magnetic induction between two resonators, that is, the Tx resonator 11 of the transmitter 10 and the Rx resonator 21 of the receiver 20 will be described. As shown in FIG. 1, the receiver 20 according to the present invention may include the Rx resonator 21, the AC/DC rectifier 23-1, the DC/DC converter 23-2, the Rx communication unit 24, and the Rx controller 25, and may further include a protection circuit.

(Rx Resonator of Receiver)

According to an embodiment of the present invention, the Rx resonator 21 may be implemented as a mu-negative transmission line resonator. An MNG TL resonator made of copper consists of an inside loop and an outside loop with a serial capacitor. Thus, the MNG TL resonator may control matching property by moving the position of the inside loop for better resonance efficiency.

Also, several tens of serial capacitors included in the MNG TL resonator may be used for a low equivalent serial resistance. Just like the Tx resonator 11 of the transmitter 10, the Rx resonator 21 of the receiver 20 may also have a magnetic dipole which has a dominant magnetic field in a near field to avoid a human body impact. Also, serial resonance which can easily tune frequency through a capacitance value is adopted for the Rx resonator 21 of the receiver 20.

Figure 34:
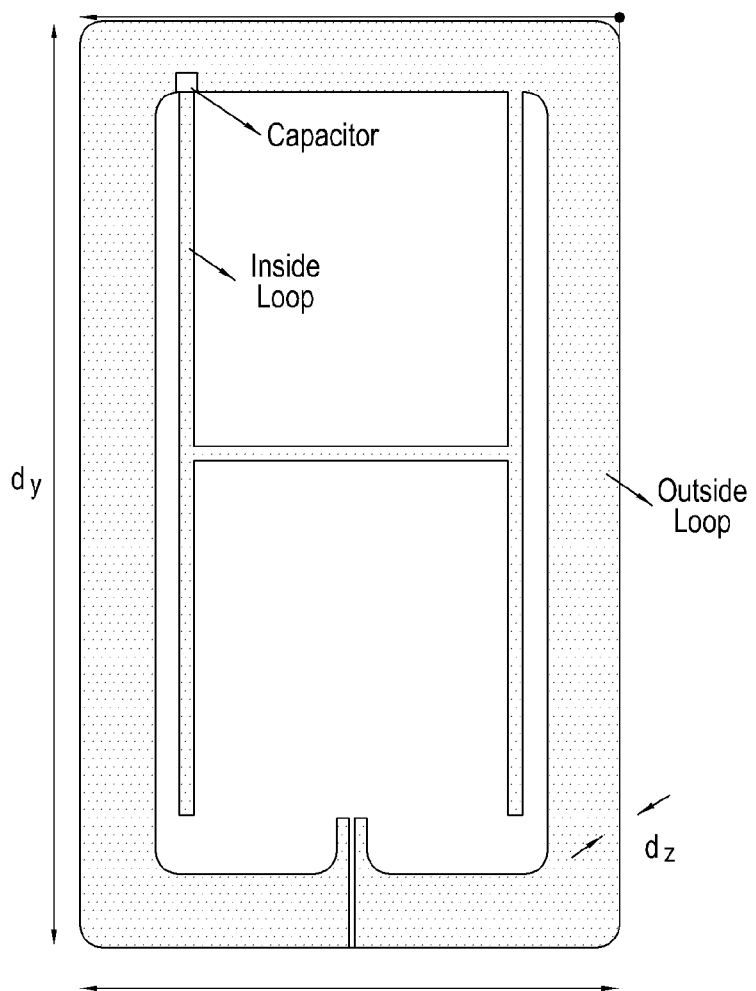
FIG. 34 is a view showing an MNG TL resonator implementable with an Rx resonator according to the present invention.

FIG. 34 is view showing an MNG TL resonator implementable with the Rx resonator 21 according to the present invention. To match resonant frequency and increase resonance efficiency, the MNG TL resonator may move the top portion of the 'inside loop' up and down.

Figure 35:
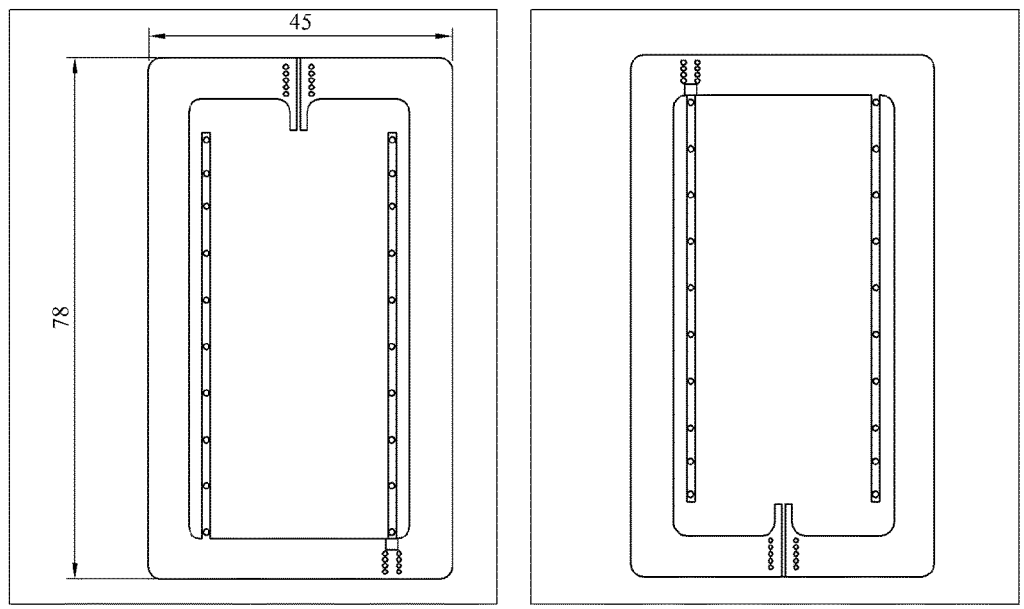
FIG. 35 is a view showing an MNG TL resonator implemented as an Rx resonator according to the present invention.

In Table 10, parameters for the MNG TL resonator are shown. FIG. 35 shows the MNG TL resonator implemented as the Rx resonator 21 according to the present invention.

TABLE 10

| Parameter | Symbol | Value |
| --- | --- | --- |
| Material | — | Copper (a 6-layer structure to reduce an ohmic loss of copper) |
| Width | dx | 78 mm |
| Length | dy | 45 mm |
| Thickness | dz | 0.53 mm |
| Inside loop width | di | 0.85 mm |
| Inside-outside loop space | dc | 2.1 mm |
| Capacitor | C | 1230 pF (20 capacitors or more parallelly connected) |

(AC/DC Rectifier of Receiver)

In order for the AC/DC rectifier 23-1 to have an efficiency of 90% or more in 1 MHz or higher RF bands, a diode basically included in the AC/DC rectifier 23-1 is preferably a Schottky diode. The Schottky diode has a low drop voltage and a fast speed because there is no electric charge accumulation by minority carriers since electric charges are carried by majority carriers. Therefore, resonance-type wireless power reception in a 1 MHz~15 MHz RF band preferably uses the Schottky diode which has a low drop voltage.

Figure 36:
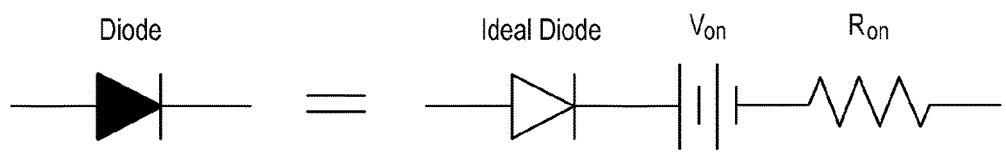
FIG. 36 is a view showing a Schottky diode and an equivalent circuit of the Schottky diode.

FIG. 36 is a view showing a Schottky diode and an equivalent circuit of the Schottky diode. The Schottky diode consists of a voltage $V_{on}$ which is needed to turn on an ideal diode and a resister $R_{on}$ of which characteristics change with a current applied to the Schottky diode. There are various Schottky diodes depending on manufacturers and manufacturing processes. To design a high-efficiency rectifier circuit according to the present invention, it is desirable to select a Schottky diode which has a drop voltage less than a certain value at a certain current level.

Figure 37A:
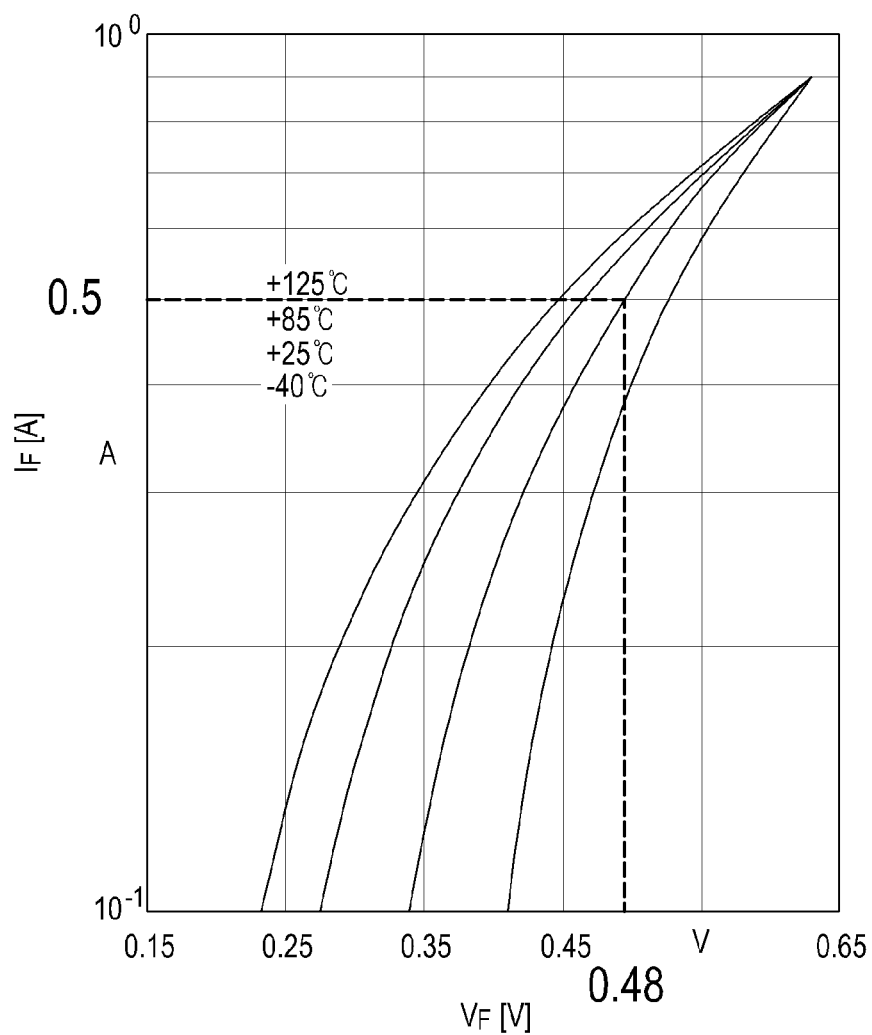
FIGS. 37A and 37B are graphs showing a current level and a voltage level of a Schottky diode which are available in a power transmission system.
Figure 37B:
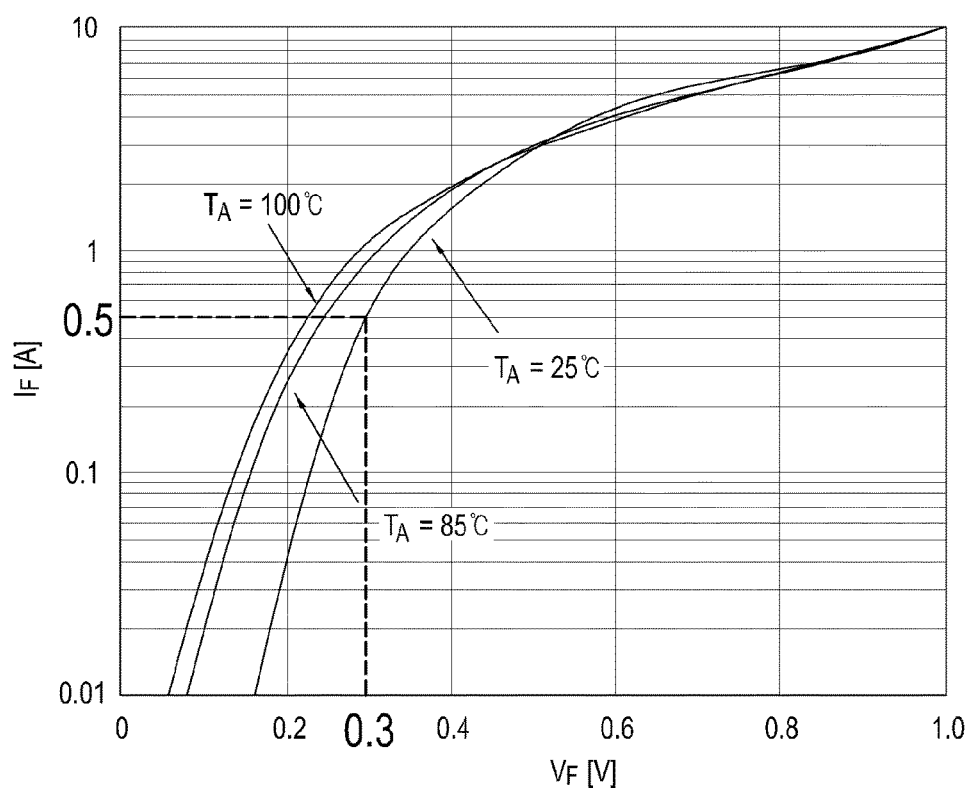

FIGS. 37A and 37B are graphs showing current levels and voltage levels of Schottky diodes which are available in a power transmission system. A Schottky diode shown in FIG. 37A (hereinafter, a first Schottky diode) and a Schottky diode shown in FIG. 37B (hereinafter, a second Schottky diode) have been manufactured by different companies.

Referring to FIGS. 37A and 37B, as a current level increases, a drop voltage also increases. FIG. 37A shows a curve $f_0$ of the first Schottky diode. Referring to FIG. 37A, when a current is 0.5 A, a drop voltage of the first Schottky diode becomes 0.48V. FIG. 37B shows a curve $f_0$ of the second Schottky diode. For the second Schottky diode, when a current is 0.5 A, a drop voltage of the second Schottky diode is 0.3V.

Figure 38:
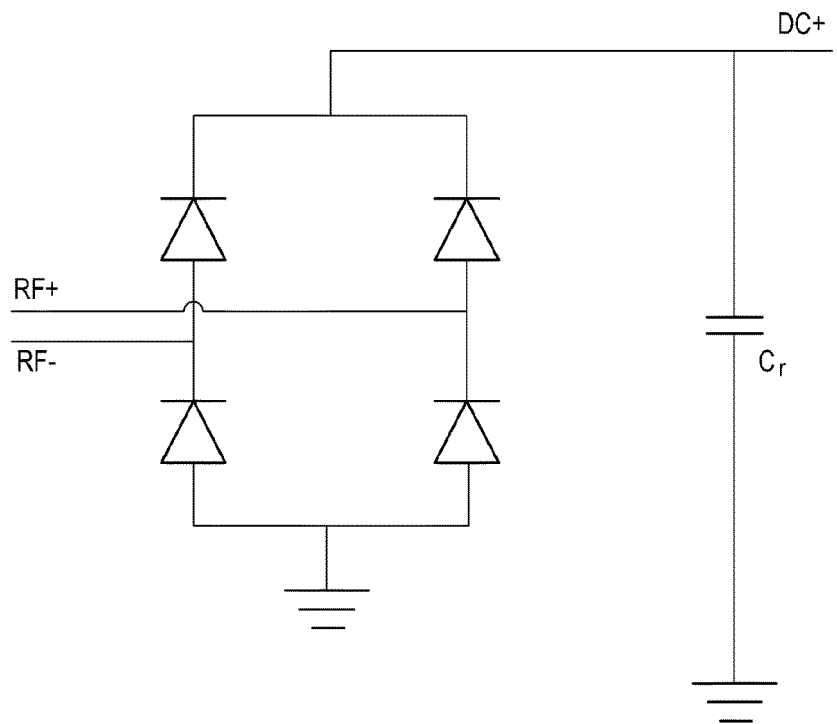
FIG. 38 is a circuit diagram of a full-wave bridge diode rectification circuit.

FIG. 38 is a circuit diagram of a full-wave bridge diode rectification circuit. The full-wave bridge diode rectification circuit has two diodes in one path, if the first Schottky diode is adopted for implementation, a drop voltage becomes 2×0.48=0.96V when a 0.5 A current flows. Therefore, power consumed at the first Schottky diode is 0.96V×0.5 A=0.48 W. Assuming that a 2.5 W power is consumed at a load and an efficiency of the receiver 20 is 80%, then an input RF power is 2.5÷0.8=3.125 W, so that a final efficiency of the full-wave bridge diode rectification circuit using the first Schottky diode can be given by:

$$\eta_{(a)rectifier} = \frac{|P_{RF}| - P_{2 \times Drop}}{|P_{RF}|} = \frac{3.125 - 0.48}{3.125} = 84.6\%. \quad (16)$$

By using the second Schottky diode, the full-wave bridge diode rectification circuit may be implemented. When the second Schottky diode is used, a drop voltage becomes 2×0.3=0.6V when a 0.5 A current flows. Therefore, power consumed at the second Schottky diode is 0.6V×0.5 A=0.3 W. Assuming that a 2.5 W power is consumed at a load and an efficiency of the receiver 20 is 80%, then an input RF power is 2.5÷0.8=3.125 W, so that a final efficiency of the full-wave bridge diode rectification circuit using the second Schottky diode can be given by:

$$\eta_{(b)rectifier} = \frac{|P_{RF}| - P_{2 \times Drop}}{|P_{RF}|} = \frac{3.125 - 0.3}{3.125} = 90.4\%. \quad (17)$$

It can be seen from Equations 16 and 17 that to implement the full-wave bridge diode rectification circuit having an efficiency of 90% or more, the use of the second Schottky diode is desirable.

Figure 39:
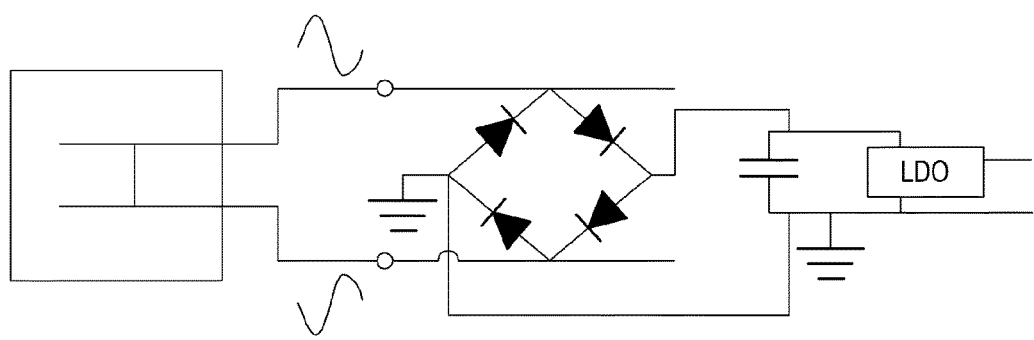
FIGS. 39 and 40 are circuit diagrams for testing a full-wave bridge rectification circuit by using a signal generator.
Figure 40:
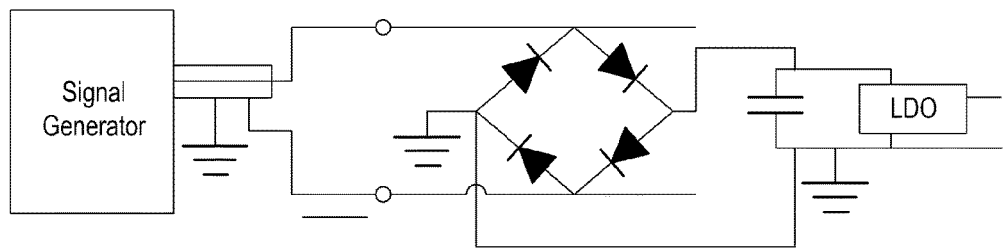

FIGS. 39 and 40 are circuit diagrams for testing a full-wave bridge rectification circuit by using a signal generator. When the full-wave bridge rectification circuit is tested by using a signal generator, as shown in FIG. 39, a signal from the signal generator is connected to the ground of the full-wave bridge rectification circuit and thus cannot work as a differential signal. Therefore, when the full-wave bridge rectification circuit is tested, a Zig measurement unit such as Balun is required. FIG. 40 shows a full-wave bridge rectification circuit including the Zig measurement unit.

Figure 41A:
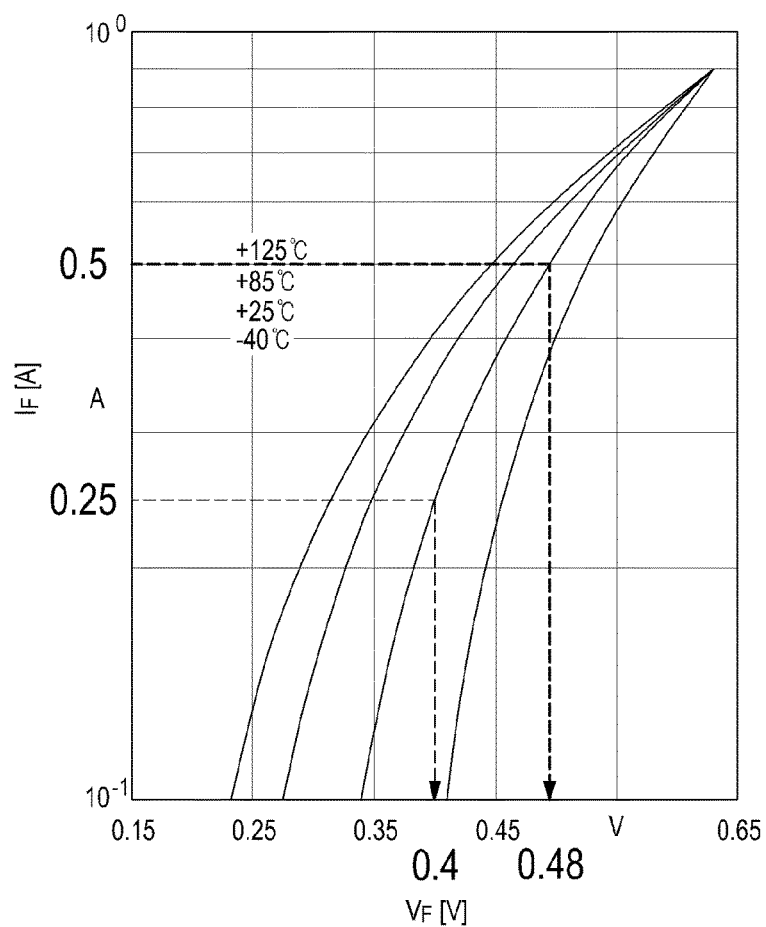
FIGS. 41A and 41B are graphs showing voltage levels and current levels of dual diodes manufactured by different companies.
Figure 41B:
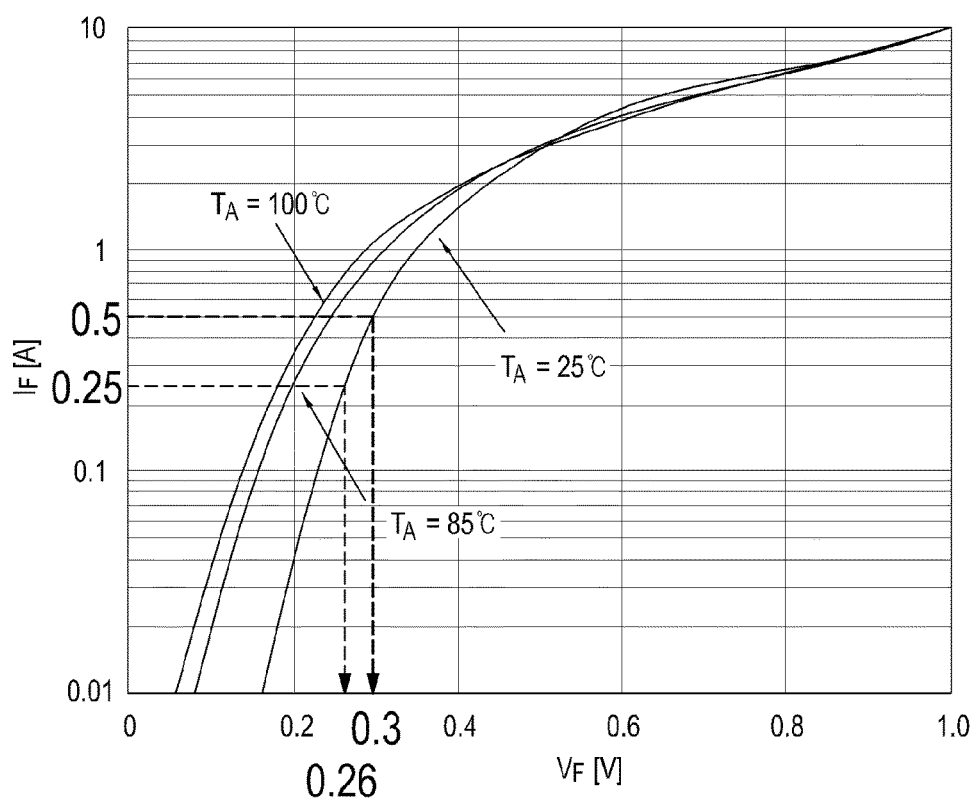

FIGS. 41A and 41B are graphs showing voltage levels and current levels of dual diodes manufactured by different companies. A Schottky diode shown in FIG. 41A will be referred to as a first dual diode and a Schottky diode shown in FIG. 41B will be referred to as a second dual diode. The first and second dual diodes reduce a drop voltage by separating a current into two paths by using parallel diodes, that is, dual diodes.

In case of the first Schottky diode, when a current is 0.5 A, a drop voltage of the first Schottky diode is 0.48V. When a current of 0.25 A is applied to each path in a dual diode full-wave bridge rectification circuit, if the first dual diode in which two diodes are connected in parallel is used, a drop voltage for each diode becomes 0.4V. Since there are 2 diodes connected in series in each path of the dual diode full-wave bridge rectification circuit, a total drop voltage is 2×0.4=0.8V. Therefore, power consumption in the diode is 0.8V×0.5 A=0.4 W. Assuming that a 2.5 W power is consumed at a load and an efficiency of the receiver 20 is 80%, then an input RF power is 2.5÷0.8=3.125 W, so that a total efficiency of the dual diode full-wave bridge rectification circuit using the first dual diode is given by:

$$\eta_{(a)rectifier2} = \frac{|P_{RF}| - P_{2 \times Drop}}{|P_{RP}|} = \frac{3.125 - 0.4}{3.125} = 87.2\% \quad (18)$$

$$\eta_{(a)rectifier2} = \frac{|P_{RF}| - P_{2 \times Drop}}{|P_{RP}|} = \frac{3.125 - 0.4}{3.125} = 87.2\%$$

Also, in case of the second Schottky diode, if a current is 0.5 A, a drop voltage of the second Schottky diode becomes 0.3V. If the second dual diode is used when a 0.25 A current flows in each path of the dual diode full-wave bridge rectification circuit, a drop voltage for each diode is 0.26V. Since there are 2 serial diodes in each path of the dual diode full-wave bridge rectification circuit, a total drop voltage becomes 2×0.4×0.26=0.52V. Therefore, power consumption in the diode is 0.52V×0.5 A=0.26 W. Assuming that a 2.5 W power is consumed at a load and an efficiency of the receiver 20 is 80%, then an input RF power is 2.5÷0.8=3.125 W, so that a total efficiency of the dual diode full-wave bridge rectification circuit using the second dual diode is given by:

$$\eta_{(b)rectifier\,2} = \frac{|P_{RF}| - P_{2\times Drop}}{|P_{RF}|} = \frac{3.125 - 0.26}{3.125} = 91.6\% \quad (19)$$

$$\eta_{(b)rectifier\,2} = \frac{|P_{RF}| - P_{2\times Drop}}{|P_{RF}|} = \frac{3.125 - 0.26}{3.125} = 91.6\%$$

As can be seen from above, when a rectifier is designed using a dual diode, an efficiency of the rectifier increases by 2~3%. It is assumed that parallel diodes in which 3 first Schottky diodes are connected in parallel are used. In case of the first Schottky diode, when there is a 0.5 A current, a drop voltage of the first Schottky diode becomes 0.48V. When a 0.17 A current flows in each path of the full-wave bridge rectification circuit, a drop voltage for each diode is 0.38V when 3 parallel diodes are used, so that a total efficiency of the full-wave bridge rectification circuit is given by:

$$\eta_{(a)rectifier\,3} = \frac{|P_{RF}| - P_{2\times Drop}}{|P_{RF}|} = \frac{3.125 - 0.38}{3.125} = 87.8\% \quad (20)$$

$$\eta_{(a)rectifier\,3} = \frac{|P_{RF}| - P_{2\times Drop}}{|P_{RF}|} = \frac{3.125 - 0.38}{3.125} = 87.8\%$$

It is assumed that parallel diodes in which 3 second Schottky diodes are connected in parallel are used. When there is a 0.5 A current, a drop voltage of the second Schottky diode becomes 0.3V. When a 0.17 A current flows in each path of the full-wave bridge rectification circuit, a drop voltage for each diode is 0.25V when 3 parallel diodes are used, so that a total efficiency of the full-wave bridge rectification circuit is given by:

$$\eta_{(b)rectifier\,3} = \frac{|P_{RF}| - P_{2\times Drop}}{|P_{RF}|} = \frac{3.125 - 0.25}{3.125} = 92\% \quad (21)$$

$$\eta_{(b)rectifier\,3} = \frac{|P_{RF}| - P_{2\times Drop}}{|P_{RF}|} = \frac{3.125 - 0.25}{3.125} = 92\%$$

As such, if parallel diodes in which 3 first or second Schottky diodes are connected in parallel are used, an efficiency increases by only 0.4~0.6% compared to a dual diode. Therefore, considering chip size and cost increment, using 3 parallel diodes may be inefficient. However, the above-mentioned values correspond to an ideal state, such that many parasitic factors have to be considered in actual measurement. Therefore, a total efficiency of the full-wave bridge rectification circuit using 3 parallel diodes may be different from the above-mentioned values.

Meanwhile, an active rectifier using a Metal-Oxide Semiconductor (MOS) transistor is used to increase a power efficiency in wireless power transmission systems such as Radio Frequency Identification (RFID). RFID alone needs a maximum of several tens of mW power, so that there is a hue power difference with wireless power transmission systems. However, except for an output power magnitude, advantages of the active rectifier having the MOS transistor can also be applied to wireless power transmission systems as well. The active rectifier having the MOS transistor can be divided into 2 categories. The one is using the MOS transistor as diode connection and the other is using the MOS transistor as a switch. If the MOS transistor having diode connection is used, the same problems occur as when a typical diode is used for the rectifier. Therefore, to increase power efficiency, the MOS transistor should be used as a switch.

Figure 42:
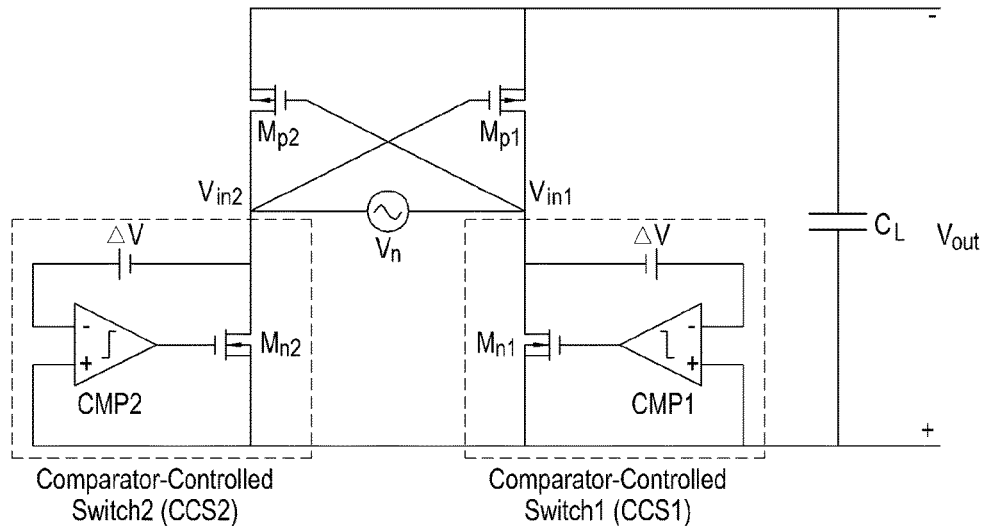
FIG. 42 is a circuit diagram showing an example of a full-wave active rectifier using a Metal-Oxide Semiconductor (MOS) transistor as a switch.

FIG. 42 is a circuit diagram showing an example of a full-wave active rectifier using a MOS transistor as a switch. When $V_{in}$ is larger than $|V_{tp}|$ or smaller than $-|V_{tp}|$, then $M_{p1}$ and $M_{p2}$ are turned on for preparing power supply for $V_{out}$. Assume that V=0, $V_{in}$ is larger than 0V and the voltage gets larger over time. When $V_{in}$ becomes larger than $|V_{tp}|$, $M_{p1}$ is turned on. Since $V_{in}$ is larger than 0V, $V_{in2}$ becomes smaller than 0V, so that an output of CMP2 becomes HIGH and $M_{n2}$ is turned on.

Now, it is assumed that $V_{in}$ decreases over time. If $V_{in}$ decreases and $V_{in2}$ becomes smaller than 0V, $M_{n2}$ should be turned off, and however, a finite time is required for the output of CMP2 to become 0V. Meanwhile, $M_{p1}$ and $M_{n2}$ are both turned on. Since $V_{in}$ is already decreasing from the peak value, it has a lower voltage than $V_{out}$.

As a result, a current flows from $V_{out}$ to $V_{in}$ so that a reverse leakage current is generated. This may decrease a power efficiency severely. To solve this problem, V is set higher than 0V so that $M_{n2}$ ($M_{n1}$) should be shut-off first. This can increase power efficiency; however, there are many restrictions to apply this method to a wireless power transmission system. Since the amplitude of a received voltage from a wireless power transmission system differs with various situations, it is desirable to set a different V value to remove a reverse leakage current.

A resonant rectifier is employed to increase power efficiency of the rectifier. The Class-E rectifier may be the most common type of a resonant rectifier. The resonant rectifier may be understood as a similar concept of the Class-E amplifier 13-1 at the transmitter side. To satisfy resonant conditions at a certain frequency, an input impedance of the resonant rectifier needs to be set. To set an input impedance, an inductor is necessary, but in case of a mobile system, a form factor may increase as an inductor's size becomes very large in an MHz band if the inductor is used.

There are a lot of types of MOS transistors; however, it is desirable to select a MOS transistor having a low $R_{on}$ resistance and a low input capacitance for a rectifier circuit of wireless power transmission.

(DC/DC Converter)

Figure 43:
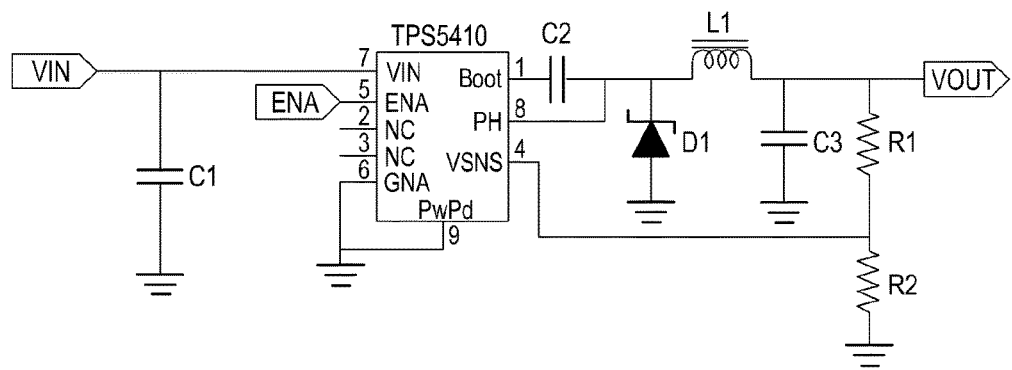
FIG. 43 is a circuit diagram showing a Direct Current (DC)/DC buck converter according to the present invention.

The DC/DC converter 23-2 uses a buck converter which is a switching regulator. If the DC/DC converter 23-2 is used as an LDO which is a linear regulator, then there is no problem for single device charging since the transmitter 10 transmits power which is fit for a load. However, when the transmitter 10 transmits a large power which accounts for several loads in case of charging of multiple devices, if power distribution is not perfect, then the LDO of one device may consume all the power, which is supposed to charge other devices, as a heat. FIG. 43 is a circuit diagram showing a DC/DC buck converter according to the present invention. The DC/DC buck converter of FIG. 43 optimizes charged devices, that is, the multiple receivers 20.

(Protection Circuit of Receiver 20)

Figure 44:
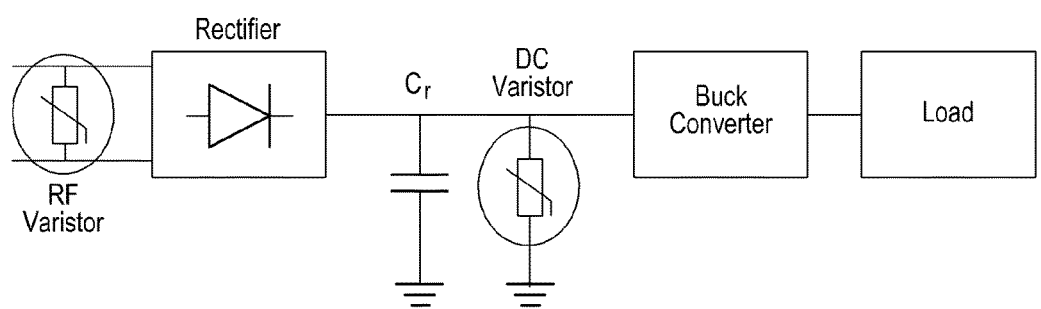
FIG. 44 is a view showing an example of a receiver and a protection device for detecting the receiver.

FIG. 44 is a view showing an example of the receiver 20 and a protection device for protecting the receiver 20. As shown in FIG. 44, an RF varistor and a DC varistor may be used for the protection device. A Schottky diode has a low drop voltage and a fast speed; however, it also has a low reverse breakdown voltage. For example, a reverse breakdown voltage of a Schottky Diode having a capacitance of 1 A is about 20~30V. In a regular charging regime, a load resistance is about 10 BΩ, so that an RF input voltage becomes around 20V, but at the beginning and end of a charging regime, a load impedance increases by a few KΩ so that an RF input voltage becomes larger than 30V, which can cause destruction of a Schottky Diode. Also, in case of charging of multiple devices, a large power is received temporarily, an RF input voltage becomes large so that a Schottky Diode may be destroyed. Therefore, an RF varistor is inserted across differential inputs, so that a Schottky Diode is protected from a surge voltage. The RF varistor has a breakdown voltage of around 27V and to prevent an impact in impedance, it is desirable to select an RF varistor having a capacitance of 30 pF or less.

Figure 45:
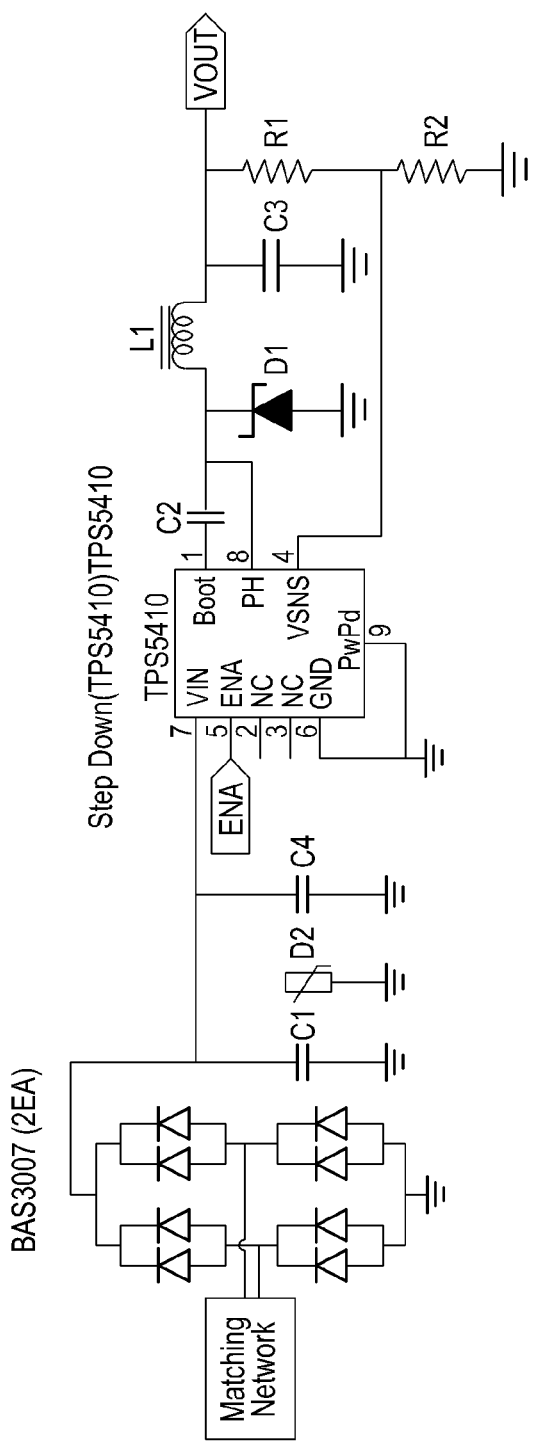
FIG. 45 is a view showing a circuit of an optimized receiver having a protection structure.

Also, it is desirable to use a small-size capacitor having a capacitance of 4 μF or more as a rectifier capacitor in a rectifier. However, a small-size ceramic capacitor has a small reverse breakdown voltage of about 20V. Since the RF varistor prevents a voltage of a certain level, the capacitor is not broken down by an input power. However, if the load is fully charged, an impedance becomes a few kΩ so that a surge voltage of higher than 30V is generated, which may destroy a capacitor. Therefore, a DC varistor having a breakdown voltage of about 18V may be used to protect the capacitor. FIG. 45 is a view showing a circuit of the optimized receiver 20 having a protection structure.

In case of the resonance-type wireless transmitter 10, when the Rx resonator 11 is inserted into the transmitter 10, if the conductor of the transmitter 10 and the Rx resonator 11 are closely located, eddy current which causes a reverse-phase magnetic field is generated, degrading power transmission efficiency. In addition, eddy current may cause deterioration of the transmitter 10 due to the unwanted magnetic field. To prevent the eddy current, a magnetic masking reagent with a low loss is required.

Figure 46A:
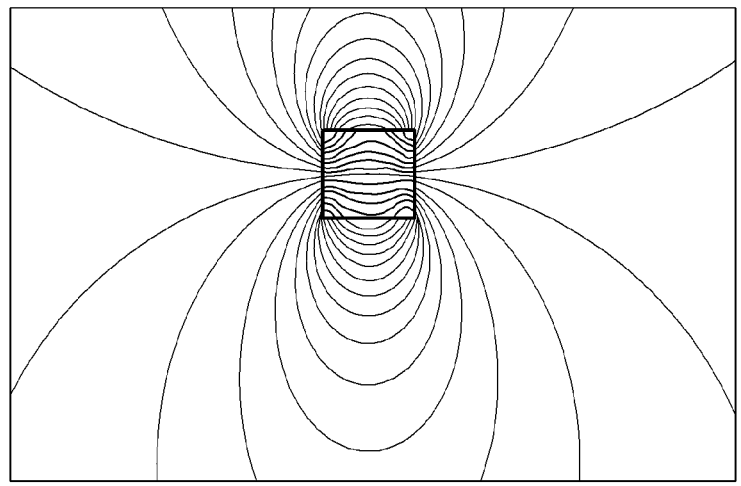
FIG. 46A is a view showing a magnetic field distribution when a masking reagent is not used.
Figure 46B:
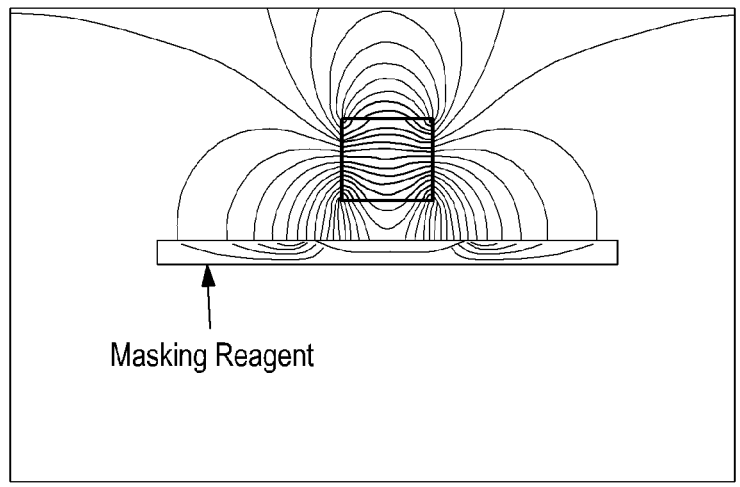
FIG. 46B is a view showing a magnetic field distribution when a masking reagent is used.

FIG. 46A is a view showing a magnetic field distribution when a masking reagent is not used, and FIG. 46B is a view showing a magnetic field distribution when a masking reagent is used. Referring to FIGS. 46A and 46B, since the masking reagent has a higher permeability than the air, a magnetic field is gathered into the masking reagent in case of existence of the masking reagent. Therefore, the aforementioned power transmission loss can be prevented and an unwanted influence upon the device can be removed. However, the masking reagent having a loss component has a conductor, and therefore, it is desirable to select the masking reagent having a minimum loss component.

Figure 47A:
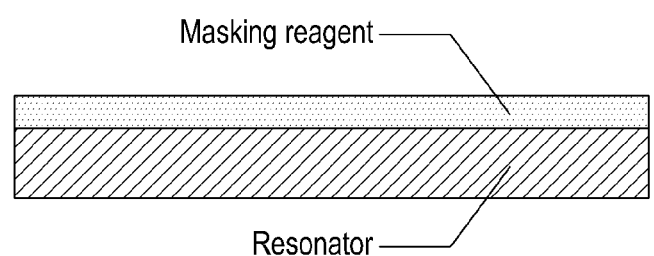
FIG. 47A is a view showing a case where no space is provided between a resonator and a masking reagent.
Figure 47B:
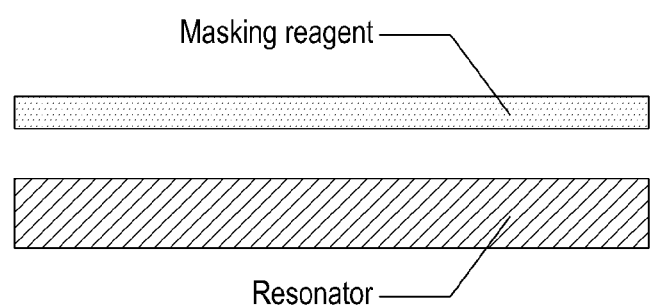
FIG. 47B is a view showing a case where a space is provided between a resonator and a masking reagent.

FIG. 47A is a view showing a case where there is no space between the resonator and the masking reagent, and FIG. 47B is a view showing a case where a space is provided between the resonator and the masking reagent. In FIG. 47B, it is assumed that an interval between the resonator and the masking reagent is 0.6 mm. Table 11 shows Q values in FIGS. 47A and Q values in FIG. 47B.

TABLE 11

| Thickness of Masking Reagent (mm) | Q Value (Without Masking Reagent) | Q Value (With Masking Reagent) |
| --- | --- | --- |
| 0 | 192 | 192 |
| 0.5 | 150 | 163 |

TABLE 11-continued

| Thickness of Masking Reagent (mm) | Q Value (Without Masking Reagent) | Q Value (With Masking Reagent) |
| --- | --- | --- |
| 1 | 155 | 171 |
| 1.5 | 158 | 173 |

FIGS. 47A and 47B and Table 111 show various Q values according to the resonator and the masking reagent position. The strength of a magnetic field increases if the masking reagent is used. The magnetic field directly impacts an L value of the resonator, so that it can be seen that the resonant frequency is reduced as the L value increases if the masking reagent is used. Also, as the thickness of the masking reagent increases, the strength of the magnetic field increases so that larger L and Q values can be obtained. However, since there is a loss component in the masking reagent, the Q value corresponding to the use of the masking reagent is smaller than the Q value corresponding to the non-use of the masking reagent. Also, when there is a space between the resonator and the masking reagent, there is a less loss of resonator characteristics.

Figure 48A:
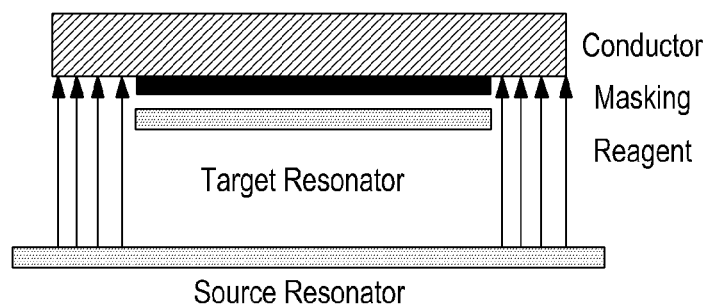
FIGS. 48A and 48B are views showing sizes of a masking reagent and a device and a position of an Rx resonator.
Figure 48B:
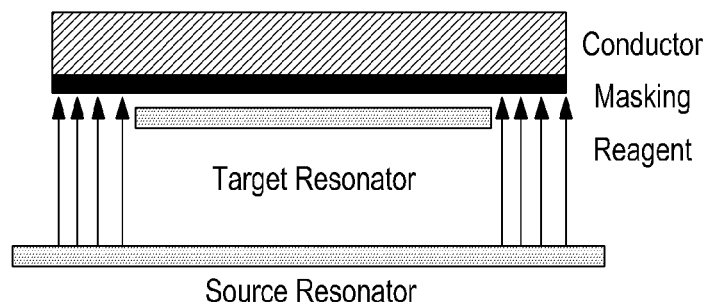

FIGS. 48A and 48B are views showing sizes of the masking reagent and the device and a position of the Rx resonator 21. FIG. 48A shows a case where the size of the masking reagent is larger than that of the conductor, and FIG. 48B shows a case where the masking reagent and the conductor have the same size. As the magnetic field from the Tx resonator 11 gets closer to the receiver 20 and the Rx resonator 21, then power transmission efficiency decreases.

Figure 49:
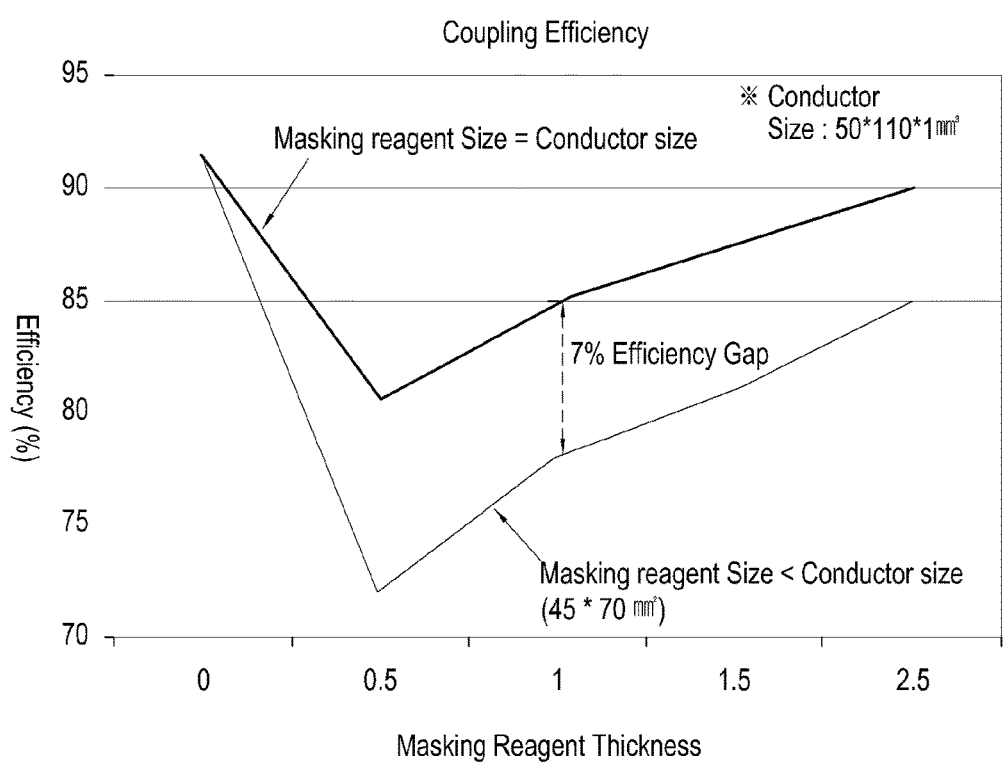
FIG. 49 is a graph showing a coupling efficiency with respect to sizes of a masking reagent and a conductor shown in FIGS. 48A and 48B.

FIG. 49 is a graph showing a coupling efficiency with respect to the sizes of the masking reagent and the conductor shown in FIGS. 48A and 48B. In FIG. 49, an efficiency difference according to the thickness and size of the masking reagent is shown. The masking reagent used in the experiment has $\mu=130$, $\mu''=1.15$ and a loss tanent=0.00884. This means a bare situation coupling efficiency when the thickness of the masking reagent is 0. Considering a case where the Rx resonator 21 is inserted in a mobile communication terminal, results according to the thickness and size of the masking reagent can be seen. If the size of the masking reagent is larger than that of the conductor by 5 mm, a maximum 7% efficiency increment can be obtained. As the thickness of the masking reagent increases, the efficiency becomes similar to the bare case.

(Implementation of Receiver 20 in Wireless Power Transmission System)

Figure 50:
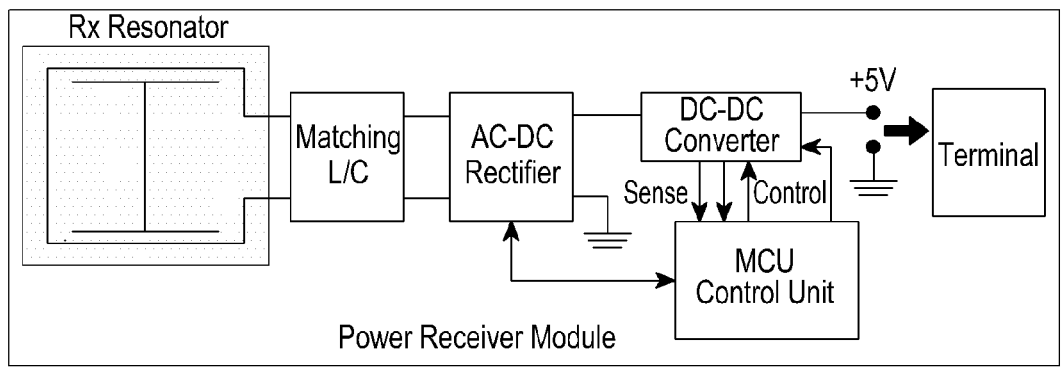
FIG. 50 is an exemplary functional block diagram of a transmitter.

FIG. 50 is an exemplary block diagram of the transmitter 10. The receiver 20 in the wireless power transmission system may include the Rx resonator 21, the power converter 23 including the AC/DC rectifier (AC-DC Rectifier) 23-1 and the DC/DC converter (DC-DC Converter) 23-2, and the Rx controller (MCU Control Unit) 25, and may further include the Rx matching circuit (Matching L/C) 22 and the Rx communication unit 24 (not shown). The power output through the receiver 20 may be supplied to a device connected with the receiver 20, e.g., a mobile communication terminal (Phone Load), as a drive power.

The Rx resonator 21 has an inside and outside loop line and a capacitor to enhance power transmission efficiency. According to an embodiment, if an impedance of the Rx matching circuit 22 is matched with that of the Tx matching circuit 12, the Rx resonator 21 is resonance-coupled with the Tx resonator 12 and thus is provided with power from the transmitter 10. A rectification circuit provides full-wave rectification of the AC waveform by using four Schottky barrier diodes in a full-bridge configuration. Then, the AC/DC rectifier 23-1 may provide a DC power to the power converter 23 and the Rx controller 25. The DC/DC converter 23-2 amplifies the DC power output from the AC/DC rectifier 23-1 and transfers the amplified DC power to a device connected to the receiver 20 (e.g., the mobile communication terminal installed on the receiver 20). The power amplified by the DC/DC converter 23-2 may be 5V. The Rx controller 25 executes power control algorithms and protocols. Also, the Rx controller 25 may control an analog power conversion block (not shown) and monitor several sensing circuits (not shown). The Rx communication unit 24 performs a communication operation of the receiver 20. The Rx communication unit 24 communicates with a device on which the receiver 20 is installed (e.g., a mobile communication terminal) or the transmitter 10 under the control of the Rx controller 24 to exchange various packets with the devices.

Figure 51A:
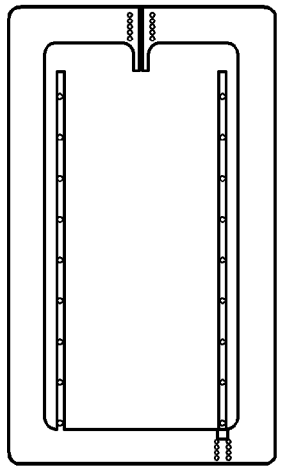
FIGS. 51A through 51E are views showing an Rx resonator of a receiver according to the present invention.
Figure 51B:
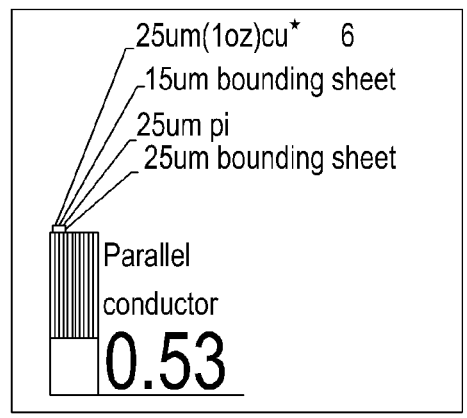
Figure 51C:
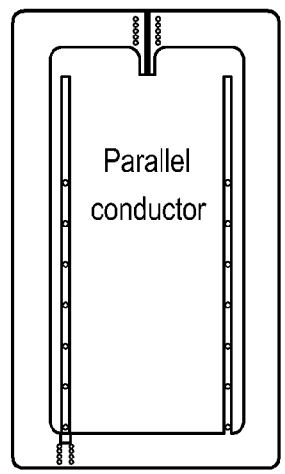
Figure 51D:
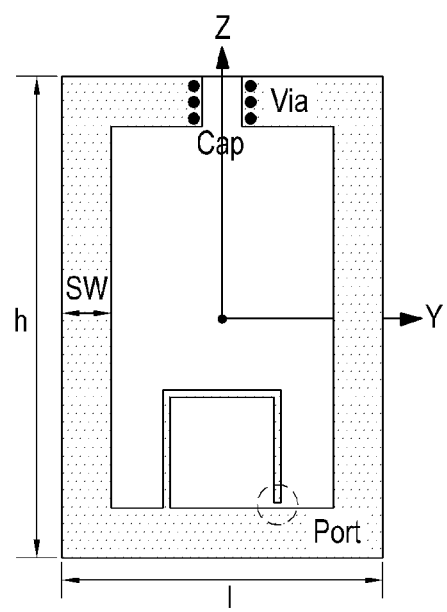
Figure 51E:
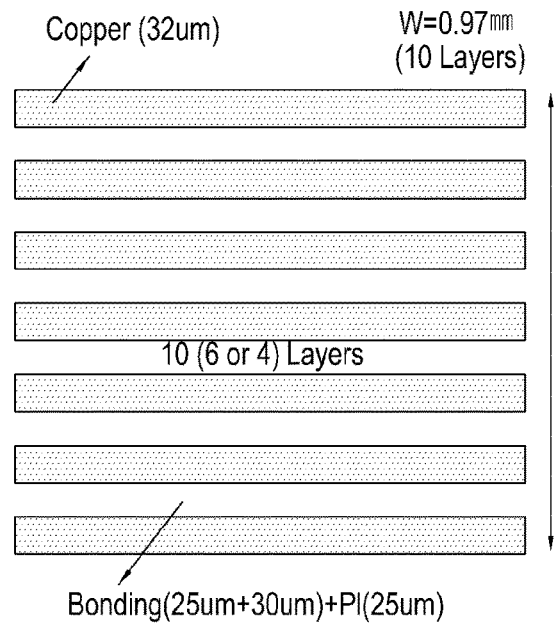

FIGS. 51A through 51E show the Rx resonator 21 of the receiver 20 according to the present invention. FIG. 51A shows a structure of the implemented Rx resonator 21, FIG. 51B shows a thickness of the implemented Rx resonator 21, FIG. 51C shows a parallel capacitor of the implemented Rx resonator 21, FIG. 51D shows an outline of the implemented Rx resonator 21, and FIG. 51E shows a thickness outline of the implemented Rx resonator 21.

The Rx resonator 21 of the receiver 20 may have a parallel structure having 1 oz (0.034 mm) copper as in FIG. 51E. Also, as in FIG. 51D, using a plurality of via in cap portions, a total conductor sheet is connected to one so that current flow has the same direction in all conductors. When those of ordinary skill in the art desire to implement the Rx resonator 21, considering a near effect and a conductor resistance, sheet number and thickness which has a maximum Q value can be selected. In this case, it is desirable to set a width SW of the Rx resonator 21 having the highest transfer efficiency (6 mm in case of the Rx resonator 21 inserted into a mobile communication terminal), considering a conductor resistance and an area (related to a kappa value in coupling) through which a magnetic field can pass.

Table 12 shows a width of the Rx resonator 21 and various parameter characteristics in the Rx resonator 21 according to the width of the Rx resonator 21 according to the present invention.

TABLE 12

| Width of Resonator | Size (MM) | f1 (MHz) | f2 (MHz) | Q | f0 (MHz) | Cap (pF) |
|---|---|---|---|---|---|---|
| 6 Sheet (0.53 mm) | 70 × 40 × 0.52 | 13.5056 | 13.6189 | 239.4042 | 13.5619 | 1483 |
| 4 Sheet (0.32 mm) | 70 × 40 × 0.34 | 13.5058 | 13.627 | 223.868 | 13.5663 | 1460 |

Referring to Table 12, f1 represents a low frequency when S21 is 3 dB, f2 represents high frequency, and f0 represents a resonant frequency. In each case, a Q value of the receiver 20 is about ~200. A Q value of the Rx resonator 21 increases a little bit as a sheet increases; however, according to the receiver 20, a 6 sheet which is the Rx resonator 21 having a width of 0.53 mm may be applied to the mobile communication terminal.

(AC/DC Rectifier)

Figure 52:
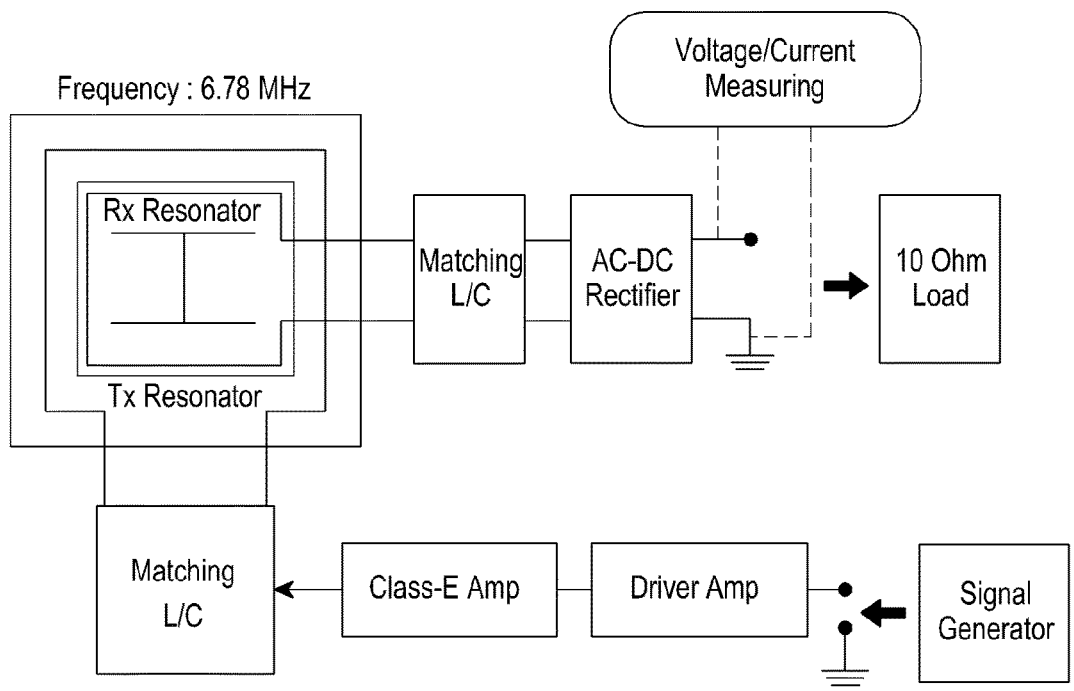
FIG. 52 is a view showing a measurement setup for measuring an efficiency of an Alternating Current (AC)/DC rectifier according to the present invention.

FIG. 52 is a view showing a measurement setup for measuring an efficiency of the AC/DC rectifier 23-1 according to the present invention. Table 13 provided below shows results of measurement of an efficiency of the AC/DC rectifier 23-1 according to the measurement setup of FIG. 52.

TABLE 13

|  | FWD [dBm] | Resonator Efficiency | Input Power [mW] | DC Vout [V] | DC Iout [mA] | Current Meter Loss [mW] | DC Total Power [mW] | RX System Efficiency |
|---|---|---|---|---|---|---|---|---|
| Dual Diode Rectifier | 35.6 | 0.83 | 3020 | 4.97 | 509 | 155 | 2685 | 0.89 |

As described before, the full-wave bridge rectifier needs a differential RF input signal, so that a measurement Zig such as Balun is required. But it is hard to find a commercial Balun which can endure a power higher than 10 W and operates at 13.56 MHz, and therefore, in the current embodiment, a measurement setup is set using a resonator described below.

In the current embodiment, the Tx resonator 11 having a size of 15 cm×15 cm and the Rx resonator 21 having a size of 4 cm×6 cm are used. The Tx resonator 11 to the Rx resonator 21 has 50Ω to 50Ω matching, and a matching circuit (Matching L/C) for conversion to 50Ω to 10Ω is connected to the resonators 11 and 21. Thus, an efficiency of the Tx resonator 11 to the Rx resonator 21 matched to 50Ω to 10Ω is fixed to 83%. Herein, the AC/DC rectifier 23-1 is connected to the Rx resonator 21, and a load of 10Ω is input, and then DC-to DC voltage and current can be measured. If a forward power of 35.6 dBm is provided to the Class-E amplifier 13-1, then the power passes through the Tx resonator 11 having an efficiency of 83% and then is output. As shown in Table 13, the power output from the transmitter 10 is input to the AC/DC rectifier 23-1 as 3020 mW.

The DC voltage and current across a load included in the receiver 20 are 4.97V and 509 mA, respectively. If the loss is compensated for, the output power at the DC load is 2685 mW and the total efficiency of the AC/DC rectifier 23-1 is about 89%.

(DC/DC Converter)

Figure 53:
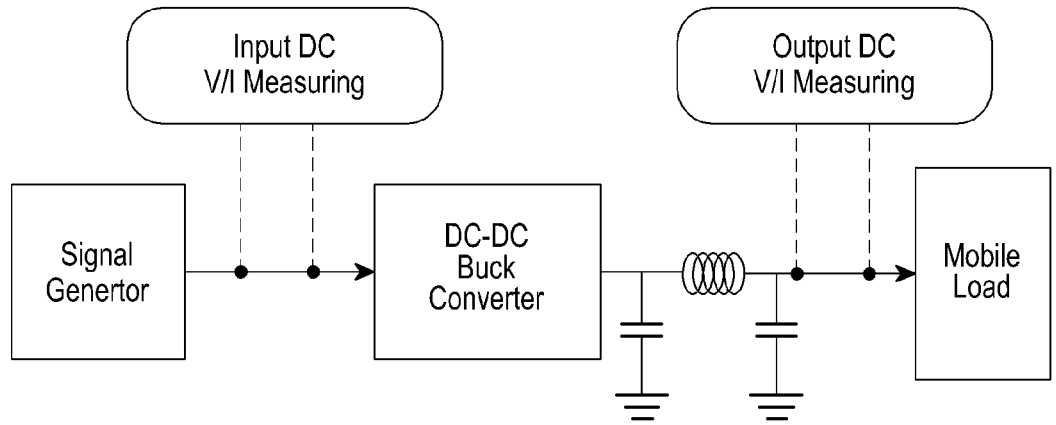
FIG. 53 is a view showing a measurement setup for measuring an efficiency of a DC/DC converter in a receiver according to the present invention.

FIG. 53 is a view showing a measurement setup for measuring an efficiency of the DC/DC converter 23-2 in the receiver 20 according to the present invention. Table 14 provided below shows an efficiency of the DC/DC converter 23-2 of FIG. 53.

TABLE 14

| Vin | Iin | Win | Iin Loss | Win Sum | Vout | Iout | Wout | Iout Loss | Wout Sum | Eff |
|---|---|---|---|---|---|---|---|---|---|---|
| 5.50 | 0.38 | 2.07 | 0.23 | 2.29 | 4.56 | 0.42 | 1.90 | 0.25 | 2.15 | 93.59 |
| 6.00 | 0.52 | 3.12 | 0.31 | 3.43 | 4.83 | 0.58 | 2.81 | 0.35 | 3.16 | 92.08 |
| 7.00 | 0.44 | 3.10 | 0.27 | 3.37 | 4.83 | 0.58 | 2.78 | 0.35 | 3.13 | 92.90 |
| 8.00 | 0.39 | 3.12 | 0.23 | 3.35 | 4.83 | 0.58 | 2.78 | 0.35 | 3.12 | 93.09 |
| 9.00 | 0.35 | 3.13 | 0.21 | 3.34 | 4.83 | 0.57 | 2.77 | 0.34 | 3.12 | 93.30 |
| 10.00 | 0.32 | 3.15 | 0.19 | 3.34 | 4.83 | 0.57 | 2.77 | 0.34 | 3.11 | 93.18 |

In FIG. 53, it is assumed that an input voltage level input to the DC/DC converter 23-2 is 5.5V~8V. In the current embodiment, a voltage of 5.5V~10V is supplied to the DC/DC converter 23-2 by using a power source, and a mobile load is connected, after which output DC voltage and current output from the DC/DC converter 23-2 are measured. When an input/output DC current meter measurement loss generated during a measurement process is compensated for, a total efficiency of the DC/DC converter 23-2 according to the input power is about 92% as can be seen in Table 14.

Figure 54:
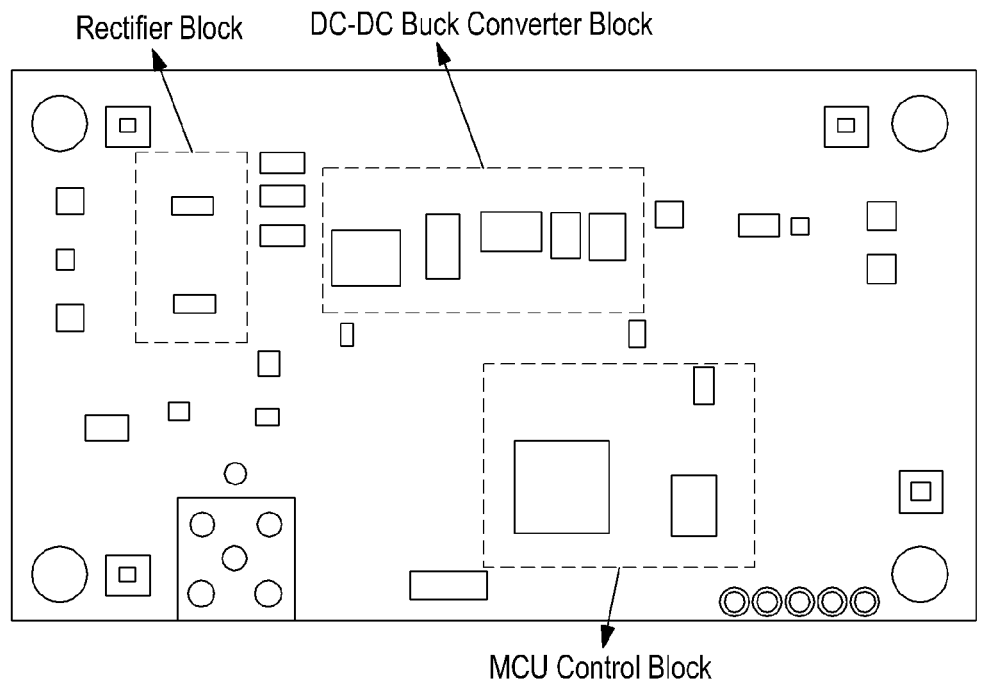
FIG. 54 is a view showing a system board of a receiver implemented according to the present invention.
Figure 55:
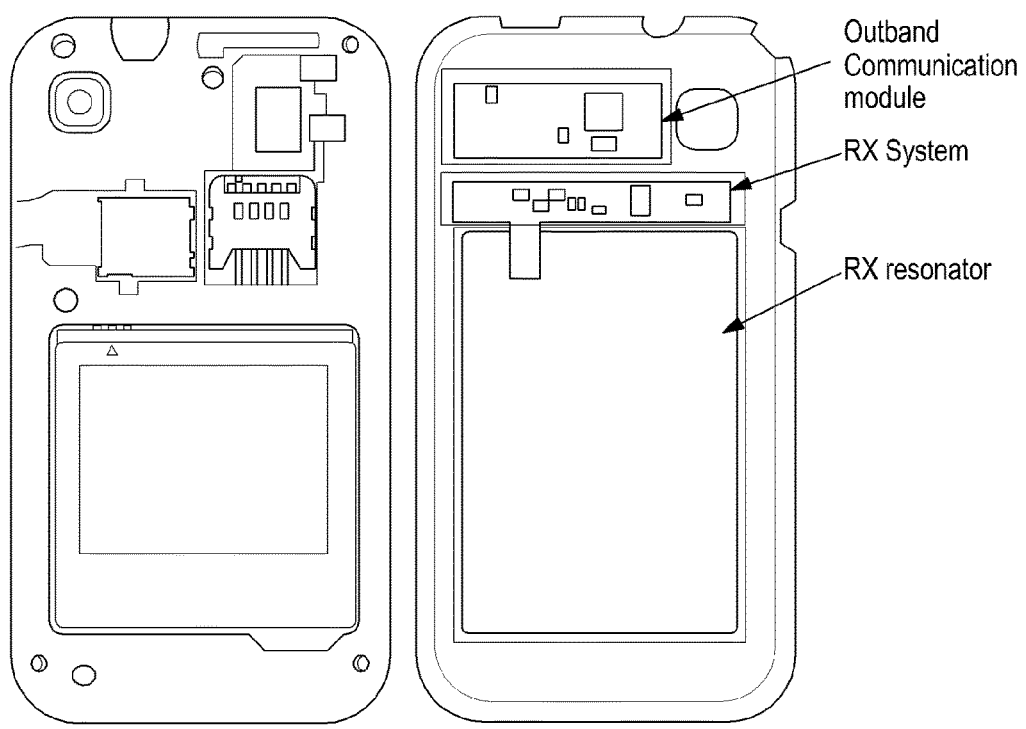
FIG. 55 is a view showing a receiver implemented according to the present invention.

FIG. 54 is a view showing a system board of a receiver implemented according to the present invention, and FIG. 55 is a view showing a receiver implemented according to the present invention.

The total size of the receiver 20 may be 47×5×2.6 mm. In each stage of the system board shown in FIG. 54, signal characteristics of the receiver 20 can be checked. In the receiver 20 shown in FIGS. 54 and 55, the thickest components are matching L, C and 100 uF capacitor forming the Rx matching circuit 22, and a total thickness of the matching L, C and 100 uF capacitor may be 2 mm. In the system board, the thickness of a Printed Circuit Board (PCB) may be set to 0.6 mm, such that the total thickness of the system board may be 2.6 mm. According to an embodiment, the thickness of the PCB may be further reduced.

In particular, in FIG. 55, the receiver 20 installed on a rear case of the mobile communication terminal is shown. The receiver 20, a communication module, or the like are built in the rear surface of the mobile communication terminal. Once the rear case of the mobile communication terminal is closed, a DC output port of the receiver 20 is connected to the mobile communication terminal.

Figure 56:
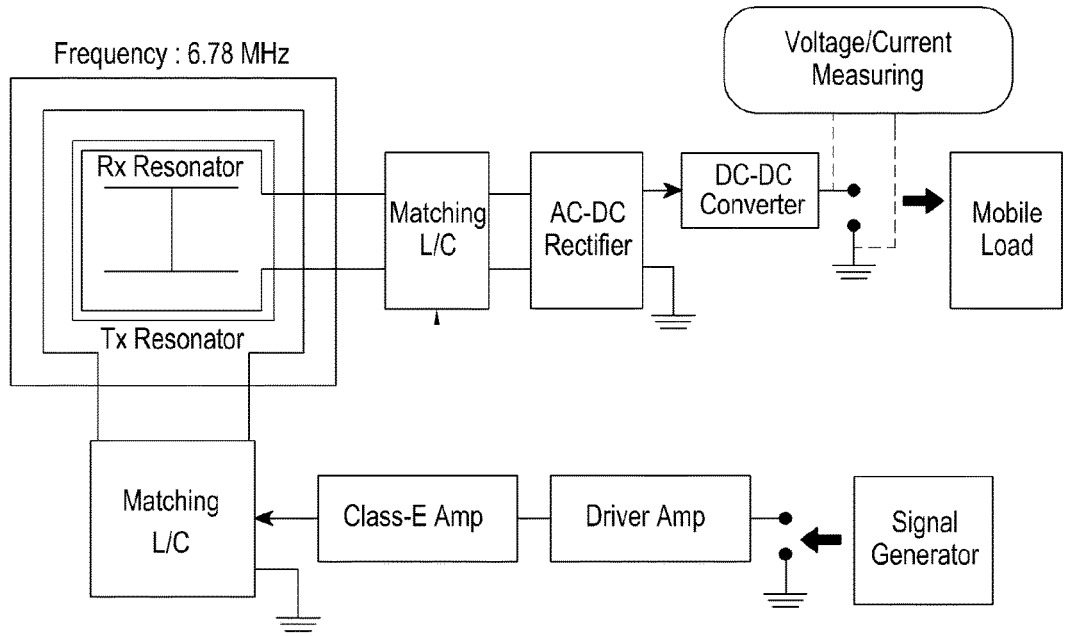
FIG. 56 is a view showing a measurement setup for measuring an efficiency of a receiver.

FIG. 56 is a view showing a measurement setup for measuring an efficiency of the receiver 20. Table 15 shows results of measurement of the efficiency of the receiver 20 in FIG. 56.

Upon input of a forward power of 36.4 dBm to the receiver 20, the power passes through the Rx resonator 21 having an efficiency of 83% and then a power of 3623 mW is input to the AC/DC rectifier 23-1 as shown in Table 15. DC voltage and current across the mobile load are assumed to be 4.76V and 580 mA, respectively.

Since a DC current meter has a loss of 0.6Ω, if the loss is compensated for, an output power at a DC load is 2909 mW and an efficiency of the receiver 20 is about 80.3%. The efficiency of 80.3% is similar with (AC/DC rectifier efficiency of 89%×DC/DC converter efficiency of 92%) which are measured before. A small gap between the efficiency of the receiver 20 and (AC/DC rectifier efficiency×DC/DC converter efficiency) comes from the mobile load and a different input power.

Figure 57:
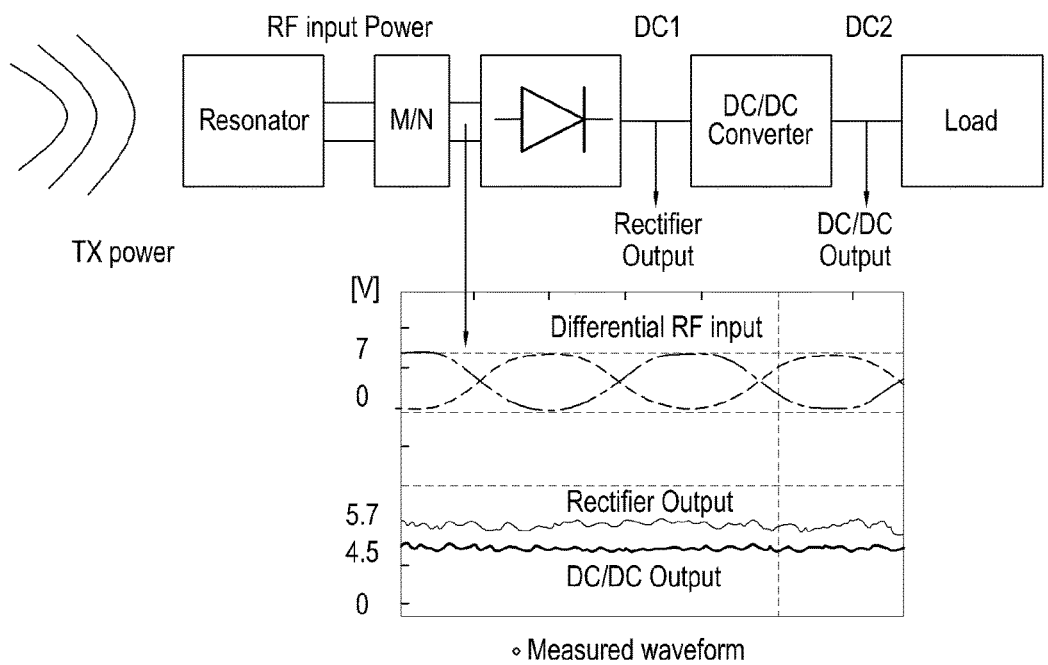
FIG. 57 is a graph showing a waveform measured in each stage when a power output from a transmitter is 35.4 dBm and a load is 10Ω.

FIG. 57 is a graph showing a waveform measured in each stage when a power output from a transmitter is 35.4 dBm and a load is 1052.

A measured outlet of a differential RF input signal of an RF input matching circuit is a graph on an upper portion, and swings between 0~7V. The output graph of the AC/DC rectifier 23-1 is a graph on a lower portion, in which a voltage of about 5.7V is input to the DC/DC converter 23-2. The power output from the DC/DC converter 23-2 is about 4.5V.

Figure 58A:
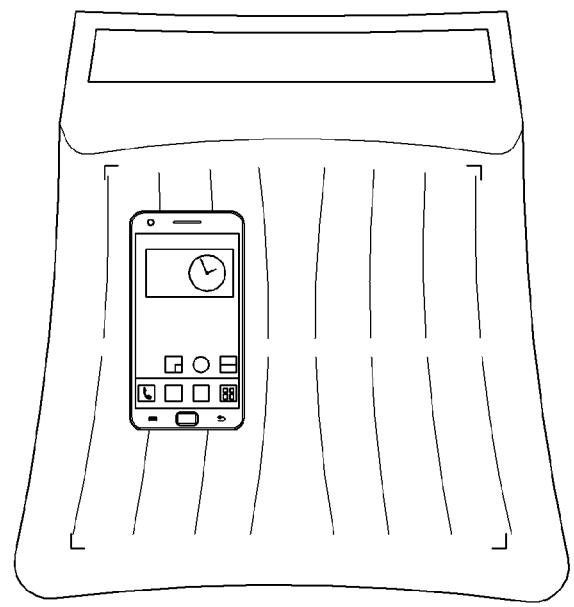
FIGS. 58A and 58B are views showing wireless power transmission and reception systems which charge a single mobile communication terminal or a plurality of mobile communication terminals.
Figure 58B:
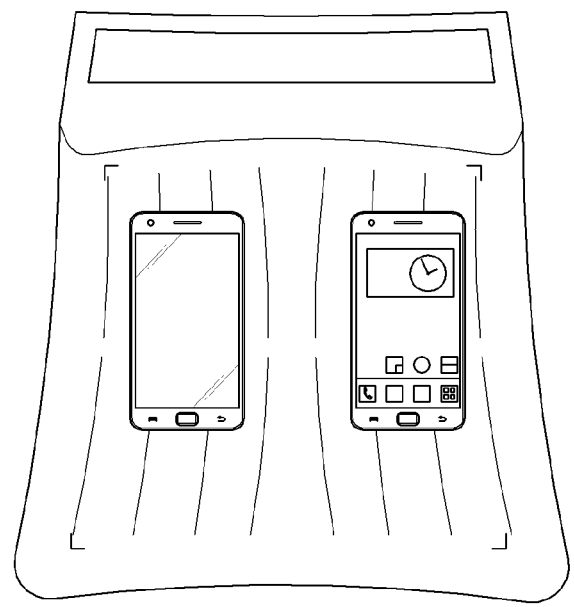

FIGS. 58A and 58B are views showing a wireless power transmission system which charges a single mobile communication terminal or a plurality of mobile communication terminals. Depending on the number of mobile communication terminals, the power transmission and reception system according to the present invention controls a power level, and the power transmission and reception system according to the present invention transmits a wireless power to the single mobile communication terminal and each of the plurality of mobile communication terminals.

The transmitter 10 according to the present invention can successfully supply power to the receiver 20 safely and

TABLE 15

| | FWD [dBm] | Resonator Efficiency | Input Power [mW] | DC V out [V] | DC I out [mA] | Current Meter Loss [mW] | DC Total Power [mW] | RX System Efficiency |
|---|---|---|---|---|---|---|---|---|
| Receiver | 36.4 | 0.83 | 3623.08 | 4.67 | 580 | 201 | 2909.6 | 0.803 |

A measurement setup for measuring an efficiency of the receiver 20 is similar to a measurement setup for measuring an efficiency of the AC/DC rectifier 23-1. As shown in FIG. 56, the DC/DC converter 23-2 is added in a circuit for measuring an efficiency of the AC/DC rectifier 23-1. In the current embodiment, a real charging efficiency of the receiver 20 may be measured together with a mobile load of the mobile communication terminal through the circuit of FIG. 56.

efficiently even in the environment of multiple devices based on a wireless power transmission control and communication protocol. The wireless power transmission control and communication protocol for the wireless power transmission network according to the present invention is basically designed as a bidirectional & half duplex architecture. The wireless power transmission network has a star topology in which the transmitter 10 is a master and the multiple receivers 20 are slaves. The transmitter 10 and the receiver 20 perform bidirectional communication to each other in order to identify device compliance and to exchange power negotiation information. A time division anti-collision algorithm for communication packets exchanged between the transmitter 10 and the receiver 20 may be applied to the power transmission and reception system according to the present invention. The time division anti-collision algorithm may be modified from an IEEE802.15.4 slotted Carrier Sense Multiple Access/Collision Avoidance (CSMA/CA) algorithm.

The following description will be made of how to apply the control and communication protocol in the detection, registration, configuration, charge and standby states of the transmitter 10 for the single receiver 20 and the multiple receivers 20, respectively. In the present invention, a superframe structure having a slotted and contention period is designed for the anti-collision algorithm of the communication packet between the transmitter 10 and the receivers 20.

In the following description, a sequence and a timing of the control and communication protocol will be described for each wireless charge state. Also, in the following description, an interrupt control algorithm of wireless power transmission and reception for safety of the transmitter 10 or the receiver 20 will also be described for the event of the over-temperature, over-voltage and over-current, respectively. In the present invention, the control and communication protocol consists of Notice, Interactive, Report and Acknowledgement (ACK) frames.

Whenever a user turns on the power of the transmitter 10, the transmitter 10 periodically monitors the power load of the Tx resonator 11 and compares the value with a predetermined threshold. Before rogue devices and the receivers 20 turn on the transmitter 10, if they are simultaneously placed on the transmitter 10, the rouge devices cannot be verified from the receivers 20. In this case, the transmitter 10 stops application of the power to the Tx resonator 11. Until the user removes an object and turns off the power switch of the transmitter 10 for safety, the transmitter 10 may periodically transmit a warning message to the user interface of the transmitter 10 or the receiver 20. Therefore, it is preferable that the transmitter 10 is turned on without another device or object on the interface of the transmitter 10.

Figure 59:
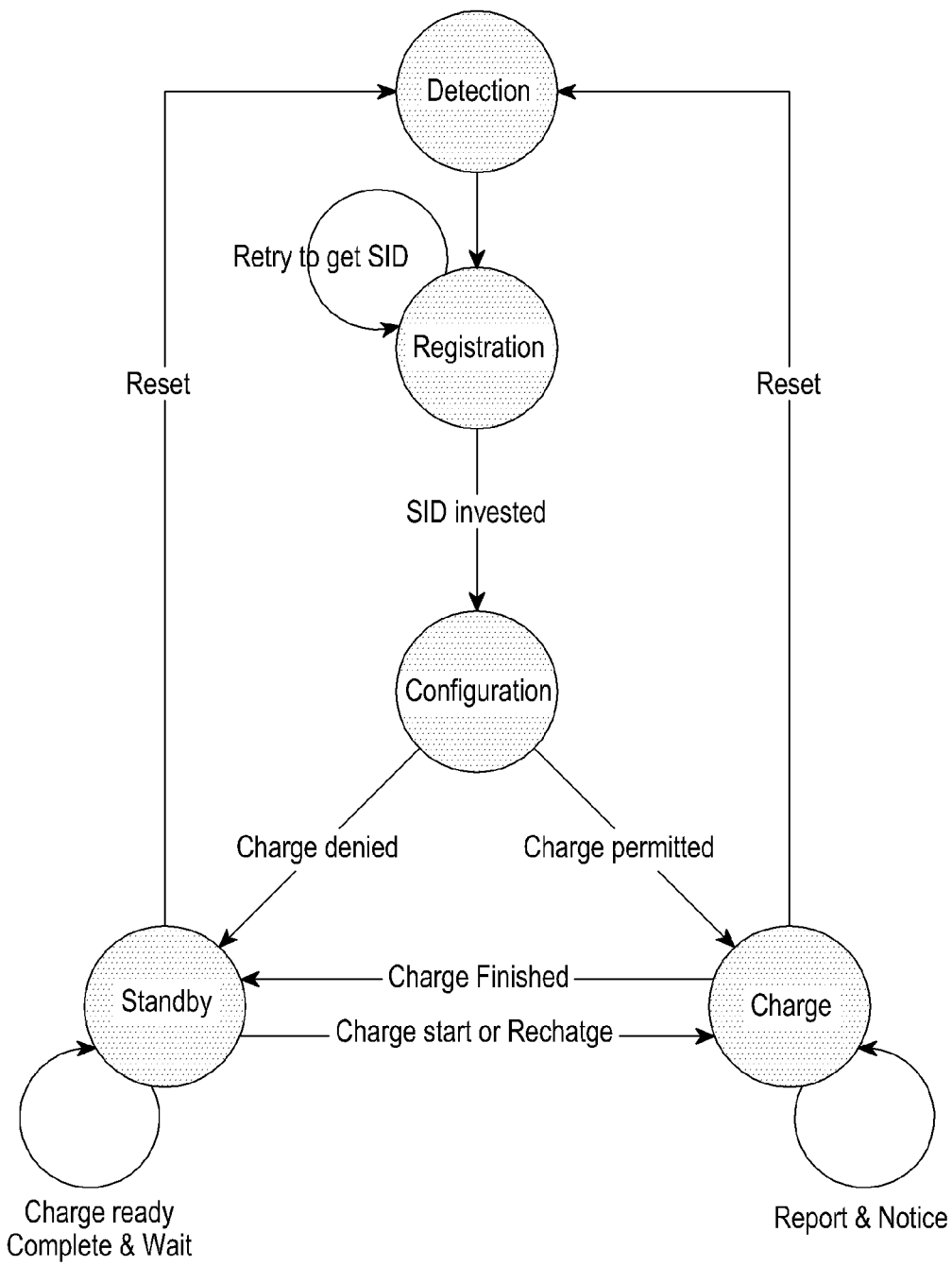
FIG. 59 is a state diagram showing a wireless power transmission procedure in a wireless power transmission system in detection, registration, charge, and standby states.

FIG. 59 is a state diagram showing a wireless power transmission procedure in a wireless power transmission system in the detection, registration, charge, and standby states.

Referring to FIG. 59, in the detection state, the transmitter 10 periodically supplies a small power to the Tx resonator 11 during a short duty time in order to monitor a load variation at the interface. If a positive load variation is detected higher than a predetermined value, the transmitter 10 provides more power to the Tx resonator 11 so that a new receiver 20 can enter the registration state. On the other hand, if there is no corresponding response from the receiver 20, then the transmitter 10 turns back to the detection state.

In the registration state, the new receiver 20 sends a packet Interactive_Request_Join_Frame including its own identifier and basic load characteristics to the transmitter 10. The transmitter 10 assigns a Short identification (SID) to the new receiver and sends a packet Interactive_Response_Join_ Frame including an SID and a time slot allocation to the new receiver 20. If there is no response from the new receiver 20, the transmitter 10 recognizes that the load variation is induced by a metallic object or a non-complying device. In this case, the transmitter 10 shows the corresponding warning message to user, and stops application of power to the Tx resonator 11. Thereafter, the transmitter 10 returns to the detection state after an elapse of a predetermined time.

In the configuration state, the new receiver 20 sends a packet Interactive_Request_Charge_Frame including the required output voltage, output current and power transmission efficiency to the transmitter 10. The transmitter 10 calculates the requested power based on the information delivered from the receiver 20. The transmitter determines whether the current power transmission capacity satisfies the requested power from the new receiver 20. If the transmitter has enough power, then the transmitter 10 sends a packet Interactive_Response_Charge_Frame including Permission data to the new receiver 20 to allow the new receiver 20 to enter the charge state. On the other hand, if the requested power is not satisfied, the transmitter 10 sends No Permission data (or packet) to the new receiver 20 to allow the new receiver 20 to enter the standby state.

In the charge state, the transmitter 10 broadcasts a packet Notice_Frame to each receiver 20. The Notice_Frame packet contains a sync packet, commands for each receiver and the state of the entire system. The receiver 20 periodically sends to the transmitter 10 a packet Report_Frame having respective power negotiation information during its allocated time slot. The transmitter 10 starts adjusting the output power to the required level value of the receiver 20 after each Report_Frame packet has been received. The transmitter 10 can increase or decrease the total power according to the power negotiation information from one or multiple receiver(s) 20. If there is no response from a certain receiver 20 within a predetermined time, the transmitter 10 recognizes the removal of that receiver 20 and decreases the output power. As such, if the receiver 20 is removed, the transmitter 10 may reassign SID(s) and allocated time slot(s) for the remaining receiver(s) 20.

In the standby state, the receiver 20 keeps communicating with the transmitter 10 although it does not receive the required power from the transmitter 10. There are two cases that the receiver 20 enters the standby state.

First, when a device battery of the receiver 20 is fully charged or the device holds charging for a certain reason, the receiver 20 can send the Report_Frame packet including Charge Status of Complete & Wait data to the transmitter 10, and the receiver 20 enters the standby state. Then, the transmitter 10 may stop or decrease power transmission to the receiver 20 in the standby state.

Second, if the current power transmission capacity of the transmitter 10 does not meet the total required power for the new receiver 20 as well as other receiver(s) 20 in the charge state, the transmitter 10 sends the Interactive_Response_Charge_Frame packet including No Permission data to the new receiver 20, and the new receiver 20 enters the standby state. If the current power transmission capacity of the transmitter 10 meets the required power from the new receiver 20, then the transmitter 10 sends a packet Interactive_Response_Charge_Frame including a packet Permission to the new receiver 20, and the new receiver 20 enters the charge state.

(Power Transmission and Reception of Single Receiver)

Figure 60:
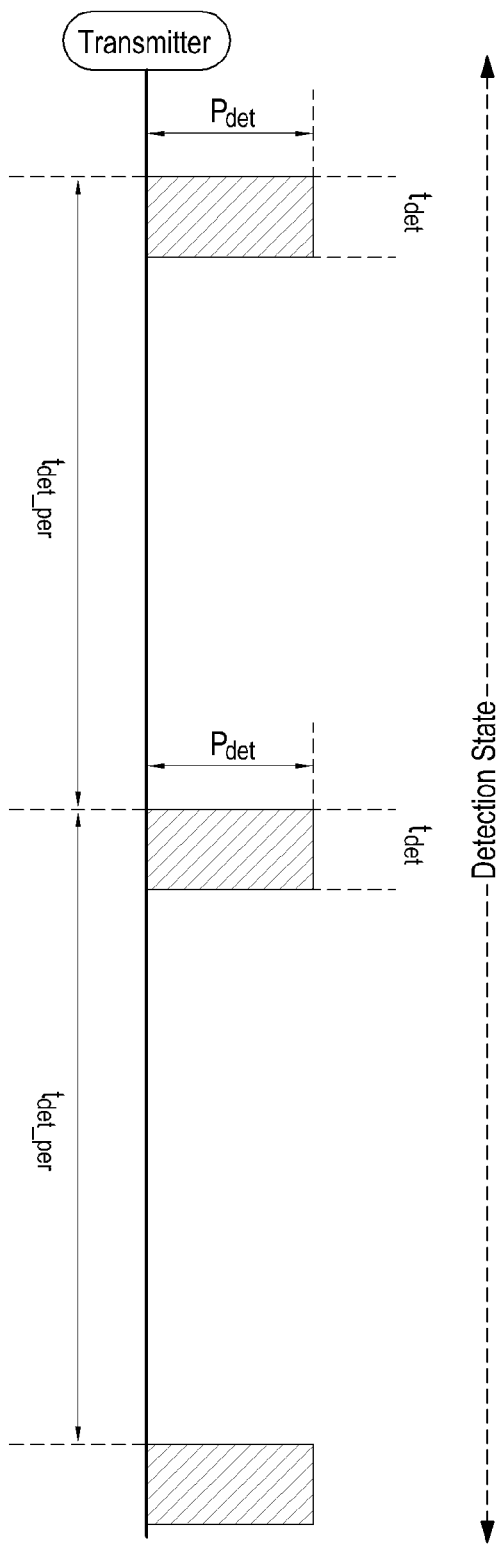
FIG. 60 is a view showing a detection state procedure when a transmitter is not yet disposed on an interface (e.g., a charge pad)

FIG. 60 is a view showing a detection state procedure when the receiver 20 is not yet disposed on an interface (e.g., a charge pad) of the transmitter 10. The transmitter 10 periodically applies a power $P_{det}$ to the Tx resonator 11 for every detection time of $t_{det}$. During $t_{det}$, the transmitter 10 monitors a load variation in order to check whether the receiver 20 is placed on the interface of the transmitter 10 (e.g., the charge pad (not shown)).

In the detection step, the load variation is defined as a difference between a current value of the load and a preset value of the load. If a load variation is higher than a preset threshold value, then the transmitter 10 recognizes that there is no receiver placed on the interface of the transmitter 10. If the load variation is higher than a predetermined threshold value, then the transmitter 10 recognizes that the new receiver 20 is placed on the interface of the transmitter 10. As a result, the receiver 20 can enter the registration state.

As such, in the present invention, the transmitter 10 applies power only during the detection time $t_{det}$ in the detection step, and thus can save a power loss during a detection time $t_{det\_det}$ other than the detection time $t_{det}$ can be reduced.

Figure 61:
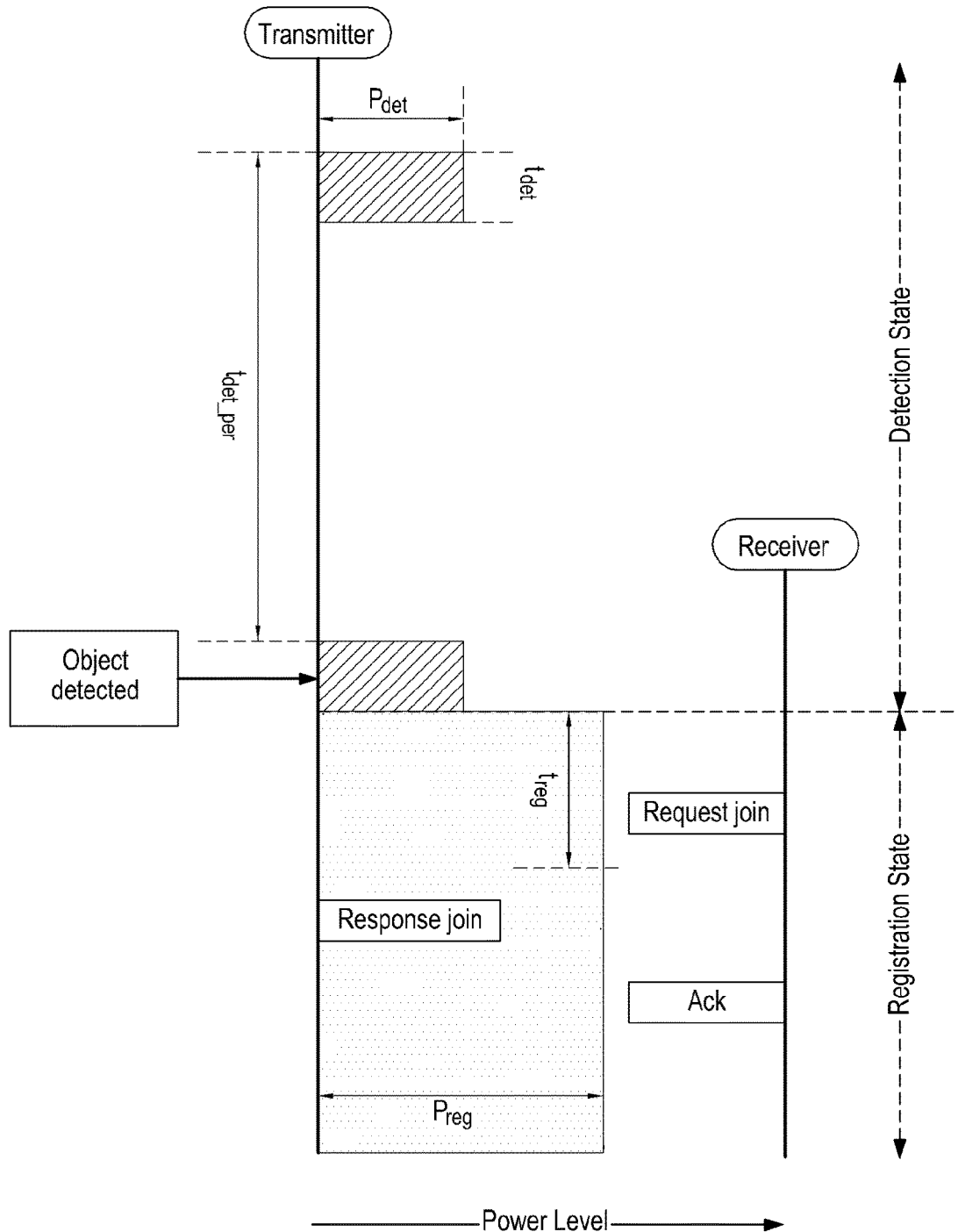
FIG. 61 is a view showing a procedure for registering a receiver in a transmitter.

FIG. 61 is a view showing a procedure for registering the receiver 20 in the transmitter 10.

Referring to FIG. 61, if the receiver 20 is put on the interface of the transmitter 10 (e.g., the charge pad (not shown)), the transmitter 10 increases the output power to enable the receiver 20 to communicate with the transmitter 10, and delivers the power to the receiver 20. The receiver 20 sends a packet Interactive_Request_Join_Frame to the transmitter 10 within a registration time $t_{reg}$. The Interactive_Request_Join_Frame packet includes the own ID and initial load characteristics of the receiver 20. As soon as the transmitter 10 receives the ID of the receiver 20, the transmitter 10 transforms the ID into an SID (Short ID) which has a smaller volume and a shorter length than the ID. Since the ID of the receiver 20 transmitted from the receiver 20 to the transmitter 10 is long, the transmitter 10 issues an SID to the receiver 20 during registration of the receiver 20, thus facilitating management of the receiver 20. The transmitter 10 may register the SID and load characteristics of the new receiver 20 into a device control table of the transmitter 10. The device control table may be designed for the power transmission management of individual receiver(s) 20.

Table 16 shows an example of the device control table structure managed by the transmitter 10.

Figure 62:
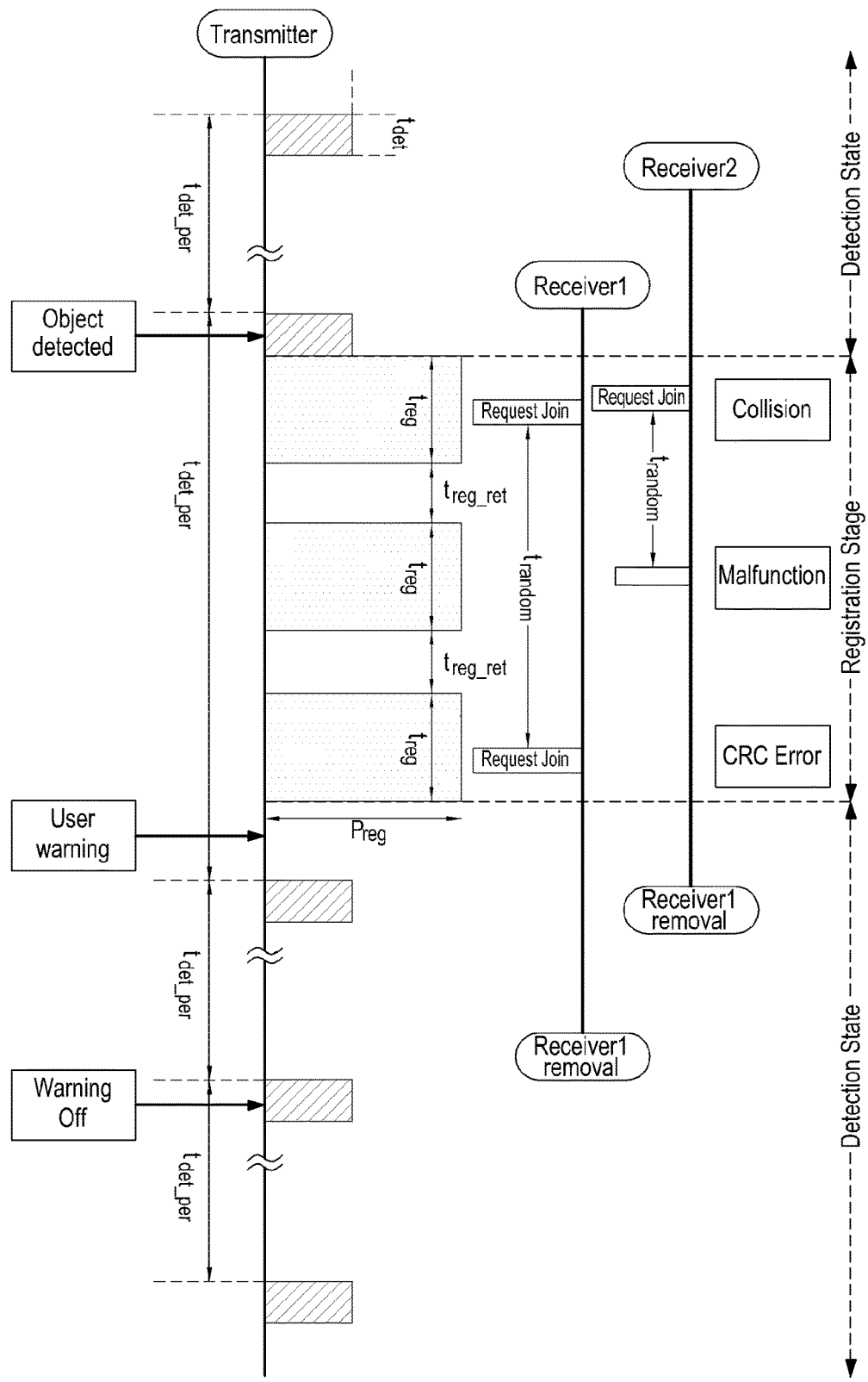
FIG. 62 is a view showing an example of a packet error situation where a transmitter fails to receive a packet ACK_Frame transmitted from a first receiver Receiver 1 or a second receiver Receiver 2.

FIG. 62 is a view showing an example of a packet error situation where the transmitter 10 fails to receive a packet ACK_Frame transmitted from a first receiver Receiver 1 or a second receiver Receiver 2. Referring to FIG. 62, the transmitter 10 may re-apply to the first receiver, a power $P_{reg}$ which is an increment of $t_{reg\_ret}$ by ($n_{reg\_ret}$-1) times with the interval of ($t_{reg\_ret}$). Within these procedures, if the ACK_Frame packet is successfully delivered to the transmitter 10, the power transmission and reception system proceeds to the configuration state. Else, if the transmitter 10 does not receive any ACK_Frame packet at all, the transmitter 10 stops applying the power to the first receiver. And also, the transmitter 10 may send a warning message to a user through a user interface (not shown). According to an embodiment, the state of the transmitter 10 may return to the detection state only when the receiver 20 causing the aforementioned error is removed from the interface of the transmitter 10.

Figure 63:
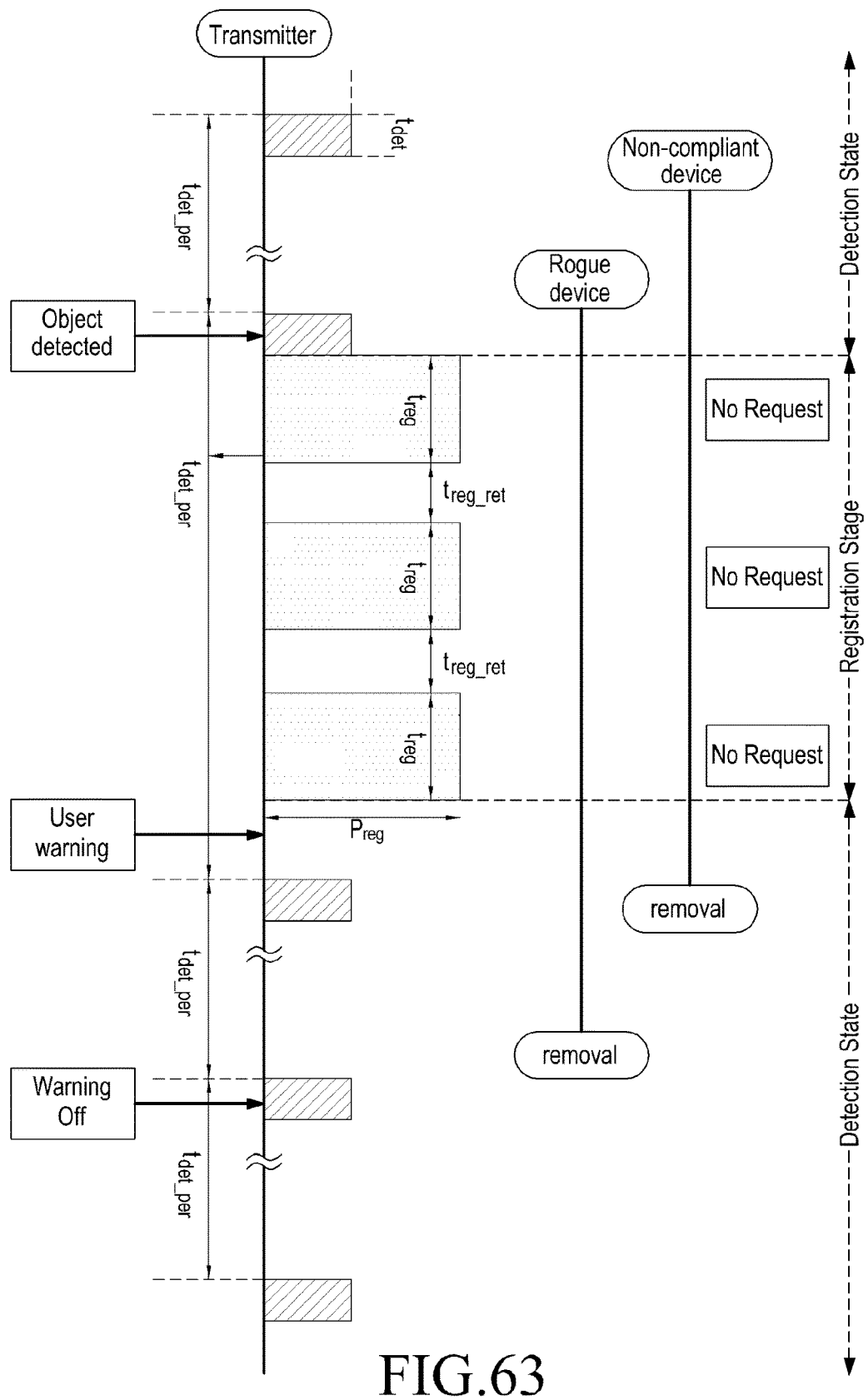
FIG. 63 is a view showing a packet error situation where a metallic object or a rogue (or non-compliant) device is placed on an interface of the transmitter.

FIG. 63 is a view showing a packet error situation where a metallic object or a rogue (or non-compliant) device is placed on the interface of the transmitter 10.

Referring to FIG. 63, when a metallic object or a non-compliant device is place on the interface of the transmitter 10, the transmitter 10 cannot receive any Interactive_Request_Join_Frame packet from the receiver 20. Then, the transmitter 10 reapplies the power of $P_{reg}$, which is an increment of $t_{reg\_ret}$ by ($n_{reg\_ret}$-1) times, as shown in FIG. 63. Since the device or object to which the power $P_{reg}$ is reapplied is a non-compliant device or object, the transmitter 10 cannot receive the Interactive_Request_Join_Frame packet from the device or object. The transmitter 10 stops applying the power $P_{reg}$ and show a warning message to the user through the user interface. The warning state is maintained until a rogue device or metallic objects are removed from the interface of the transmitter 10. After the non-compliant device or metallic objects are removed from the interface, the transmitter 10 returns to the detection state.

Figure 64:
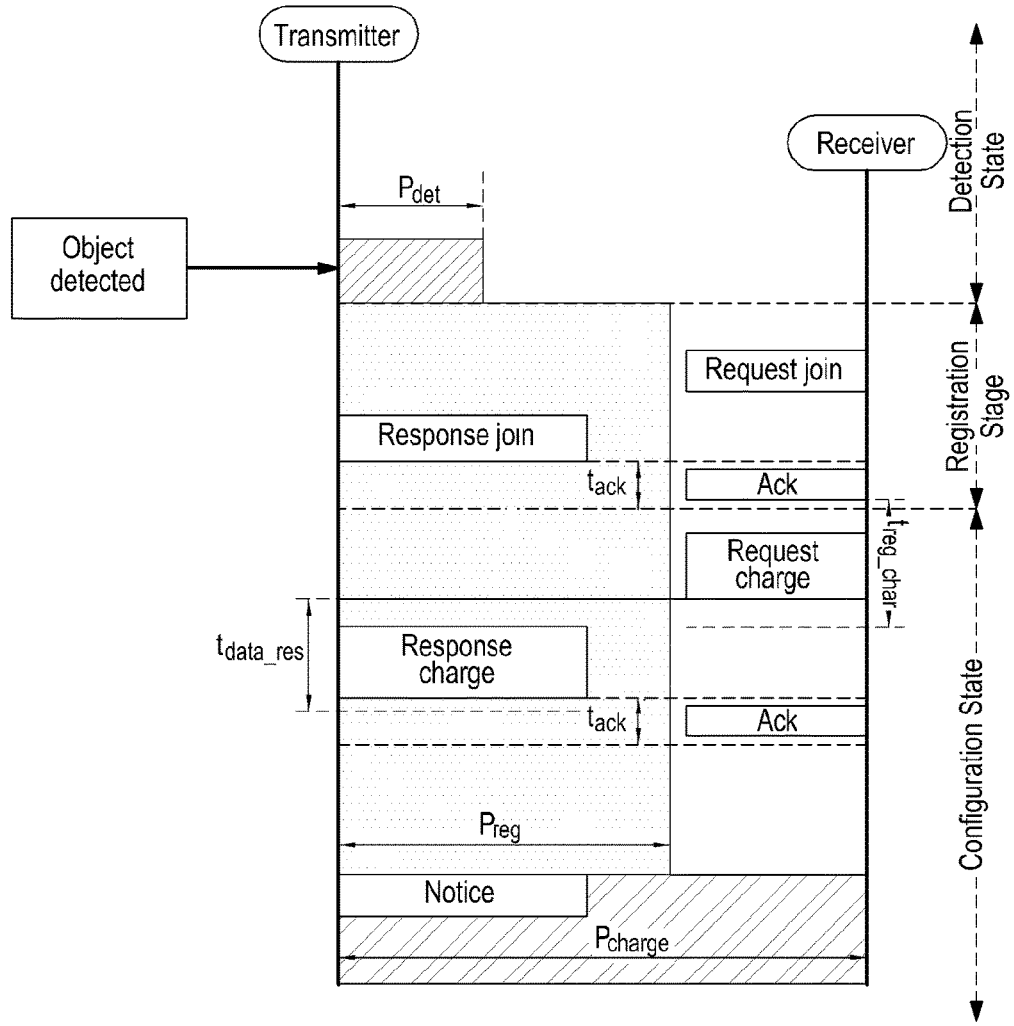
FIG. 64 is a view showing a normal operation flow of a configuration step in a wireless power transmission system.

FIG. 64 is a view showing a normal operation flow of the configuration step in the wireless power transmission sys-

TABLE 16

| Allocated ID (Short ID) | ID | Load Characteristic | Current Characteristic | Voltage Characteristic | Efficiency Characteristic | Status | Input Voltage | Input Current | Output Voltage | Output Current |
|---|---|---|---|---|---|---|---|---|---|---|
| 1 | 0x11111111 | 25 | 300 mA | 5 V | 75% | Complete & Standby | — | — | 5 V | 300 mA |
| 2 | 0x22222222 | 30 | 500 mA | 3 V | 70% | Charge (CV mode) | 3 V | 400 mA | 3 V | 400 mA |
| 3 | 0x33333333 | 10 | 100 mA | 5 V | 80% | Charge (CC mode) | 5 V | 100 mA | 5 V | 100 mA |
| 4 | 0x44444444 | 50 | 500 mA | 5 V | 75% | Charge (CCmode) | 5 V | 500 mA | 5 V | 500 mA |
| 5 | 0x55555555 | 100 | 500 mA | 12 V | 75% | Standby | — | — | 12 V | 500 mA |

Referring to Table 16, the device control table stores information about updating and current power transmission information for each receiver 20. The transmitter 10 sends a packet Interactive_Response_Join_Frame including the newly allocated SID to the receiver 20. As a response, the receiver 20 sends an Acknowledgement (ACK) Frame to the transmitter 10. When the transmitter 10 successfully receives the ACK, the power transmission system for wirelessly transmitting and receiving power moves to the configuration step.

If a packet error, such as packet collision, CRC error, and receiver failure, occurs, the Interactive_Request_Join_Frame packet transmitted from the receiver 20 cannot be delivered properly to the transmitter 10.

tem. Referring to FIG. 64, after the receiver 20 is registered, the receiver 20 sends a packet Interactive_Request_Charge_Frame to the transmitter 10. The Interactive_Request_Charge_Frame packet includes the electrical characteristics of the receiver 20 such as current, voltage and power transmission efficiency. The transmitter 10 calculates the requested power from the receiver 20 based on the information delivered from the receiver 20, i.e., based on the Interactive_Request_Charge_Frame packet. The transmitter 10 determines whether the current power transmission capacity satisfies the requested power from the new receiver 20. If the transmitter 10 has an enough power, the transmitter 10 sends a packet Interactive_Response_Charge_Frame including Permission data for charge to the new receiver 20.

The receiver 20 having received the Interactive_Response_Charge_Frame packet immediately sends a packet ACK_Frame to the transmitter 10. As a result, the receiver 20 can enter the charge state, that is, a state where the receiver 20 can receive power from the transmitter 10.

On the other hand, if the transmitter 10 does not have the enough power, the transmitter 10 transmits No Permission data to the receiver 20. The receiver 20 having received the No Permission data can enter the standby state.

According to an embodiment, time constraints may be enforced for the foregoing operations. If the transmitter 10 fails to receive the Interactive_Request_Charge_Frame packet from the receiver 20 within a time of $t_{req\_char}$ after receiving the ACK_Frame packet from the receiver 20, the transmitter 10 recognizes that the receiver 20 is removed from the interface of the transmitter 10.

If the transmitter 10 recognizes that the receiver 20 is removed, the transmitter 10 erases information of the non-responding receiver 20 from the device control table by sending no Interactive_Response_Charge_Frame packet. Thereafter, the transmitter 10 turns back to the detection state. On the other hand, when the receiver 20 does not receive the Interactive_Response_Charge_Frame packet within $t_{data\_res}$ and does not send the ACK_Frame packet, the transmitter 10 sends the Interactive_Response_Charge_Frame packet again within t random.

The transmitter 10 may repeat the operation of sending the Interactive_Response_Charge_Frame packet to the receiver 20 ($n_{reg\_ret}$−1) times more in order to receive the ACK_Frame packet from the receiver 20. According to an embodiment, if the Interactive_Response_Charge_Frame packet is still delivered to the receiver 20 even after the transmitter 10 attempts the packet sending operation $n_{reg\_ret}$ times more, the receiver 20 may turn back to the detection state.

If the transmitter 10 does not receive the ACK_Frame packet from the receiver 20 within a time $t_{ack}$, then the transmitter 10 may repeat an operation of sending the Interactive_Response_Charge_Frame packet including Permission data to the receiver 20 $n_{reg\_ret}$ times more. If the transmitter 10 fails to receive the ACK_Frame packet from the receiver 20 even after $n_{reg\_ret}$ trials, the transmitter 10 may recognize that the receiver 20 is removed from the interface of the transmitter 10. In this case, the transmitter 10 erases information of the non-responding receiver 20 from the device control table and turns back to the detection state.

According to an embodiment, if the current power transmission capacity of the transmitter 10 does not meet the required power by a newly registered receiver, the transmitter 10 sends a packet Interactive_Response_Charge_Frame having no Permission data to the receiver and the receiver enters the standby state. Then, the transmitter 10 may send a packet Interactive_Response_Charge_Frame including Reset of Over Power to the receiver. In this case, the transmitter 10 may show a corresponding warning message of the over power capacity to the user interface of the transmitter 10. The receiver having received the Interactive_Response_Charge_Frame packet including the Reset of Over Power may turn back to the detection state.

Herein, $t_{ack}$ represents an allowed time duration for the transmitter 10 to receive a packet ACK_Frame from an ACK_Frame packet. $n_{reg\_ret}$ represents the number of retrials of transmission of an Interactive Response Frame packet to the receiver 20 for the transmitter 10 to wait for reception of a ACK_Frame packet from the receiver 20.

Figure 65:
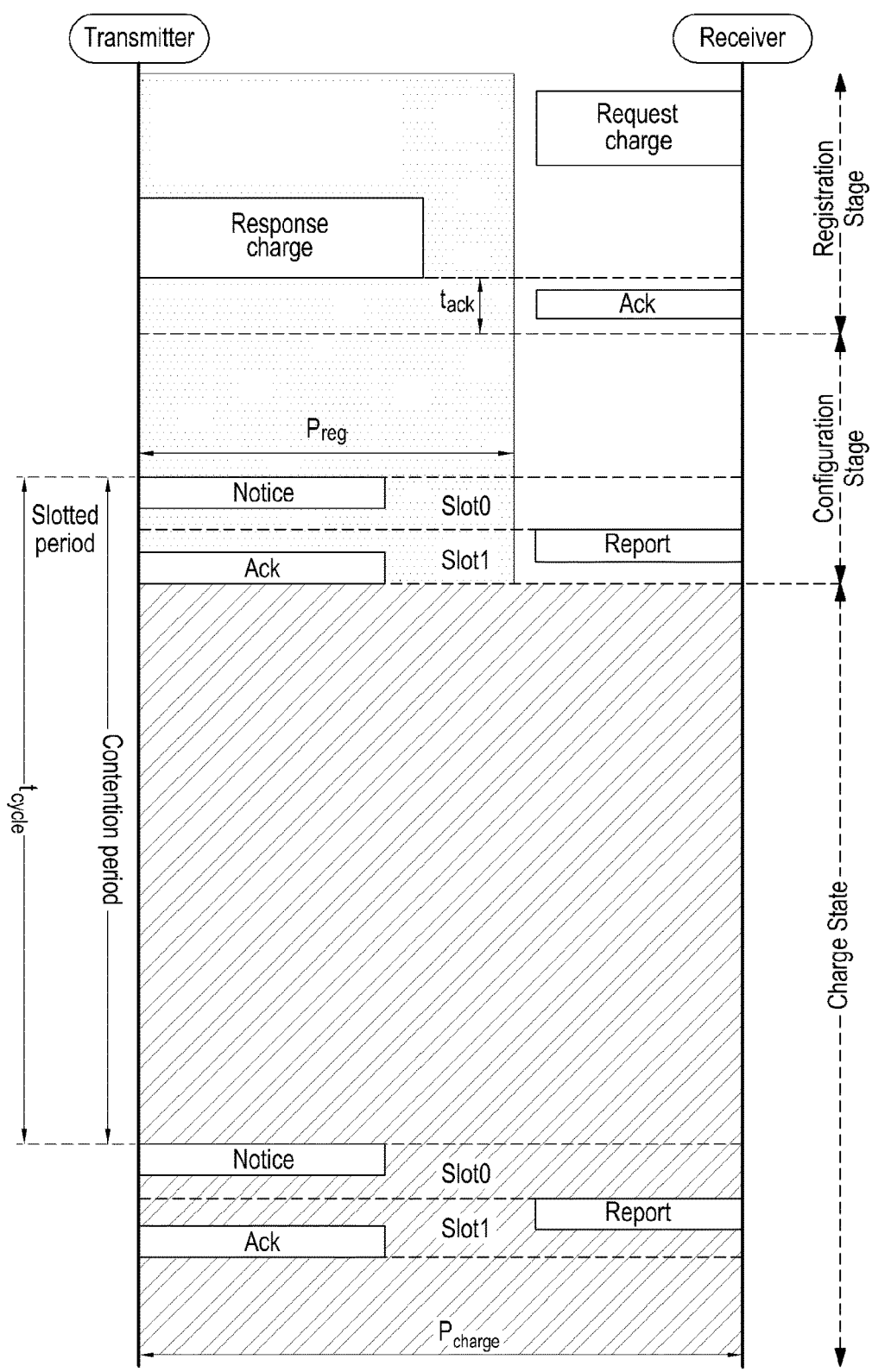
FIG. 65 is a view showing a charge operation of a single receiver.

In the charge state, the transmitter 10 broadcasts a packet Notice_Frame to each receiver 20 and each receiver 20 sends a packet Report_Frame including its status to the transmitter 10. The Notice_Frame packet is allotted in slot 0 and the time slot number of the Report_Frame packet is allocated to the receiver 20 having an SID assigned by the transmitter 10 as shown in FIG. 65. FIG. 65 is a view showing a charge operation of the single receiver 20.

A packet Notice_Frame includes various information for the receiver 20, such as a command for a specific receiver 20 for charge start, charge finish, reset, power off and SID change. The transmitter 10 can also broadcast the Notice_Frame packet including a command for power off, power on, sync and reset to all receivers 20.

A packet Report_Frame includes the charge status and power information of the receiver 20. The Report_Frame packet of the receiver 20 has to arrive in the transmitter 10 within a slot allocated to the receiver 20. Otherwise, a collision may occur with the Report_Frame packet of other receiver 20. Therefore, the transmitter 10 and the receiver 20 have to be accurately synchronized. For synchronization between the transmitter 10 and the receiver 20, the transmitter 10 may send Sub Frame of Sync data which allows the receiver 20 to synchronize its clock to a clock of the transmitter 10 to the receiver 20 through the Notice_Frame packet.

Based on power information included in the Report_Frame packet from the receiver 20, the transmitter 10 updates the device control table in a registry corresponding to a status of each receiver 20. The transmitter 10 calculates a sum of the required power from the receivers 20 and increases or decreases the power applied to the Tx resonator 11. According to an embodiment, the aforementioned procedure may be periodically performed at time intervals of $t_{cycle}$.

If the receiver 20 does not receive the ACK_Frame packet from the transmitter 10 within $t_{ack}$, the receiver 20 tries to send the Report_Frame packet in a next time slot of its own which comes at time intervals of $t_{cycle}$. When the receiver 20 does not get the ACK_Frame packet during next three superframe periods of ($3 \times t_{cycle}$), the receiver 20 sends the Report_Frame packet including Charge Status of Error data to the transmitter 10 and turns back to the registration state.

Figure 66:
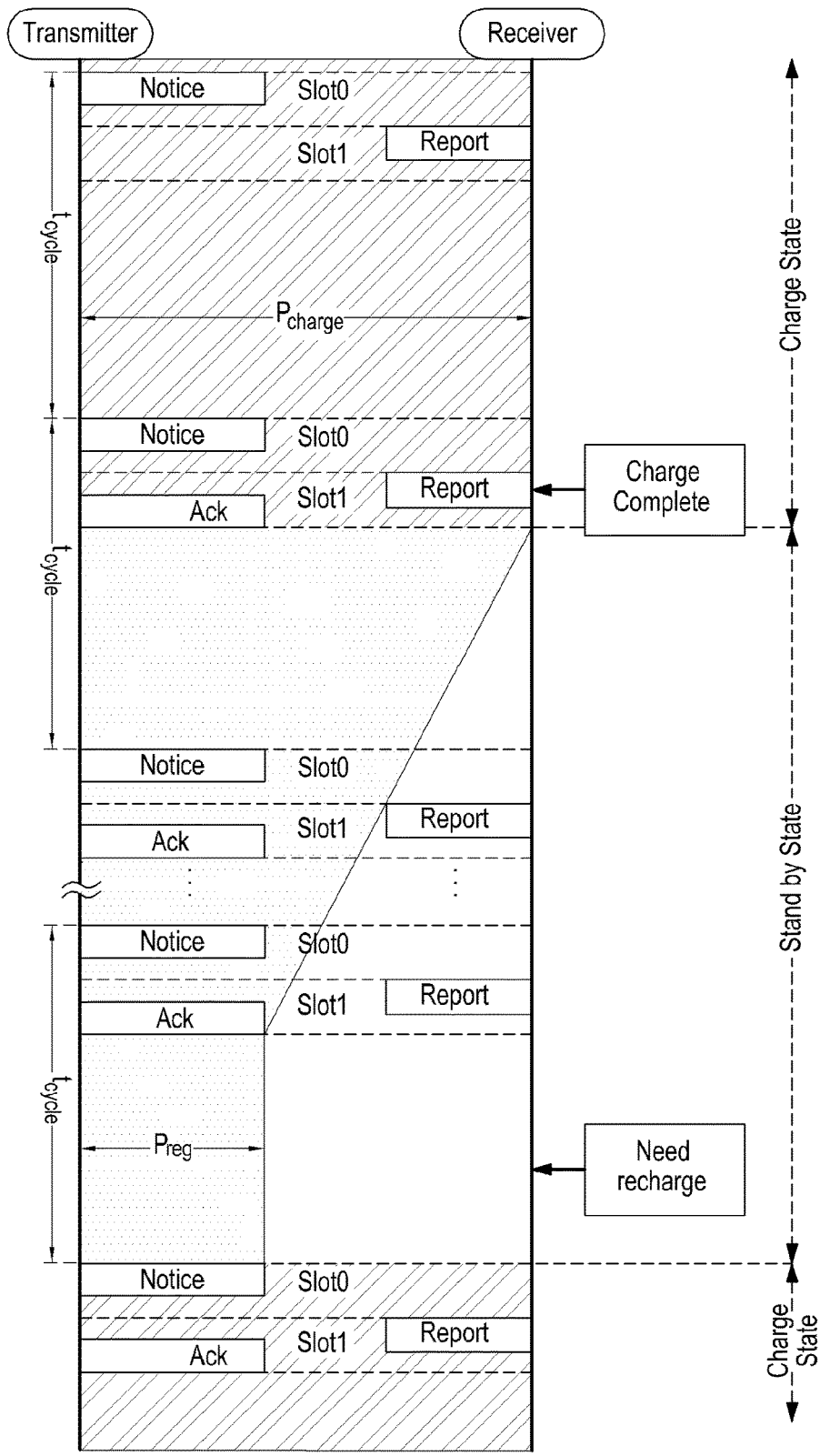
FIG. 66 is a view showing a procedure in which a single receiver is removed from an interface of a transmitter in a charge state.

FIG. 66 is a view showing a procedure in which the single receiver 20 is removed from the interface of the transmitter 10 in the charge state. When the receiver 20 is removed from the interface (e.g., a charge pad) (not shown) of the transmitter 10 in the charge state, the transmitter 10 cannot receive any Report_Frame packet from the removed receiver 20 any longer. In order to distinguish the event of removal of the receiver 20 from packet collision, the transmitter 10 tries to listen to the Report_Frame packet of the removed receiver 20 for a time slot period of ($n_{absence} \times t_{cycle}$). In this period of ($n_{absence} \times t_{cycle}$), the transmitter 10 can smoothly decrease a power level of power $P_{charge}$ transmitted to the receiver 20 to a power level $P_{reg}$. If there is no transmission of the Report_Frame packet from the removed receiver 20 even after the period of ($n_{absence} \times t_{cycle}$), then the transmitter 10 recognizes that the receiver 20 is removed. The transmitter 10 updates the device control table and cuts off power to be transmitted to the removed receiver 20. According to an embodiment, since there is no receiver 20 placed on the interface of the transmitter 10, the transmitter 10 goes back to the detection state.

Figure 67:
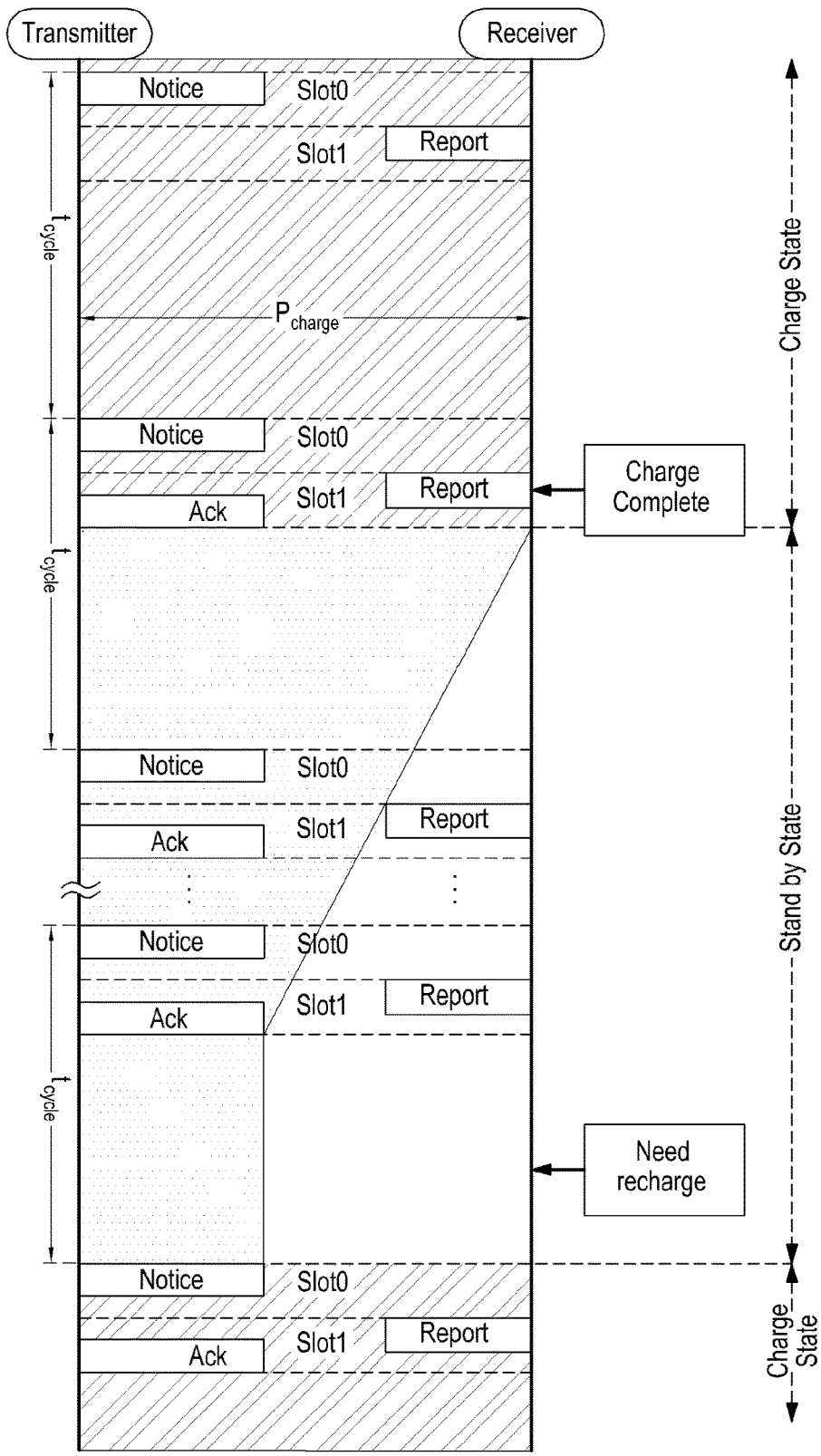
FIG. 67 is a view showing a procedure corresponding to full charge or recharge of a receiver.

FIG. 67 is a view showing a procedure corresponding to full charge or recharge of the receiver 20. When the device battery of the receiver 20 is fully charged, the receiver 20 sends the Report_Frame packet including Charge Status of Complete and Standby data to the transmitter 10. The receiver 20 then enters the standby state. The transmitter 10 having received the Report_Frame packet from the receiver 20 updates the device control table and decreases smoothly the power output to the receiver 20 to the power level $P_{reg}$, for preventing an abrupt voltage up and down.

When the receiver 20 desires to recharge the battery, the receiver 20 sends the Report_Frame packet including Charge Status of CC data to the transmitter 10. Thereafter, the receiver 20 may enter the charge state. The transmitter 10 having received the Report_Frame packet updates the device control table, and increases the power applied to the Tx resonator 11 to deliver the power to the receiver 20.

(Power Transmission and Reception for Multiple Receivers)

Figure 68:
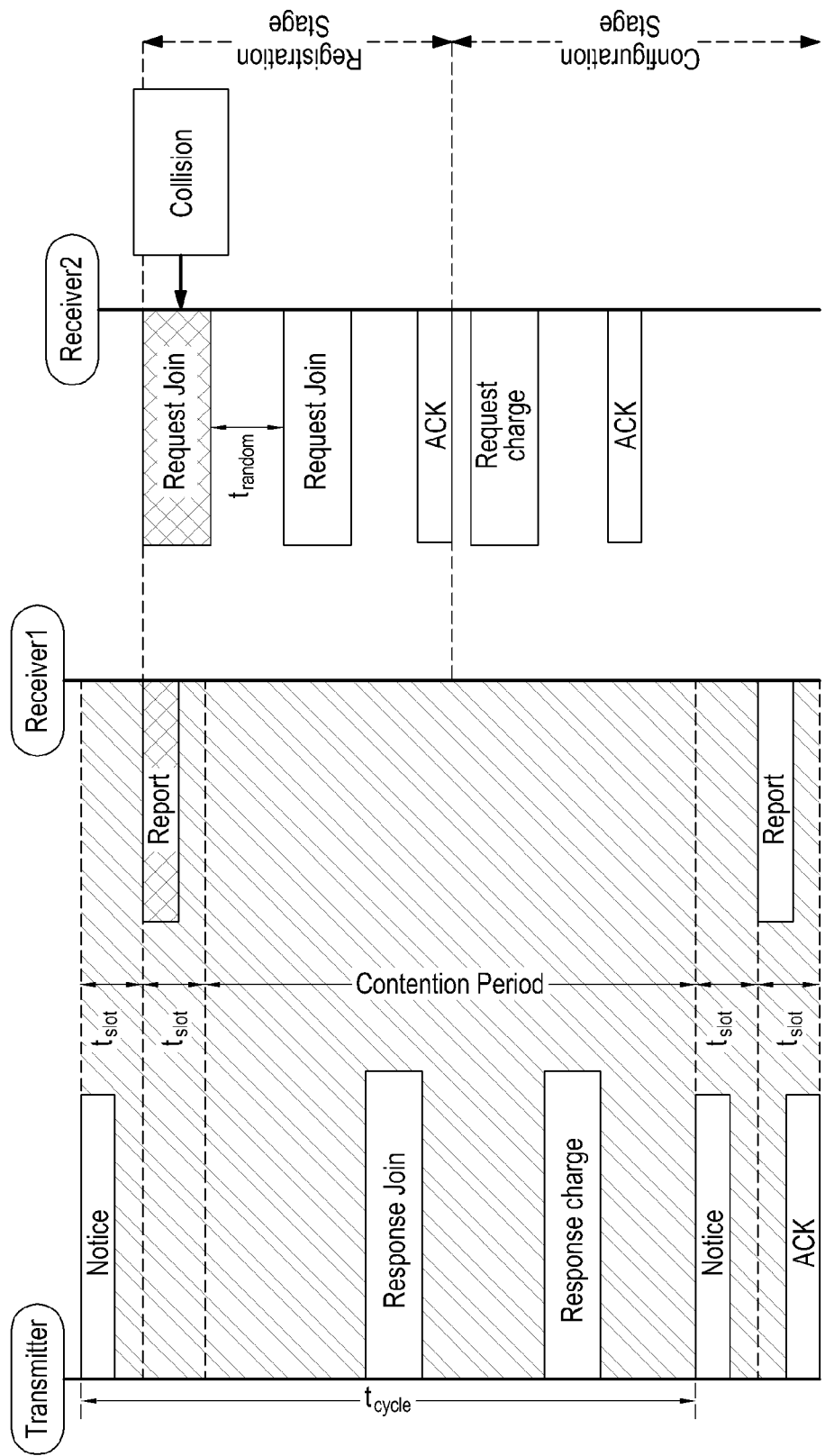
FIG. 68 is a view showing a procedure in which a new receiver (which will be referred to as a second receiver) is registered when at least one receiver (which will be referred to as a first receiver) is already in a charge state.

FIG. 68 is a view showing a procedure in which the new receiver 20 (which will be referred to as a second receiver Receiver 2) is registered when at least one receiver 20 (which will be referred to as a first receiver Receiver 1) is already in the charge state. When the second receiver Receiver 2 sends a packet Interactive_Request_Join_Frame to the transmitter 10 in the contention period, there is no packet collision with other receivers 20, i.e., the first receiver Receiver 1, which communicate with the transmitter 10 in each allocated time slot. The transmitter 10 registers an SID and the load characteristics of the second receiver Receiver 2 in the device control table. The transmitter 10 sends the Interactive_Response_Join_Frame packet including the SID to the second receiver Receiver 2. As a response, the second receiver Receiver 2 sends the ACK_Frame packet to the transmitter 10.

If the second receiver Receiver 2 sends the Interactive_Request_Join_Frame packet during the slotted period, i.e., the time slot period allocated to another receiver (e.g., the first receiver Receiver 1), then the Interactive_Request_Join_Frame packet may collide with the Report_Frame packet of the first receivers Receiver 1. When the second receiver Receiver 2 cannot receive the Interactive_Response_Join_Frame packet from the transmitter 10 within a response time of $t_{data\_res}$ due to collision between packets, the second receiver Receiver 2 tries to resend the Interactive_Request_Join_Frame packet at time intervals of $t_{random}$ until receiving the Interactive_Request_Join_Frame packet from the transmitter 10.

When a collision occurs between packets in the slotted period, the transmitter 10 may receive a corrupted Report_Frame packet from the currently charged first receiver Receiver 1. The transmitter 10 discards the corrupted Report_Frame packet and receives the Report_Frame packet from the first receiver Receiver 1 in the next cycle. According to an embodiment, if there are consecutive $n_{col\_ret}$ collisions in the Report_Frame packet delivery process of the first receiver Receiver 1, then the transmitter 10 transmits the Notice_Frame packet including Reset of Schedule Error data to all first receivers Receiver 1 or the second receiver Receiver 2, and returns to the detection state.

When a noncompliant or metal object is placed during charging of at least one receivers 20, that is, the first receivers Receiver 1, the transmitter 10 detects a positive (+) load variation over a threshold value. Thus, the transmitter 10 may not receive the Report_Frame packet from the first receivers Receiver 1. The transmitter 10 waits for reception of the Interactive_Request_Join_Frame packet from the object during a period of ($3 \times t_{cycle}$). If no response is heard from the object, the transmitter 10 may determine that the load is induced by a noncompliant device or metal object. In this case, the transmitter 10 may send Notice_Frame including Power Off of Abnormal Object Detection data to all first receivers Receiver 1 and stop power supply. In order to remove the non-compliant or metallic object, the transmitter 10 may show the warning message to the user. According to an embodiment, the transmitter 10 may stop power supply to the first receiver Receiver 1 and turn off the power during a warning period in which the warning message is shown to the user.

When the transmitter 10 fails to receive ACK_Frame from the second receiver Receiver 2 within a time of $t_{ack}$, the transmitter 10 repeats sending of the Interactive_Response_Join_Frame to the second receiver Receiver 2 $n_{reg\_ret}$ times more. However, if the transmitter 10 does not receive ACK_Frame from the second receiver Receiver 2 even after $n_{reg\_ret}$ trials, then the transmitter 10 recognizes that the second receiver Receiver 2 is removed from the interface of the transmitter 10. In this case, the transmitter 10 erases information of the non-responding receiver from the device control table.

If the number of first receivers Receiver 1 is larger than a maximum time slot number designed for the transmitter 10, that is, than the maximum number of receivers 20 which can be charged by the transmitter 10 at the same time, the transmitter 10 sends the Interactive_Response_Frame packet including Not Permission of Over Node data to the second receiver Receiver 2 and shows a warning message to the user until the second receiver Receiver 2 is removed by the user.

Figure 69:
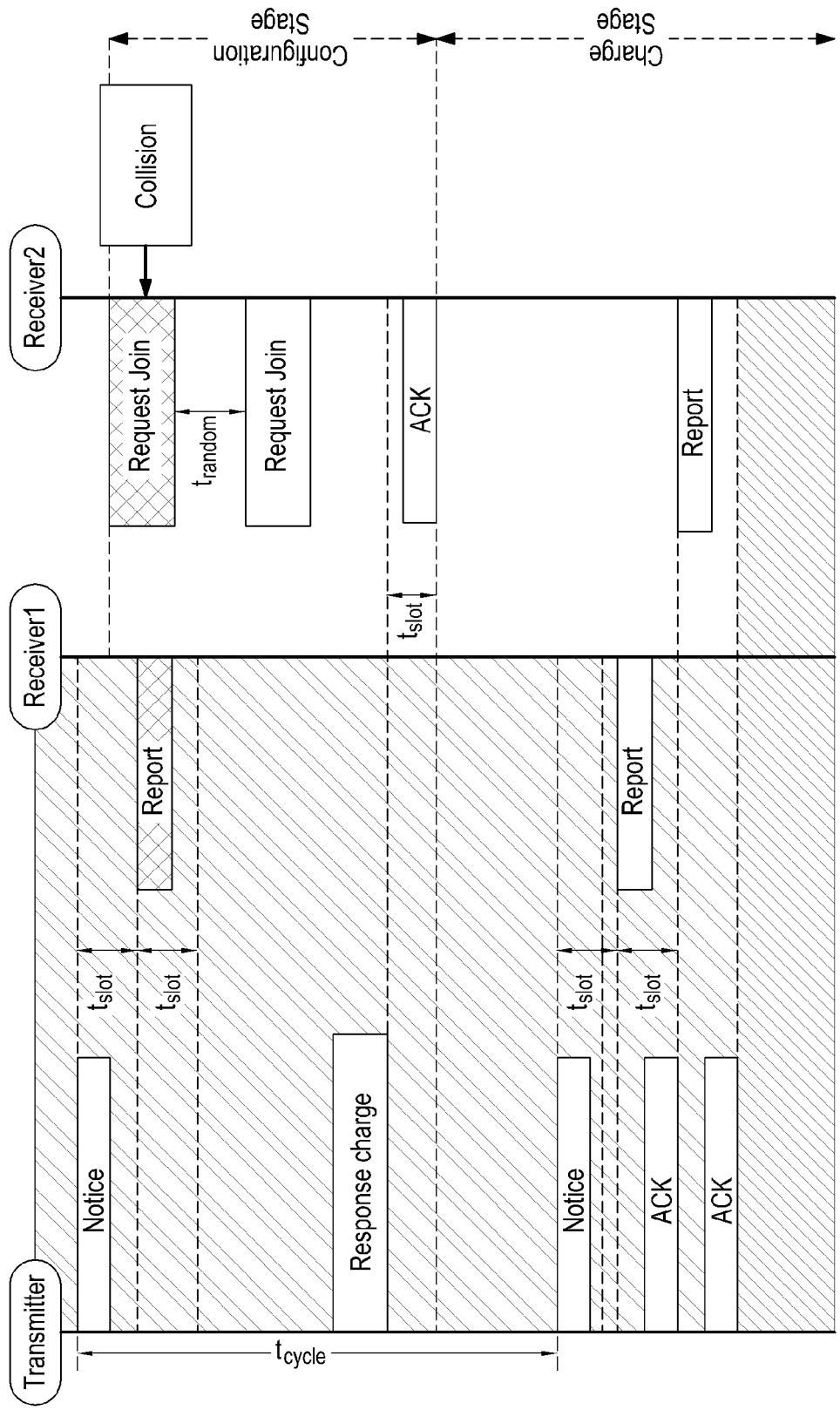
FIG. 69 is a view showing a process in which a second receiver Receiver 2 enters a charge state when multiple first receivers Receiver 1 are already in a charge state.

FIG. 69 is a view showing a process in which the second receiver Receiver 2 enters the charge state when multiple first receivers Receiver 1 are already in the charge state.

After the registration state, the second receiver Receiver 2 sends the Interactive_Request_Charge_Frame packet to the transmitter 10.

The Interactive_Request_Charge_Frame packet includes the electrical characteristics of the second receiver Receiver 2 such as current, voltage and power transmission efficiency. The power transmission efficiency is a premeasured value with reference transmitter systems. The transmitter 10 determines whether the current power transmission capacity satisfies the requested power from the first receiver Receiver 1. If the transmitter 10 has an enough power, the transmitter 10 sends the Interactive_Response_Charge_Frame packet including Permission data for charging to the second receiver Receiver 2. As a result of the determination, if the transmitter 10 does not have an enough power, the transmitter 10 sends No Permission data to the second receiver Receiver 2. The second receiver Receiver 2 having received No Permission data enters the standby state.

Soon after receiving the Permission data, the second receiver Receiver 2 sends ACK_Frame to the transmitter 10. As a result, the second receiver Receiver 2 can enter the charge state.

If the transmitter 10 fails to receive the Interactive_Request_Charge_Frame packet from the second receiver Receiver 2 within a time of $t_{req\_char}$ after transmitting Interactive_Response_Join_Frame, the transmitter 10 recognizes that the second receiver Receiver 2 is removed from the transmitter interface. In this case, the transmitter 10 erases the information of the non-responding receiver from the device control table. As a result, the transmitter 10 does not send Interactive_Response_Charge to the second receiver Receiver 2. The second receiver Receiver 2 does not receive Interactive_Response_Charge_Frame from the transmitter 10 within $t_{data\_res}$, and it returns to the detection state after the time interval of $t_{random}$.

If the transmitter 10 does not receive the ACK_Frame packet from the second receiver Receiver 2 within a time of $t_{ack}$, the transmitter 10 repeats $n_{reg\_ret}$ times to send the Interactive_Response_Charge_Frame packet including Permission data to the second receiver Receiver 2. However, when the transmitter 10 fails to receive the ACK_Frame packet from the second receiver Receiver 2 even after $n_{reg\_ret}$ trials, the transmitter 10 recognizes that the second receiver Receiver 2 is removed from the transmitter interface. In this case, the transmitter 10 erases the information of the non-responding receiver from the device control table. The second receiver Receiver 2 cannot enter the charge state and returns to the registration state.

When the current power transmission capacity of the transmitter 10 does not meet the required power by the second receiver Receiver 2, the transmitter 10 sends the Interactive_Response_Charge_Frame packet having no Permission data to the second receiver Receiver 2 and the second receiver Receiver 2 enters the standby state. If the requested power of the second receiver Receiver 2 exceeds the maximum overall power capacity of the transmitter 10, the transmitter 10 sends the Interactive_Response_Charge_Frame packet including Reset of Over Power data to the second receiver Receiver 2. In this case, the transmitter 10 sends a corresponding warning message of the over power capacity to the user interface and the transmitter 10 turns back to the detection state.

Figure 70:
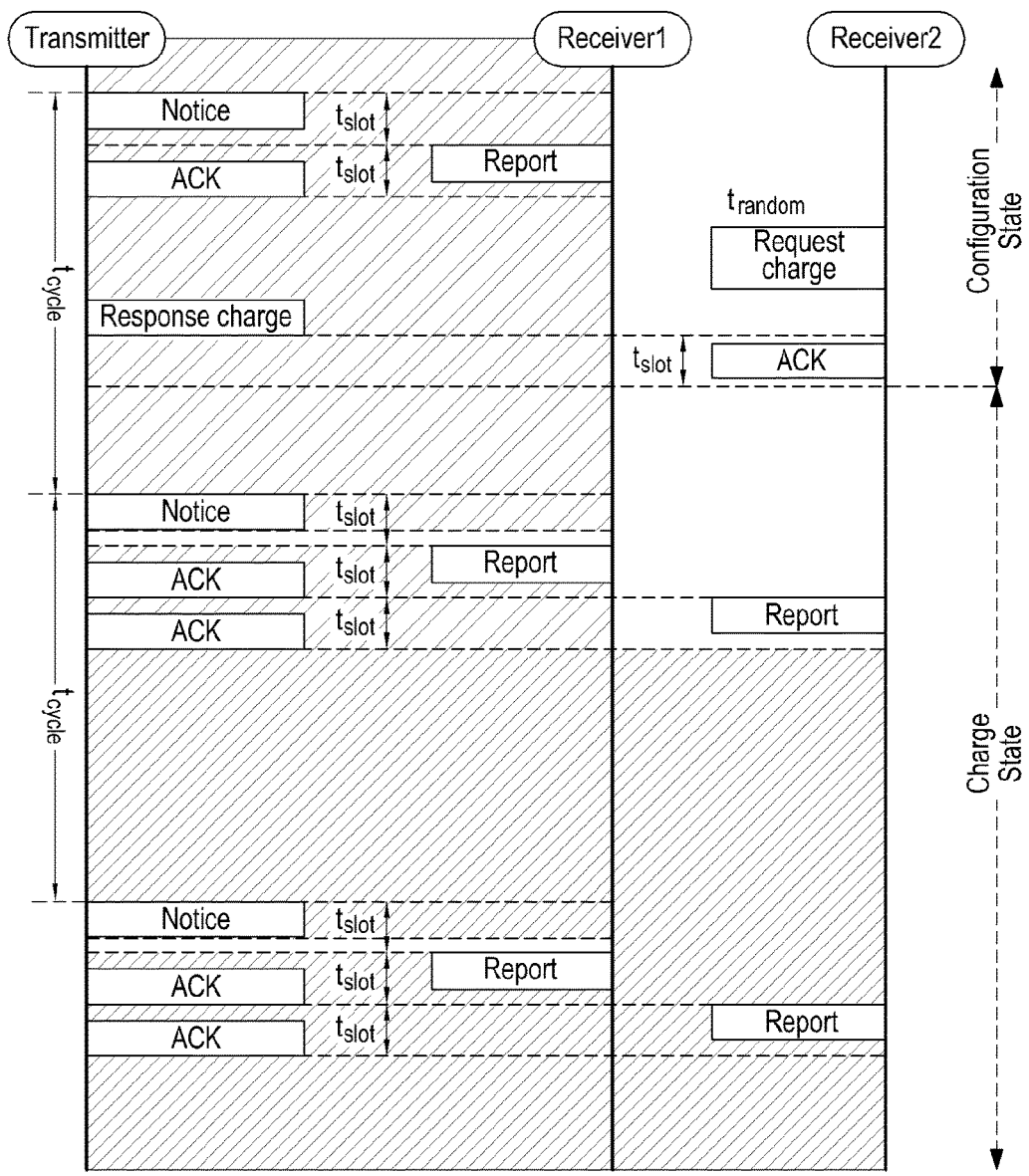
FIG. 70 is a view showing a charge process of multiple first receivers Receiver 1.

In the charge state, the transmitter 10 broadcasts a packet Notice_Frame to the first receiver Receiver 1 in each time slot. The first receiver Receiver 1 sends a packet Report_Frame including its status to the transmitter 10. The Notice_Frame frame is allotted in slot 0 and the slot number of the Report_Frame packet allocated to the first receiver Receiver 1 is same as the SID as shown in FIG. 70. FIG. 70 is a view showing a charge process of the multiple first receivers Receiver 1.

The transmitter 10 broadcasts a packet Notice_Frame including a command for power off, power on, and reset to all receivers. The Notice_Frame packet also has various commands for a specific receiver such as charge start, charge finish, reset, power off, synch and change slot.

Report_Frame includes the charge status and power information of the first receiver Receiver 1. The transmitter 10 receives the Report_Frame packet from each of the first receivers Receiver 1 within a time slot allocated to each of the first receivers Receiver 1. Otherwise, a collision may occur between Report_Frame packets sent between the first receivers Receiver 1. Therefore, the transmitter 10 and the first receivers Receiver 1 should be accurately synchronized. For this purpose, the Notice_Frame packet may have Sub Frame of Sync data which allows the first receiver Receiver 1 to synchronize its clock to that of the transmitter 10.

Based on the power information included in Report_Frame sent from the first receiver Receiver 1, the transmitter 10 updates the device control table in a registry corresponding to a status of each of the first receivers Receiver 1. The transmitter 10 calculates a sum of the required power from the first receivers Receiver 1 and increases or decreases the power applied to the Tx resonator 11 according to the calculation result. This operation of the transmitter 10 may be performed periodically at time intervals of $t_{cycle}$.

When at least one packet of the first receiver Receiver 1 collide with at least one of packets of the second receivers Receiver 2 in a time slot period allocated to the first receiver Receiver 1, the packet sent from the first receiver Receiver 1, the Report_Frame packet is corrupted. The transmitter 10 discards the corrupted Report_Frame packet received from the first receiver Receiver 1 preoccupying the time slot between the first receiver Receiver 1 and the second receiver Receiver 2. The transmitter 10 receives the Report_Frame packet of the preoccupying first receiver Receiver 1 in the next superframe. The transmitter 10 repeats the operation of receiving the Report_Frame packet up to $n_{col\_ret}$ times until a collision does not occur and thus the non-corrupted Report_Frame packet is received. When the first receiver Receiver 1 sends the Report_Frame packet to the transmitter 10, if there are continuous $n_{col\_ret}$ collisions with the packet of the second receiver Receiver 2, the transmitter 10 sends the Notice_Frame packet including Reset of Schedule Error data to all the first receivers Receiver 1 or second receiver Receiver 2 and returns to the detection state.

If the first receiver Receiver 1 does not receive the ACK_Frame packet from the transmitter 10 within $t_{ack}$, the first receiver Receiver 1 tries to send the Report_Frame packet in its next time slot which comes at time intervals of $t_{cycle}$. When the first receiver Receiver 1 does not get the ACK_Frame packet from the transmitter 10 during next three superframe periods of ($3 \times t_{cycle}$), the first Receiver 1 sends the Report_Frame packet including Charge Status of Error data to the transmitter 1 and turns back to the registration state.

Figure 71:
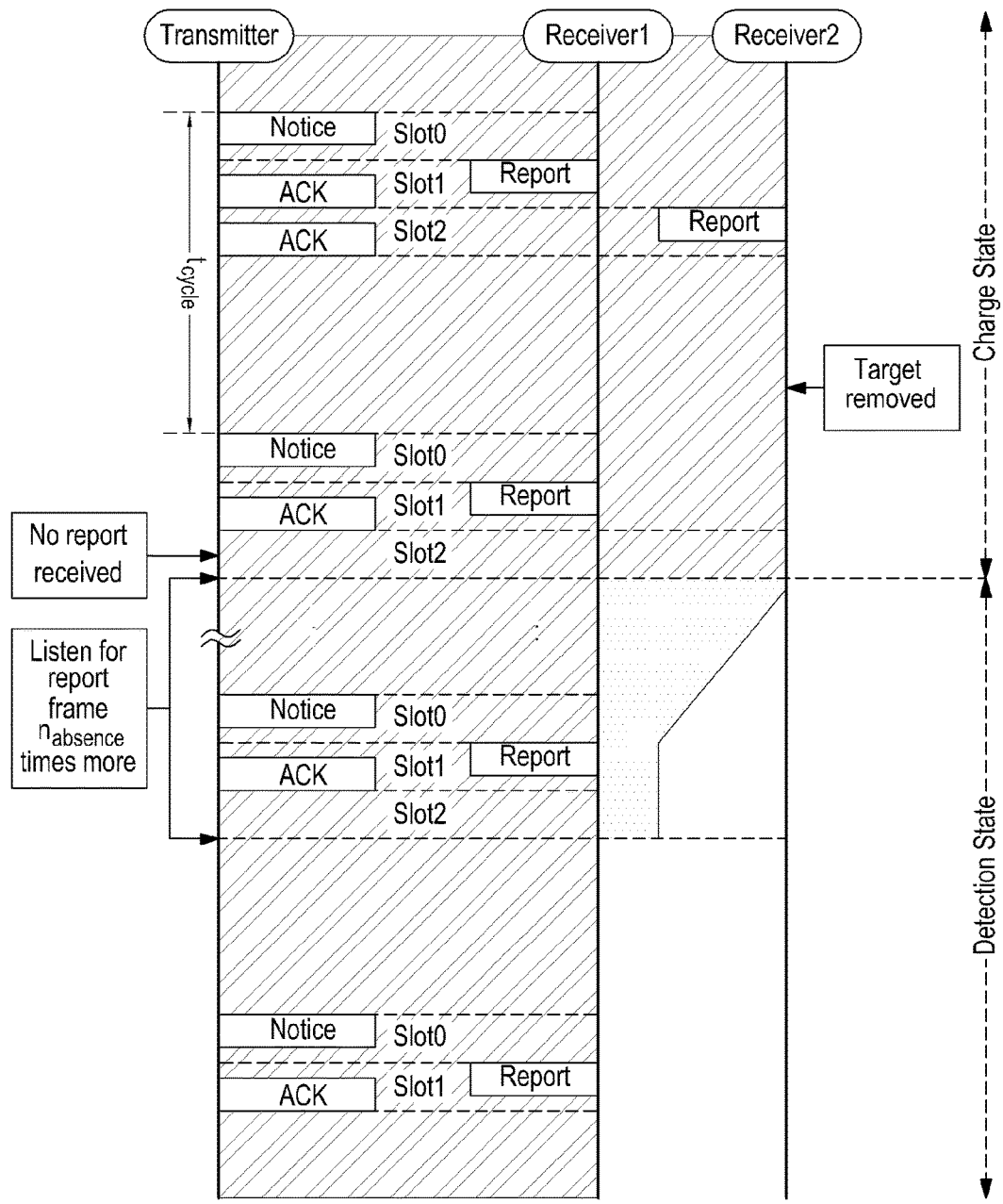
FIG. 71 is a view showing a process in which one of multiple receivers charged by a transmitter is removed.

If one of the multiple first receivers Receiver 1 is removed from the interface of the transmitter 10 in the charge state as shown in FIG. 66, the transmitter cannot receive the Report_Frame packet from the removed first receiver Receiver 1. FIG. 71 is a view showing a process in which one of the multiple receivers charged by the transmitter 10 is removed. In the following description, a non-removed receiver will be referred to as a first receiver Receiver 1 and a removed receiver will be referred to as a second receiver Receiver 2.

In order to distinguish this event of removal of the second receiver Receiver 2 from the interface of the transmitter 10 from the event of frame collision, the transmitter 10 may wait for reception of Report_Frame from the second receiver Receiver 2 for a period ($n_{absence} \times t_{cycle}$).

In the period ($n_{absence} \times t_{cycle}$), the transmitter 10 may smoothly decrease the power applied to the second receiver Receiver 2 to the power level $P_{reg}$. If there is no transmission of Report_Frame from the second receiver Receiver 2 even after reception of Report_Frame from the second receiver Receiver 2 is waited for $n_{absence} \times t_{cycle}$ times, the transmitter 10 recognizes that the second receiver Receiver 2 is removed. The transmitter 10 updates the device control table and cuts off power for the second receiver Receiver 2.

As such, if power transmission to the particular receiver 20, that is, the second receiver Receiver 2 is cut off, the transmitter 10 may reassign SID(s) and time slot(s) for the remaining receiver(s), that is, the first receiver(s) Receiver 1. Among time slots allocated by the transmitter 10 to the first receivers Receiver 1 and the second receiver Receiver 2, a vacant time slot has been emerged due to the receiver removal. It is not efficient to leave a vacant time slot among occupied slots. Therefore, it is desirable to eliminate a vacant time slot by reallocating the vacant time slot used by the second receiver Receiver 2 to the first receiver Receiver 1 which occupies the last time slot among the allocated time slots. The transmitter 10 sends Notice_Frame including the reallocated SID to the first receiver Receiver 1 which occupies the last time slot, and updates its device control table. As a result, the first receiver Receiver 1 reallocated with the time slot sends Report_Frame to the transmitter 10 in the next superframe period.

Figure 72:
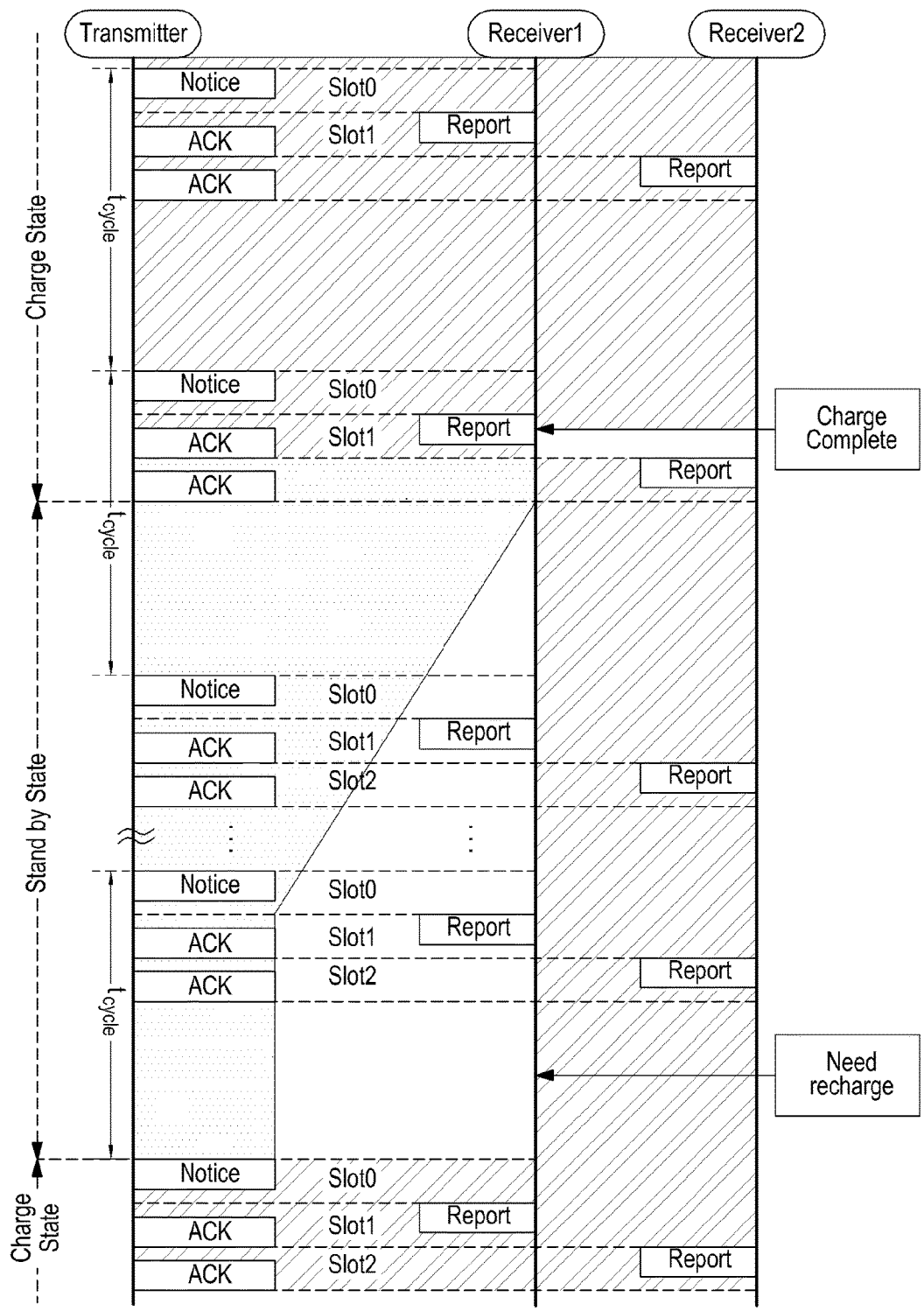
FIG. 72 is a view showing a process of recharging a first receiver Receiver 1 in a charge process of the first receiver Receiver 1 and a second receiver Receiver 2.

FIG. 72 is a view showing a process of recharging the first receiver Receiver 1 in the charge process of the first receiver Receiver 1 and the second receiver Receiver 2.

When the device battery of the first receiver Receiver 1 is fully charged, the first receiver Receiver 1 sends the Report_Frame packet including Charge Status of Complete and Standby data to the transmitter 10, and the first receiver Receiver 1 enters the standby state. Then, since charging of the first receiver Receiver 1 is completed, the transmitter 10 updates the device control table. To prevent an abrupt voltage fluctuation, the transmitter 10 may smoothly reduce the power applied to the Tx resonator 11 to the power level $P_{reg}$ for the first receiver Receiver 1.

When the first receiver Receiver 1 needs to recharge the battery, the first receiver Receiver 1 sends the Report_Frame packet including Charge Status of CC data to the transmitter 10. Thus, the first receiver Receiver 1 enters the charge state. Then, the transmitter 10 having received the Report_Frame packet from the first receiver Receiver 1 updates the device control table and increases the power applied to the Rx resonator 11 for the first receiver Receiver 1. In FIG. 72, it is assumed that the second receiver Receiver 2 is continuously charged.

Figure 73:
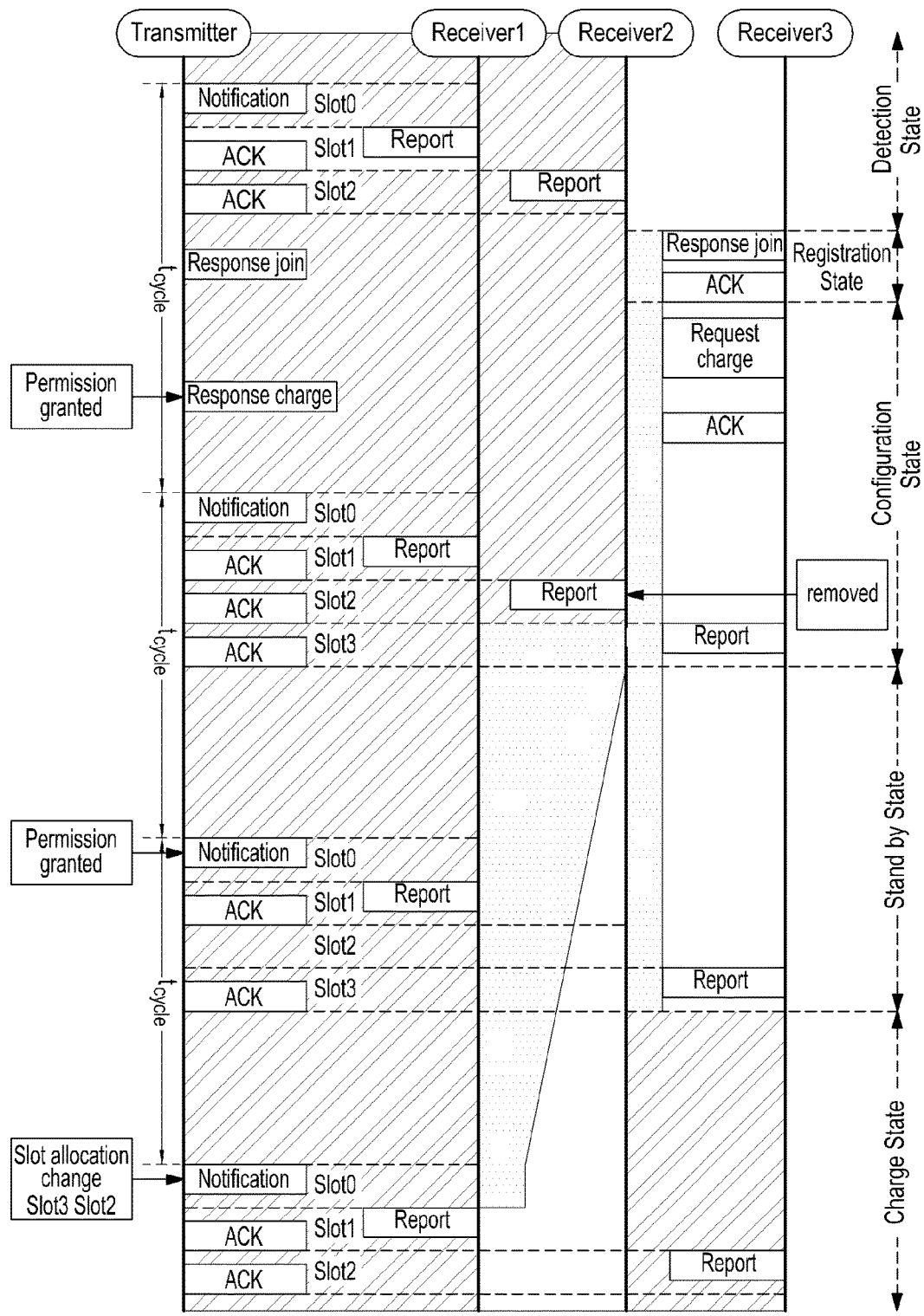
FIG. 73 is a view showing a short identification (SID) exchange process between multiple receivers.

FIG. 73 is a view showing an SID exchange process between multiple receivers.

When the multiple receivers, e.g., the first receiver Receiver 1, the second receiver Receiver 2, and a third receiver Receiver 3 are placed on the interface of the transmitter 10, the power capacity of the transmitter 10 may be less than the total power required by the multiple receivers (first through third receivers). As such, if the power capacity of the transmitter 10 is less than the total power required by the receivers, the temporally latest joining or registered receiver has to stay in the standby state rather than the charge state.

In FIG. 73, the first receiver Receiver 1 and the second receiver Receiver 2 are in the charge state and the third receiver stays in the standby state. The first through third receivers are allocated with a first time slot Slot 1, a second time slot Slot 2, and a third time slot Slot 3, respectively.

Referring to FIG. 73, out of the first receiver Receiver 1 and the second receiver Receiver 2 in the charge state, the second receiver Receiver 2 is fully charged and enters the standby state. The transmitter 10 sends the Notice_Frame packet including Charge Start data to the third receiver Receiver 3 being in the standby state. Since power information sent from the receiver 20 being in the charge state is more important, the transmitter 10 reallocates SIDs of 2 currently charged receivers, that is, the first receiver Receiver 1 or the third receiver Receiver 3 to exchange the SIDs of those receivers. Thus, as shown in FIG. 73, the third receiver Receiver 3 is reallocated with the second time slot Slot 2.

(Superframe Structure)

A superframe including a time slot and a contention period according to the present invention may be designed by an anti-collision algorithm of the communication packet, which is modified from IEEE802.15.4 CSMA/CA algorithm. The superframe length in time is defined as a cycle time of $t_{cycle}$.

Figure 74A:
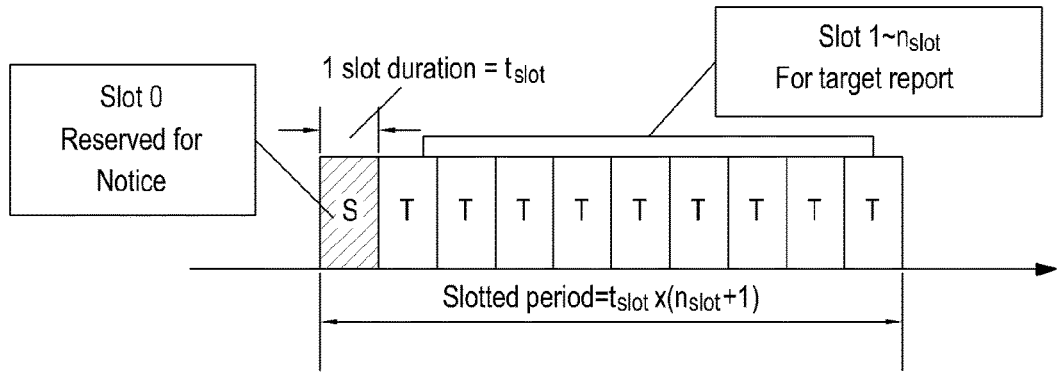
FIG. 74A is a view showing a time slot period of a Superframe.
Figure 74B:
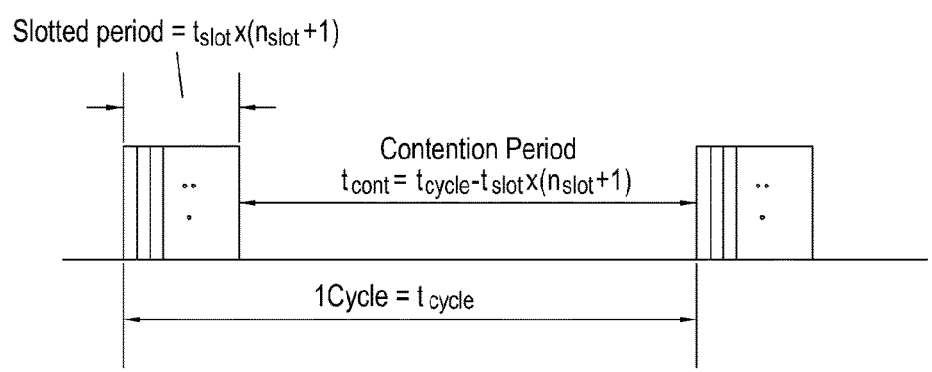
FIG. 74B is a view showing a time slot period and a contention period of a Superframe.

FIG. 74A is a view showing a time slot period of a Superframe, and FIG. 74B is a view showing a time slot period and a contention period of a superframe. In FIGS. 74A and 74B, $t_{cycle}$ represents a superframe length in time (e.g., 250 ms), $t_{slot}$ represents a duration of a time slot (e.g., 5 ms), and $n_{slot}$ represents a total number of time slots allocated by the transmitter 10. $t_{cont}$ represents a length in time during a contention period, and can be expressed as:

$$t_{cont} = t_{cycle} - (n_{slot} + 1) \times t_{slot} \quad (22)$$

The superframe may consist of 2 parts as a time slotted period and a contention period as shown in FIGS. 74A and 74B. The receiver 20 is allowed to send the Report_Frame packet only during its own allocated time slot in the slotted time period and is not allowed to send the Report_Frame packet to the transmitter 10 during the contention period. As such, by transmitting its Report_Frame packet to the transmitter 10 only during an allowed time slot for each receiver 20, a collision of communication packets between the multiple receivers 20 is minimized.

It is assumed that an existing receiver is the first receiver Receiver 1 and a newly joining receiver is the second receiver Receiver 2. When the second receiver Receiver 2 sends the Interactive_Request_Join_Frame packet to the transmitter 10 during the time slotted period, the Interactive_Request_Join_Frame packet sent from the second receiver Receiver 2 may collide with packets sent from at least one first receivers Receiver 1.

As such, if packets sent from different receivers (first and second receivers) collide with each other, the first receiver Receiver 1 fails to receive the ACK_Frame packet from the transmitter 10. The first receiver Receiver 1 sends again the Report_Frame packet to the transmitter 10 during its allocated time slot period in the next Superframe.

The second receiver Receiver 2 sends the Interactive_Request_Join_Frame packet to the transmitter 10 during an arbitrary delay time $t_{random}$ which is smaller than $t_{cycle}$. In this way, the new receiver, that is, the second receiver Receiver 2 may be allocated with an SID and a time slot to send the Report_Frame packet to the transmitter 10 without communication packet collision with other receiver (first receiver). According to an embodiment, the transmitter 10 may send the Interactive_Request_Join_Frame packet from the second receiver Receiver 2 in the contention period. In the contention period, the first receiver Receiver 1 does not send the Report_Frame packet to the transmitter 10. Therefore, the transmitter receives the Interactive_Request_Join_Frame packet in the contention period from the second receiver Receiver 2, thereby minimizing the possibility of packet collision that may occur between the first receivers Receiver 1 and the second receiver Receiver 2.

In the slot period, a zero slot Slot 0 is a period in which the Notice_Frame packet is transmitted from the transmitter 10 to the first receiver Receiver 1 or the second receiver Receiver 2. The Notice_Frame packet includes clock synchronization information which allows the first receiver Receiver 1 or the second receiver Receiver 2 to synchronize its clock with that of the transmitter 10, and an SID. The transmitter 10 can also send a specific command to the first receiver Receiver 1 or the second receiver Receiver 2 corresponding to a particular SID by the particular SID in the Notice_Frame packet.

Referring to FIG. 74A, a time slot period of $t_{slot}$ is allocated to the first or second receiver. According to an embodiment, the first slot Slot 1 is allocated to the first or second receiver having the first SID, and the second slot Slot 2 is allocated to the first or second receiver having the second SID. In this way, an $N^{th}$ slot Slot N is allocated to the first or second receiver having an $N^{th}$ SID. According to an embodiment, a number of a slot allocated to the first or second receiver may be below 10. Assuming that the total number of slots allocated to the first or second receiver by the transmitter 10 is 10, a time slot period is about $(10 \times t_{slot})$.

If the number of first or second receivers is larger than the maximum number of time slots which can be allocated by the transmitter 10, the transmitter 10 sends the Interactive_Response_Frame packet including Not Permission of Over Node data to the new receiver, that is, the second receiver Receiver 2, and sends a warning message to the user interface until the new receiver Receiver 2 is removed by the user.

Time constraints for a proper operation of the power transmission system according to the present invention are as shown in FIG. 66. The time constraints shown in FIGS. 60 through 74 are as shown in Table 17 provided below.

TABLE 17

| Timing | Symbol | Value | FIG. |
|---|---|---|---|
| Superframe Length | $t_{cycle}$ | 250 ms | FIG. 74A, FIG. 74B |
| Time Slot Duration | $t_{slot}$ | 5 ms | FIG. 74A, FIG. 74B |
| Detection Time | $t_{det}$ | 5 ms | FIG. 70 |
| Detection Period | $t_{det\_per}$ | 250 ms | FIG. 70 |
| Registration Time | $t_{reg}$ | 10 ms | FIG. 71 |
| Registration Retrial Time | $t_{reg\_ret}$ | 50 ms | FIG. 62 |
| Number of Registration Retrials | $n_{reg\_ret}$ | 2 | FIG. 62 |
| Data Response Time | $T_{data\_res}$ | 3 ms | FIG. 71 |
| Acknowledgement Time | $t_{ack}$ | 1 ms | FIG. 71 |
| Data Response Time | $t_{data\_res}$ | 3 ms | FIG. 71 |
| Requested Charge Time | $t_{req\_char}$ | 10 ms | FIG. 72 |
| Arbitrary Time | $T_{random}$ | 50 ms~240 ms | FIG. 62 |
| Maximum Number of Absences | $n_{absence}$ | 2 | FIG. 66 |
| Number of Continuous Collisions | $n_{collision}$ | 3 | |

Figure 75:
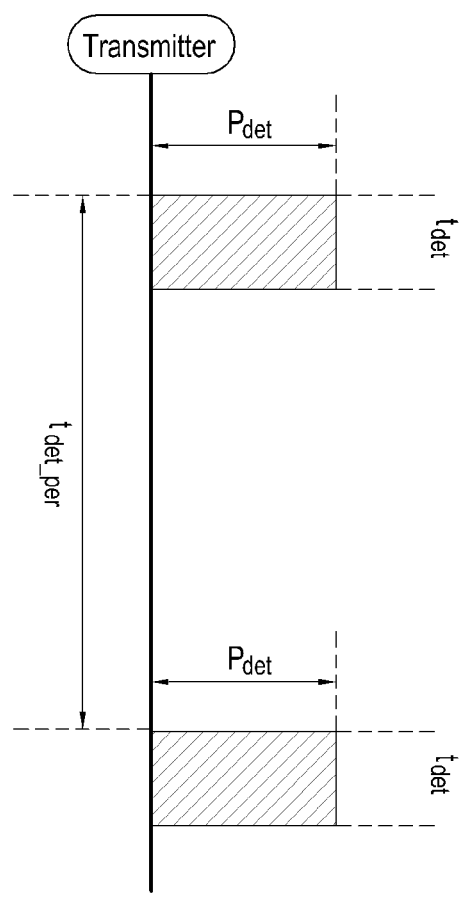
FIG. 75 is a view showing timing constraints in a detection state.

FIG. 75 is a view showing timing constraints in the detection state. As shown in FIG. 75, the transmitter 10 in the detection state applies the power to the Tx resonator 11 during $t_{det}$ at every $t_{det\_per}$ in order to detect the new receiver 20 with sensing a positive load variation. The power level $P_{det}$ output from the transmitter 10 may be determined by a load sensibility of the transmitter 10.

Figure 76:
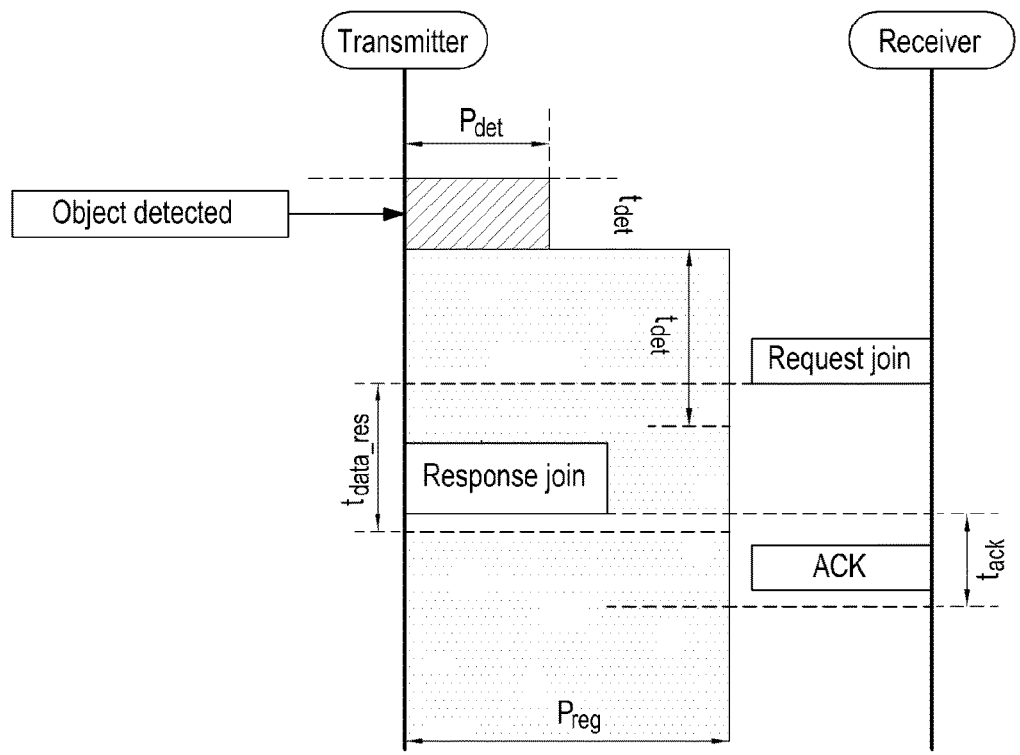
FIG. 76 is a view showing timing constraints in a registration state.

FIG. 76 is a view showing timing constraints in the registration state. As shown in FIG. 76, the transmitter 10, upon sensing the positive load variation, increases the power applied to the Tx resonator 11 up to the level $P_{reg}$ which is enough for the Rx controller 25 of the receiver 20 to wake up. However, this step is a step prior to start of charging, and in this step, the receiver 20 does not supply the power received from the transmitter 10 to the battery charge system including the receiver 20. The receiver 20 responds to the Interactive_Request_Join_Frame packet transmitted from the transmitter 10 within $t_{reg}$. If there is no response from the receiver 2 within $t_{reg}$, the transmitter 10 stops applying the power to the Tx resonator 11 for a time interval of $t_{reg\_ret}$. The transmitter may repeat the foregoing procedure $n_{reg\_ret}$ times. When the Interactive_Request_Join_Frame packet is not received even after $n_{reg\_ret}$ retrials, the transmitter 10 stops applying the power ($P_{reg}$) to the Tx resonator 11 and returns to the detection state.

Figure 77:
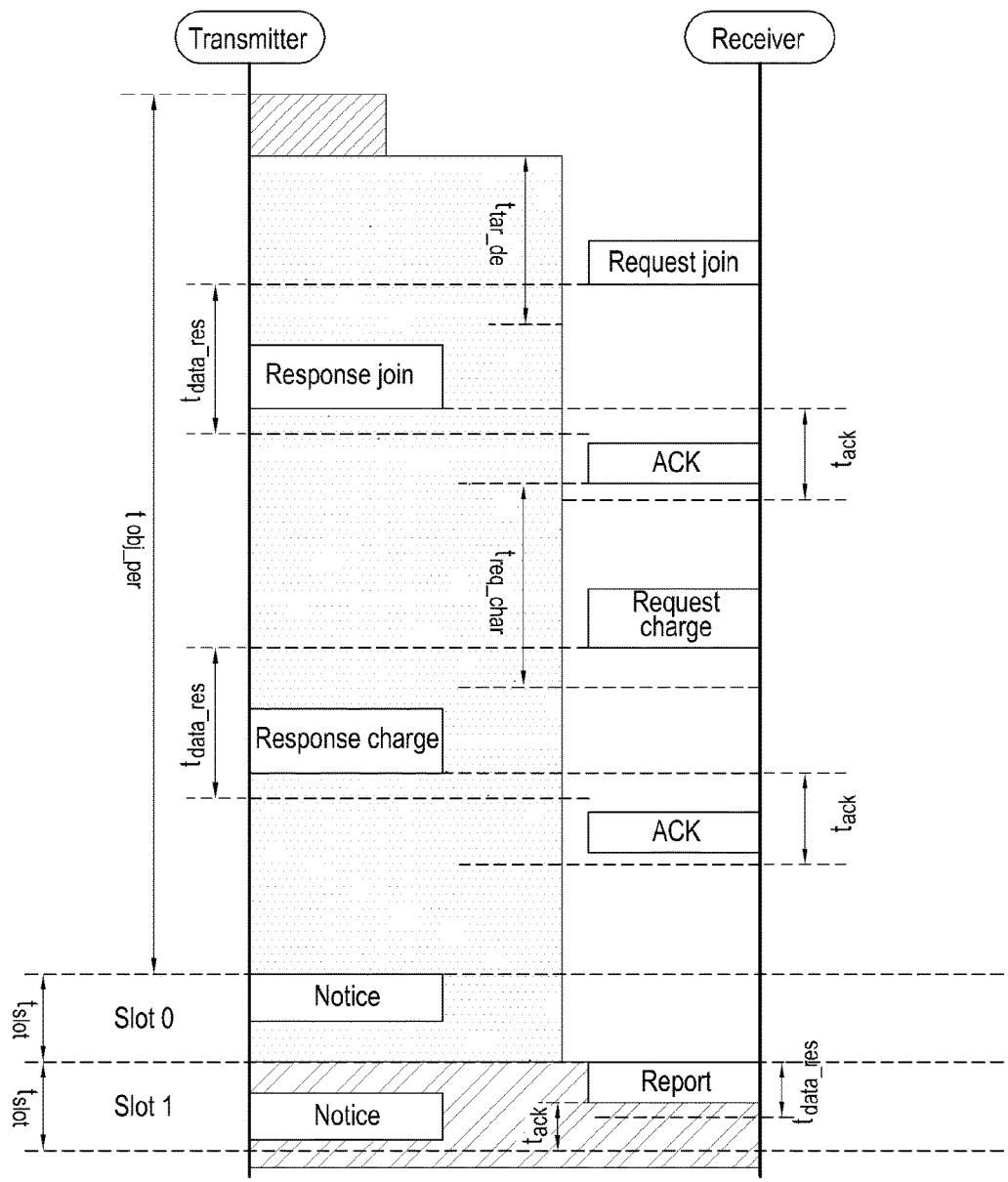
FIG. 77 is a view showing timing constraints in a configuration state.

FIG. 77 is a view showing timing constraints in the configuration state. Referring to FIG. 77, as the response to the Interactive_Response_Join_Frame packet sent from the transmitter 10, the receiver 10 sends the ACK_Frame packet to the transmitter 10. The receiver 20 also sends the Interactive_Request_Charge_Frame packet to the transmitter within $t_{req\_char}$. The transmitter 10 having received the Interactive_Request_Charge_Frame packet from the receiver 20 transmits the Interactive_Response_Charge_Frame packet to the receiver 20 within $t_{data\_res}$. As the response to the Interactive_Response_Charge_Frame packet, the receiver 20 sends the ACK_Frame packet to the transmitter 10 within $t_{ack}$. Through the foregoing procedure, the receiver 20 may enter the charge state and receive the power output from the transmitter.

Figure 78:
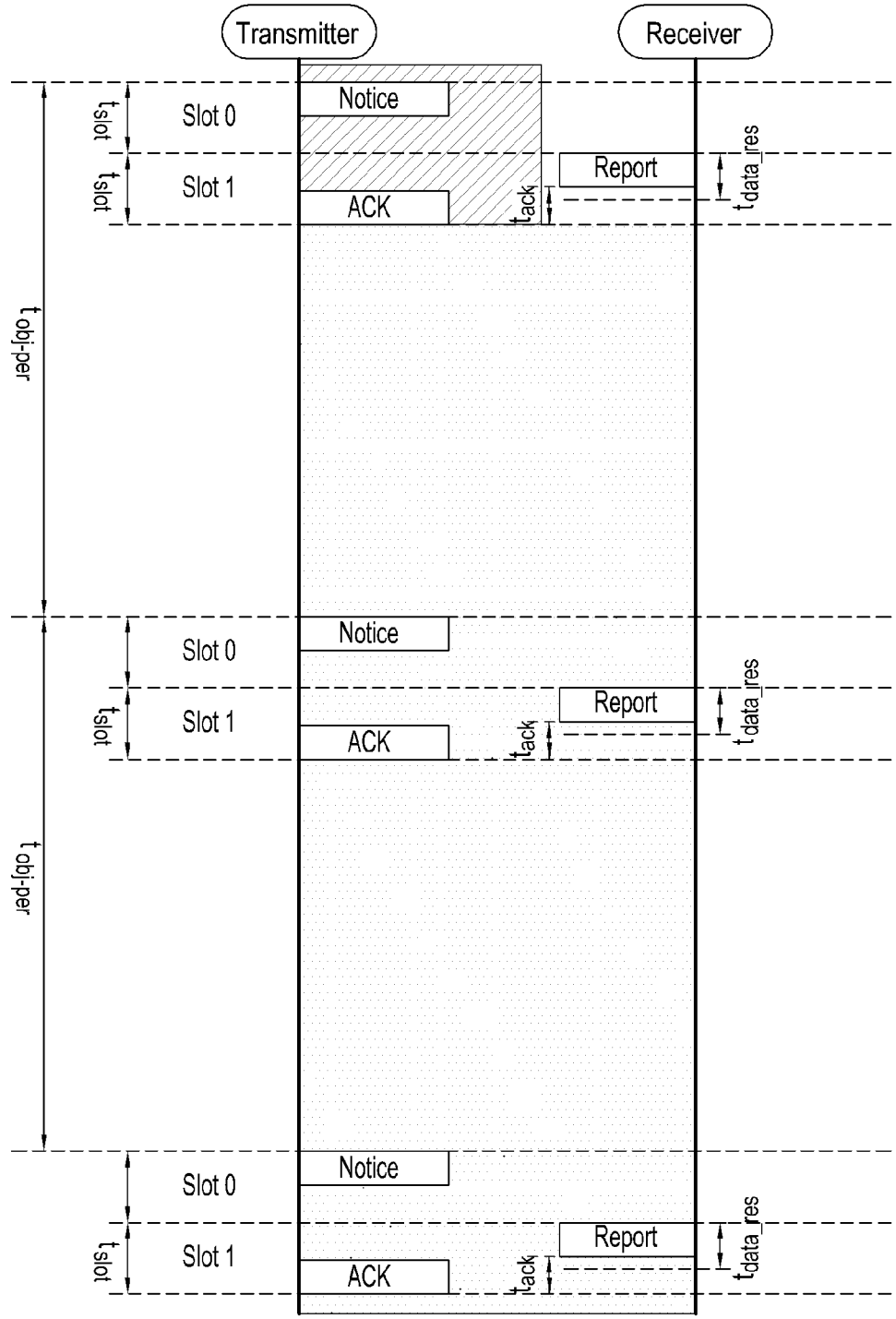
FIG. 78 is a view showing timing constraints in a charge state.

FIG. 78 is a view showing timing constraints in the charge state. Referring to FIG. 78, in the charge state, the zero slot Slot 0 is a time slot period in which the transmitter 10 broadcasts the Notice_Frame packet to the receiver 20. Thus, the transmitter 10 does not allocate the zero slot to the receiver 20. The first slot Slot 1 is allocated to the first receiver Receiver 1, such that the first receiver Receiver 1 sends the Report_Frame packet to the transmitter 10 within $t_{data\_res}$. The transmitter 10 having received the Report_Frame packet from the first receiver Receiver 1 sends the ACK_Frame packet to the first receiver Receiver 1 within $t_{ack}$. In the foregoing manner, the transmitter 10 and the first receiver Receiver 1 may periodically share power negotiation information such as voltage, current, and power transmission efficiency. If the first receiver Receiver 1 is removed from the interface (e.g., the charge pad) of the transmitter 10 and there is no Report from the first receiver Receiver 1 (the Report_Frame packet is not sent to the transmitter 10), then the transmitter 10 determines that the first receiver Receiver 1 is removed. Since the first receiver Receiver 1 is removed, the transmitter 10 reallocates the time slot allocated to the first receiver Receiver 1, that is, the first slot Slot 1, to the last receiver in the charge state. As such, the transmitter 10 according to the present invention reduces the number of slots allocated to the receiver 20 and increases the contention period, thus minimizing the communication collision possibility.

In the standby state, the timing constraints are the same as those in the charge state.

Meanwhile, if the receiver 20 detects an interrupt related to safety, the transmitter 10 sends the Notice_Frame packet including Power Off of Internal Error data to the receiver 20. As a result, the transmitter 10 may stop applying the power to the Tx resonator 11 to protect the damage of its own circuit and the receiver 20 from the over-temperature, over current and over voltage, etc.

Figure 79:
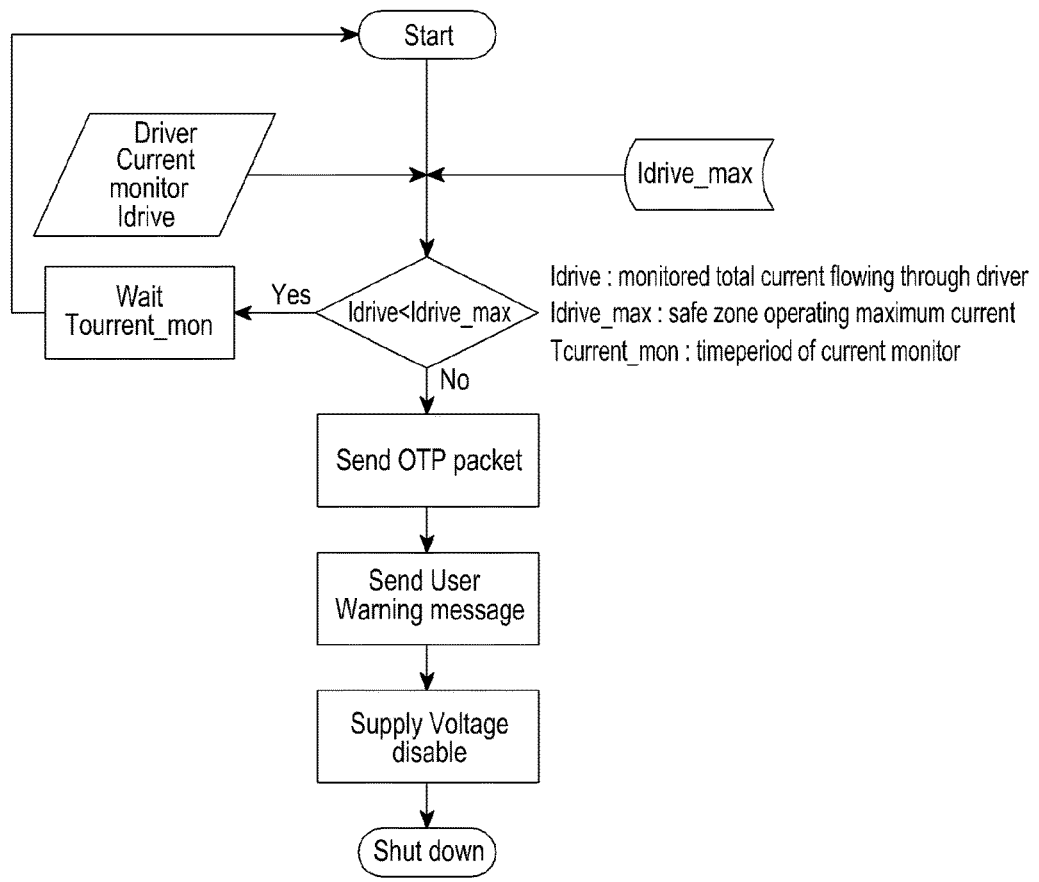
FIG. 79 is a flowchart showing a method for a transmitter to protect a power transmission system from an overcurrent.
Figure 80:
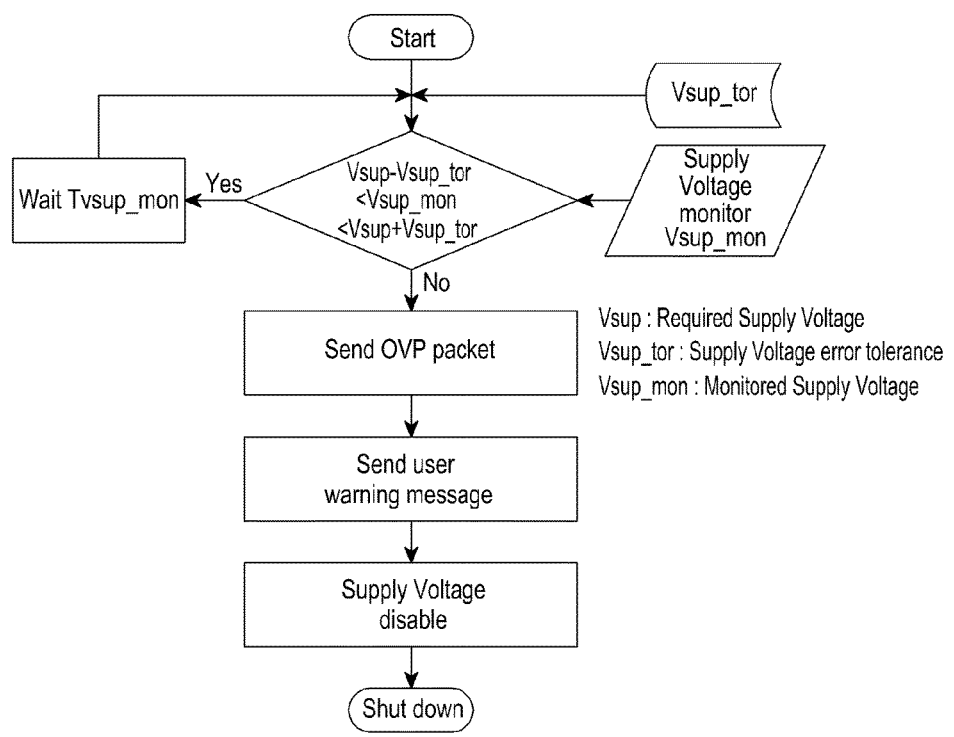
FIG. 80 is a flowchart showing a method for a transmitter to protect a power transmission system from an overvoltage.
Figure 81:
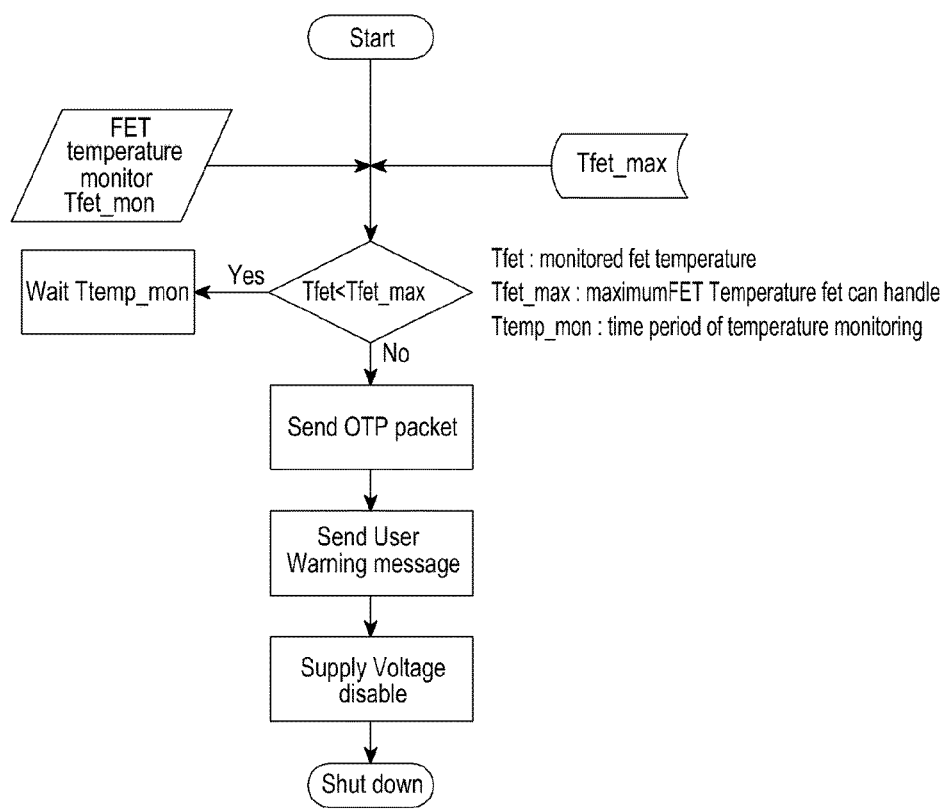
FIG. 81 is a flowchart showing a method for a transmitter to protect a power transmission system from an overtemperature.

FIG. 79 is a flowchart showing a method for the transmitter 10 to protect a power transmission system from an over-current, FIG. 80 is a flowchart showing a method for the transmitter 10 to protect a power transmission system from an over-voltage, and FIG. 81 is a flowchart showing a method for the transmitter 10 to protect a power transmission system from an over-temperature.

The receiver 20 according to the present invention may detect an interrupt related to safety. Upon detection of the interrupt, the receiver 20 sends Report_Frame including Error of corresponding Reason data such as Over Current, Over Voltage data and Over Temperature data to the transmitter 10. As a result, the transmitter 10 stops applying the power to the Tx resonator 11 in order to protect the damage of the receiver 20 and its own circuit from the over-temperature, over current and over voltage, etc.

Figure 82:
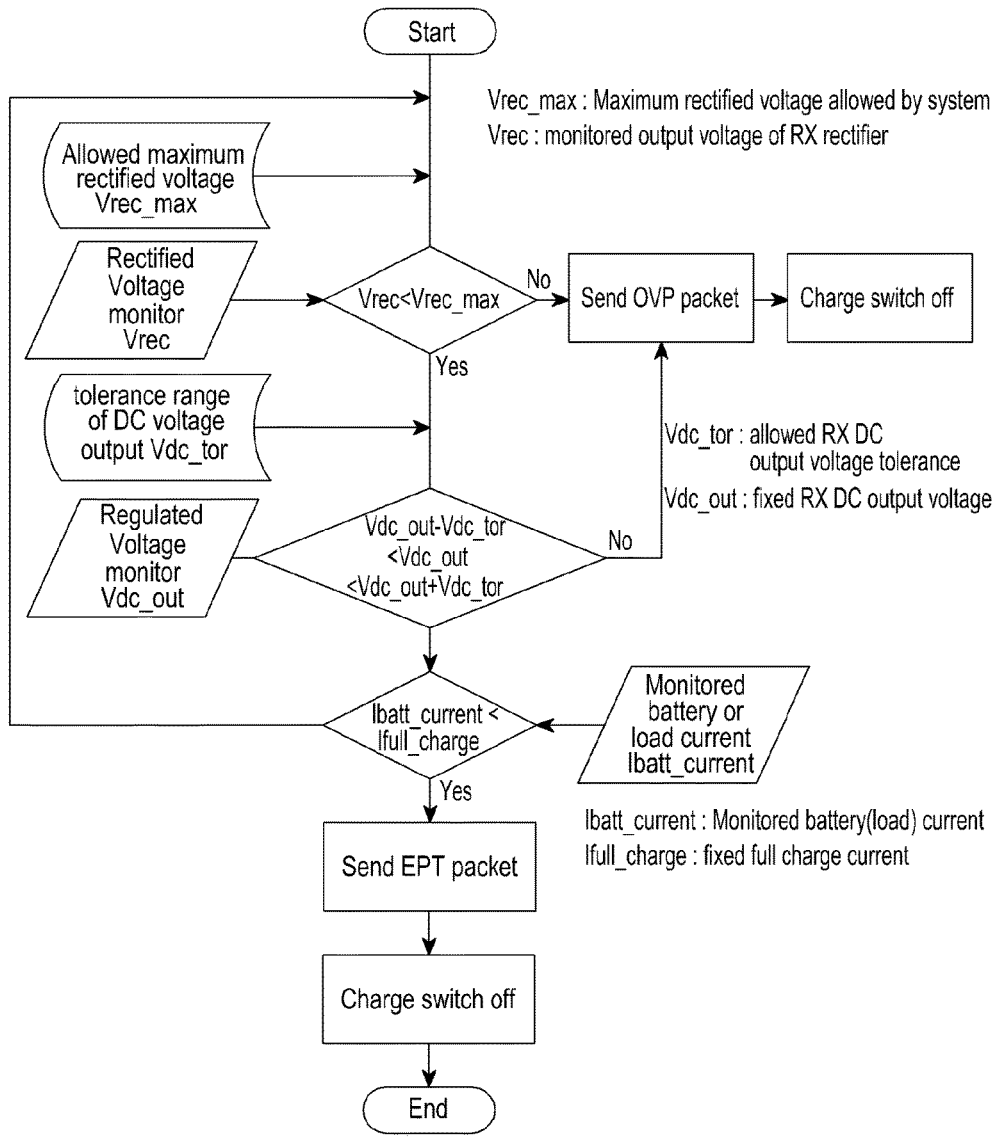
FIG. 82 is a flowchart showing a method for a receiver to protect a power transmission system from an over-voltage.

FIG. 82 is a flowchart showing a method for the receiver 20 to protect a power transmission system from an over-voltage. The method for the receiver 20 to protect the power transmission system from an over-current and an over-temperature is the same as the method for the transmitter 10 to protect the power transmission system from an over-current and an over-temperature shown in FIGS. 80 and 81, and thus will not be described separately.

(Communication Interface in Wireless Power Transmission System)

A communication protocol of a wireless power transmission system according to the present invention is based on IEEE802.15.4 for a sensor network environment. However, since IEEE802.15.4 has unnecessary functions for the wireless power transmission system according to the present invention, the IEEE802.15.4 protocol is modified and redesigned in the present invention. In particular, in the present invention, some of physical layer functions are excluded from IEEE802.15.4 and a link layer is redesigned to be suitable for the wireless transmission system according to the present invention.

Figure 83:
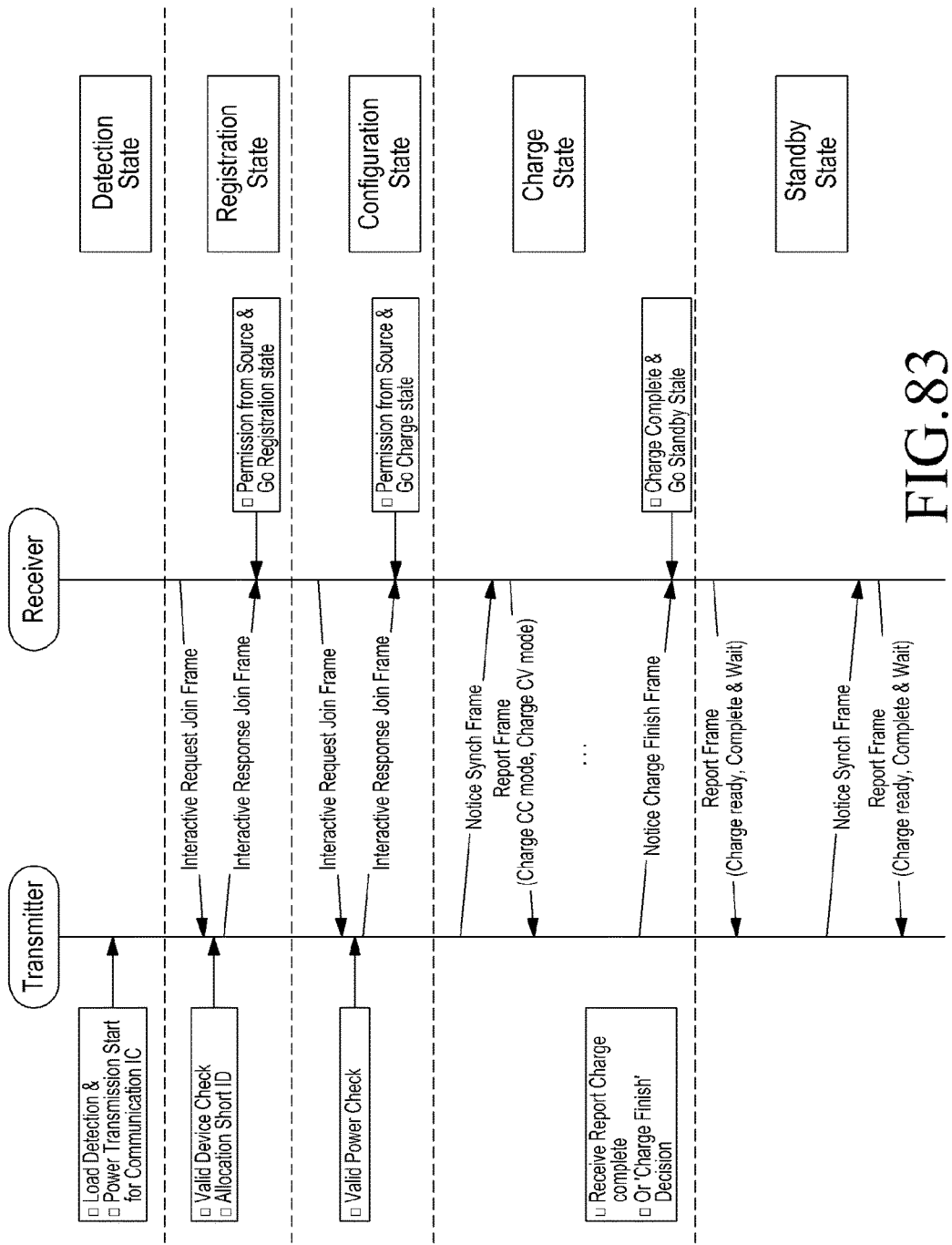
FIG. 83 is a view showing an example of communication between a transmitter and a receiver in a wireless power transmission system according to the present invention.

FIG. 83 is a view showing an example of communication between the transmitter 10 and the receiver 20 in the wireless power transmission system according to the present invention.

Referring to 83, communication between the transmitter 10 and the receiver 20 is performed in the following manner. The transmitter 10 senses a load and sends power for an operation of a communication Integrated Circuit (IC) of the transmitter 10 to the receiver 20 so that the receiver 20 can communicate with the transmitter 10. The receiver 20 sends the Interactive_Request_Join_Frame packet to the transmitter 10 to request registration from the transmitter 10. The transmitter 10 checks if the receiver 20 is a valid device, and if the receiver 20 is a valid device, the transmitter 10 replaces an ID of the receiver 20 included in the Interactive_Request_Join_Frame packet with a short ID, that is, an SID. The transmitter 10 sends the Interactive_Response_Join_Frame packet to the receiver 20 as a response to the Interactive_Request_Join_Frame packet.

The receiver 20 having received the Interactive_Response_Join_Frame packet determines that registration for receiving power from the transmitter 10 is permitted, and enters the configuration state. The receiver 20 sends the Interactive_Request_Charge_Frame packet to the transmitter 10 to request power transmission from the transmitter 10. The transmitter 10 checks a valid power. The transmitter 10 checks the valid power to determine whether the transmitter 10 can send the power requested from the receiver 20 to the receiver 20. In FIG. 83, it is assumed that the transmitter 10 can send the power requested from the receiver 20. The transmitter 10 sends the Interactive_Response_Charge_Frame packet to inform the receiver 20 that the transmitter 10 can send the power requested from the receiver 20. The receiver 20 determines that setting for receiving the power from the transmitter 10 is permitted, and enters the charge state.

Once entering the charge state, the transmitter 10 sends a Notice_Sync_Frame packet for synchronization of the receiver 20 with the transmitter 10. The receiver 20 is synchronized with the transmitter 10 according to the Notice_Sync_Frame packet, and sends a Report_Frame packet about the receiver 20 to the transmitter 10. Thereafter, the receiver 20 enters a charge CC mode in which power is supplied from the transmitter 10, and thus performs battery charging.

Upon completion of charging, the transmitter 10 may receive a Report_Charge_Complete packet from the receiver 20. According to an embodiment, the transmitter 10 may determine charge finish of the receiver 20. If the transmitter 10 determines that power is supplied to the receiver 20 within a predetermined time or predetermined power is supplied to the receiver 20, then the transmitter 10 may determine that charging of the receiver 20 is completed. Upon completion of charging, the transmitter 10 sends a Notice_Charge_Finish_Frame packet to the receiver 20. The receiver 20 recognizes completion of charging, and enters the standby state.

Also in the standby state, the receiver 20 may send the Report_Frame packet to the transmitter 10. If recharging is necessary, the receiver 20 prepares for charging; in the charging-completed state, the receiver 20 may maintain a simple standby state. If recharging is necessary, the transmitter 10 sends the Notice_Sync_Frame packet to the receiver 20 and in response thereto, the receiver 20 may send the Report_Frame packet to the transmitter 10. According to an embodiment, the transmitter 10 may request the user to separate the charging-completed receiver 20 from the interface (e.g., the charging pad) of the transmitter 10.

In the wireless transmission system according to the present invention, preferably, a 2.4 GHz ISM band described in the communication standard IEEE 802.15.4 may be used as a frequency.

The wireless power transmission system according to the present invention may use 16 channels having a frequency of 2.4 GHz defined in IEEE 802.15.4.

In IEEE 802.15.4, Clear Chanel Assessment (CCA) is used to check whether there are some signals in a Carrier Sense Multiple Access-Collision Avoidance (CSMA-CA) channel. CCA is also used for the wireless power transmission system according to the present invention for the same purpose as in the CSMA-CA channel. In the wireless power transmission system according to the present invention, a CSMA-CA algorithm optimized for the wireless power transmission environment will be used.

(Frame Structure of Packets Used in Wireless Power Transmission System)

Figure 84:
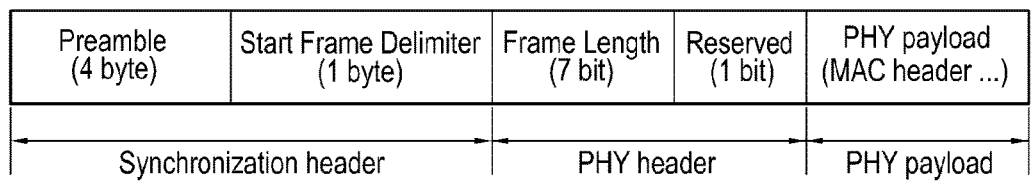
FIG. 84 is a view showing a physical frame structure in a wireless power transmission system according to the present invention.

FIG. 84 is a view showing a physical frame structure in the wireless power transmission system according to the present invention. The physical frame structure according to the present invention may be the same as a physical frame structure of IEEE 802.15.4 as shown in FIG. 84.

Referring to FIG. 84, a 4-byte preamble is a signal for the receivers 20 to be synchronized with the transmitter 10. A synchronization header includes a 4-byte preamble and a 1-byte Start Frame Delimiter (SFD). The 1-byte SFD declares the start of a frame. A PHY header of the frame includes a 7-bit frame length indicating a total length of the frame and a reserved 1 bit. A PHY payload includes a MAC header, etc.

The physical frame structure according to the present invention may be presented such that in the physical frame shown in FIG. 84, the leftmost field is transmitted or received first. All multiple byte fields are transmitted or received least significant octet first and each octet is transmitted or received least significant bit (LSB) first. The same transmission order is also applicable to data fields delivered between PHY and MAC layers. Integer numbers in binary notation and bit patterns are represented using sequences of the digits 0 and 1 enclosed in single quotes (' ').

An MAC frame of the wireless power transmission system according to the present invention is included in the PHY payload and follows the PHY header. FIG. 85 is a view showing an MAC frame structure according to the present invention.

Referring to FIG. 85, a MAC frame consists of MAC Frame Header, Frame Payload, and Checksum. The Checksum field includes a 16-bit ITU-T CRC. The MAC Frame Header field includes a Frame Type field, a Short ID field, and a Sequence Number field. The Frame Type field is used to distinguish a frame included in Frame payload, and the Short ID field is used as a receiver object address or transmitter address according to the frame class.

The 3 bit Frame Type field is defined as Table 18.

TABLE 18

| Frame Type | |
|---|---|
| Bits (0-2) | Description |
| 000 | Notice |
| 001 | Report |
| 010 | ACK |
| 011 | Interactive |
| 100~111 | Reserved |

The Frame Type field is assigned '000' for Notice_Frame. The Notice_Frame packet is used when there is a notice from the transmitter 10 to the receiver 20. The Notice_Frame packet is periodically transmitted and foremost positioned in the time slot duration. The Frame Type field is assigned '001' for the Report_Frame packet. The Report_Frame packet is used when the receiver 20 periodically transmits its information to the transmitter 10. The Report_Frame packet is periodically transmitted in the assigned time slot for each receiver 20 after the Notice_Frame frame is received. The Frame Type field is assigned '010' for the ACK_Frame packet. The ACK_Frame packet is used when the device having received the given frame confirms that it is properly received. The Frame Type field is assigned '011' for the Interactive_Frame packet. The Interactive_Frame packet is used when there is a request for the opponent device (transmitter 10 or receiver 20) to provide some information, rather than when the opponent device provides unidirectional information such as the Notice_Frame or Report_Frame packet.

The 4-bit Short ID is as defined in Table 19.

TABLE 19

| Short ID | |
|---|---|
| Bits (3-6) | Description |
| 0000 | For Targets (No ID) |
| 0001~1110 | Allocated ID for Targets |
| 1111 | All Targets |

Referring to Table 19, ID '0000' is an ID used by receivers not assigned an SID from the transmitter 10. These receivers 20 request 'join' to the transmitter 10 by using address '0000' as the Request_Join_Frame packet. Addresses '0001' to '1110' are available addresses for assignment of the transmitter 10 to the receivers 20. Address '1111' is a broadcasting address that the transmitter 10 transmits to all receivers 20.

The Notice_Frame packet has a function to keep a network alive through synchronization with receivers and to manage receivers. FIG. 86 is a view showing a structure of the Notice_Frame packet according to the present invention.

The Notice_Frame packet is a message to be sent only by the transmitter 10. Thus, a 4-bit length Short ID field is filled with addresses of the receivers 20 in the MAC Frame header. 3 bit Notice Type field shows the class of Notice_Frame. A 3-bit Notice Info field has different information according to the value of the Notice Type field. Table 20 defines a value of Notice Type and corresponding information to be included in Notice Info.

TABLE 20

| Sub Frame | Bit(0-2) | Bit(3) | Bits(4-7) |
|---|---|---|---|
| | Notice Type Value | Reserved | Notice Info |
| Synch | 000 | Reserved | Slot Number |
| Reset | 001 | Reserved | Reset Reason |
| Power-off | 010 | Reserved | Power Off Reason |
| Chnage Short ID | 011 | Reserved | Change ID |
| Charge Start | 100 | Reserved | Reserved |
| Charge Finish | 101 | Reserved | Reserved |
| Reserved | 110-111 | — | — |

When the value of the Notice_Type field is '0000', the Notice_Info field is filled with a value of Slot Number. Slot Number means the number of time slots managed by the transmitter 10. When the receiver 20 whose ID is not assigned receives Notice_Synch_Frame, it can know the length of a slot duration in the network by checking the value of Slot Number. Thus, the receiver 20 avoids Slot Duration and transmits the Interactive_Request_Join_Frame packet to the transmitter 10. When the value of the Notice_Type field is '001', the Notice_Info field is filled with the value of Reset Reason. The meaning of Reset Reason is defined as in Table 21.

TABLE 21

| Reset Reason | |
|---|---|
| Bits(4-7) | Description |
| 0000 | Unknown |
| 0001 | Abnormal Object Dection |
| 0010 | ID Error |
| 0011 | Power Info Error |
| 0100 | Schedule Error |
| 0101-1111 | Reserved |

When the value of the Notice Type field is '010', the Notice Info field is filled with the value of Power off Reason. The meaning of Power off Reason is defined as in Table 22. When the value of the Notice Type field is '011', the Notice Info field is filled with the value of a Short ID to be changed. When the value of the Notice Type field is '100' or '101', the Notice Info field is filled zero as Reserved. When the value of the Notice Type field is '100', it is used to notice the receiver 20 having a Receiver Short ID address in the MAC Frame header to start charging. When the value of the Notice Type field is '101', it is used to notice the receiver 20 having a Receiver Short ID address in the MAC Frame header to end charging.

TABLE 22

| Power off Reason | |
|---|---|
| Bits (4-7) | Description |
| 0000 | Unknown |
| 0001 | Abnormal Object Dection |
| 0010 | Internal Error |
| 0011 | Power Info Error |
| 0100-1111 | Reserved |

The Report_Frame packet is used when the receiver 20 periodically transmits its own information to the transmitter 10. FIG. 87 is a view showing a structure of the Report_Frame packet according to the present invention.

The Report_Frame packet is a message used by only the receivers 20 joining the network. Thus, a 4-bit length Short ID field is filled with the address of the receiver 20 itself in order that the transmitter 10 having received the Report_Frame packet knows which receiver 20 transmits the Report_ Frame packet. The Charge Status field is of a 3-bit length and shows the information of the charge status. The Charge Status field is defined as in Table 23.

TABLE 23

Charge Status

| Bits (0-2) | Description |
| --- | --- |
| 000 | Standby |
| 001 | Charging CC mode |
| 010 | Charging CV mode |
| 011 | Complete & Standby |
| 100 | Error |
| 101-111 | Reserved |

The Charge Status field includes information of the charge status of the receiver 20 itself. There are 5 kinds of charge statuses of the receiver 20 which keeps communicating with the transmitter 10 as defined in Table 23. The Standby status is the status where the receiver 20 stands by for charging while charging is not completed. For example, it is the case that the transmitter 10 can't charge the receiver 20 but keeps communication with the receiver 20 and stands by for charging because the transmitter is charging other receivers 20.

The Charging CC mode is the status that the current and the voltage are kept at a regular level during charging. The Charging CV mode is the status that the voltage is kept at the regular level but the current decreases during charging. The Complete and Standby mode is a status in which charging is completed but communication is kept alive after charging is completed.

Error is the status that the receiver 20 detects an error by itself and stops charging. The transmitter 10 having received the Report_Error_Frame packet whose Charge Status field is set to Error stops supplying power to the receiver 20 transmitting Report_Error_Frame. The Reason field is of a 4-bit length and used only when the Charge Status field is set to Error. The Reason field includes the reason why the receiver 20 regards the status as Error by itself. Table 24 defines Reason.

TABLE 24

Reason

| Bits (3-6) | Description |
| --- | --- |
| 0000 | Unknown |
| 0001 | Internal Fault |
| 0010 | Over Voltage |
| 0011 | Over Current |
| 0100 | Over Temperature |
| 0101 | Battery Error |
| 0101 | Reserved |

The Power Info field includes the power information of the receiver 20, and is 2 bytes or 4 bytes according to the value of the Charge Status field. When the Charge Status field is Charge Standby '000' or Complete and Standby '011', the receiver 20 is in the standby state that the receiver 20 is not charged, thus the Power Info field has a 1-byte required voltage value and a 1-byte required current value. When the Charge Status field is Charging CC mode '001' or Charging CV mode '010', it is in the charge State that the receiver 20 is being charged, thus the Power Info field has a 1-byte input voltage value and a 1-byte input current value as well as a 1-byte required voltage value and a 1-byte required current value. When the Charge Status field is Error, the receiver 20 has to stop charging, and thus the Power Info field is omitted.

Figure 88:
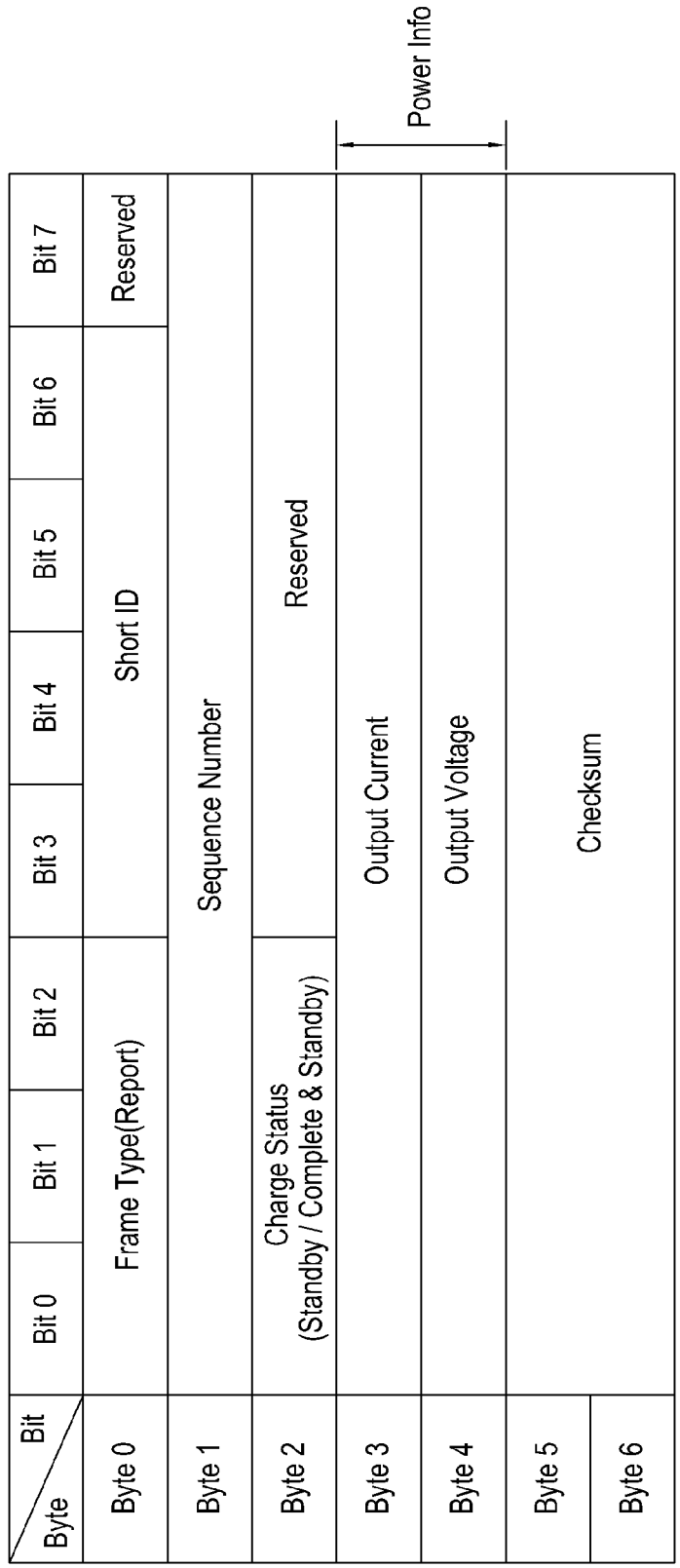
FIG. 88 is a view showing a structure of a packet Report_Frame in a standby state.
Figure 89:
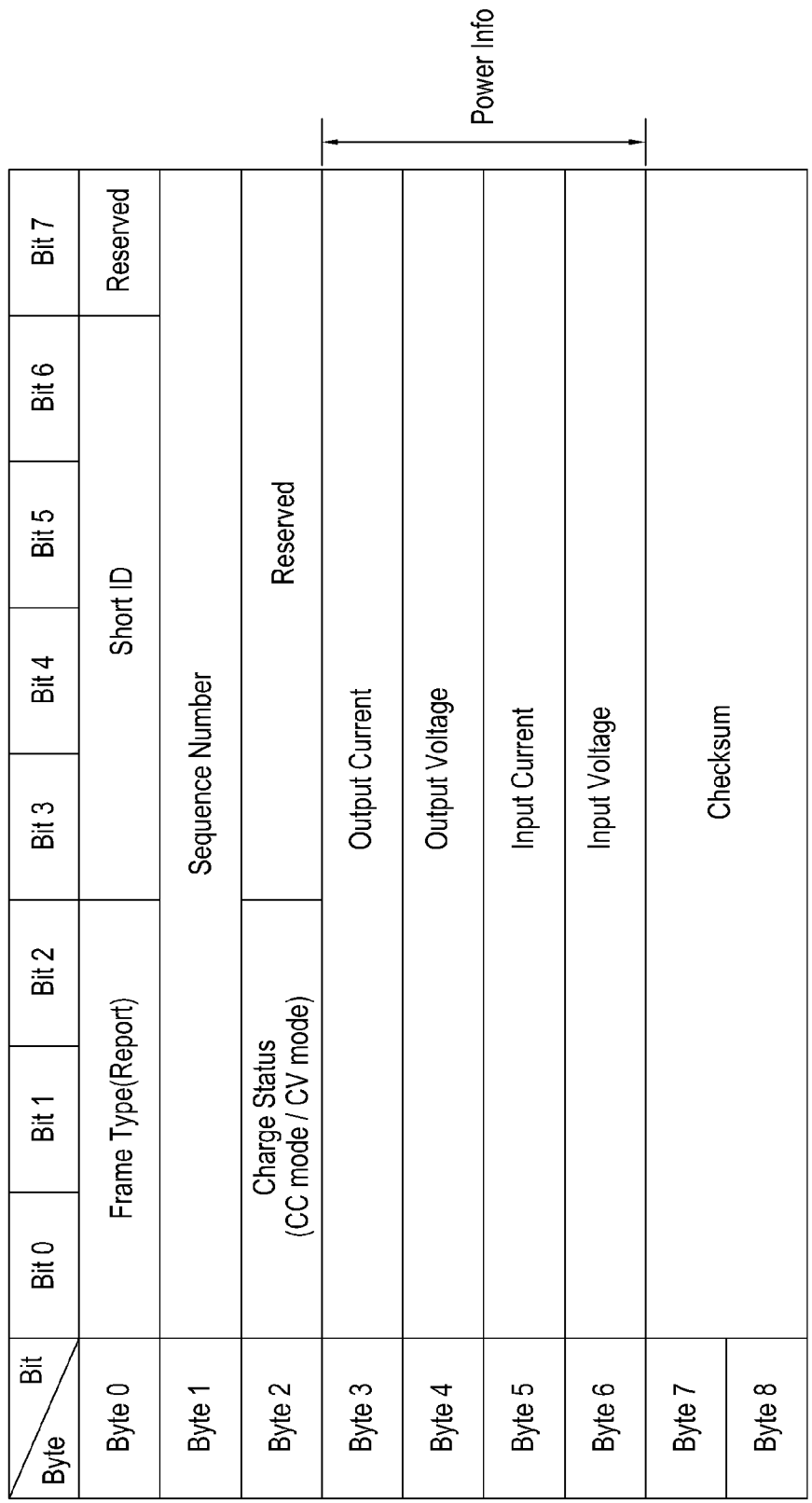
FIG. 89 is a view showing a structure of a packet Report_Frame in a charge state.

FIG. 88 is a view showing a structure of the Report_Frame packet in the standby state, FIG. 89 is a view showing a structure of the Report_Frame packet in the charge state, and FIG. 90 is a view showing a structure of the Report_Frame packet in the error state.

The ACK_Frame packet includes a MAC frame header and Checksum. FIG. 91 is a view showing a structure of the ACK_Frame packet according to the present invention.

The Interactive_Frame packet is used when the transmitter 10 and the receiver 20 exchange information each other. The Interactive_Frame packet may also be used within contention periods. When the receiver 20 transmits the Interactive_Frame packet to the transmitter 10, a 4-bit length Short ID field in the MAC Frame header is filled with the address of the receiver 20 itself. When the transmitter 10 transmits the Interactive_Frame packet to the receiver 20, a 4-bit length Short ID field in the MAC Frame header is filled with the address of the receiving receiver 20.

FIG. 92 is a view showing a general structure of the Interactive_Frame packet according to the present invention. The Interactive Type field is of a 3-bit length and defines the type of the Interactive_Frame packet. Details are defined as in Table 25. The Interactive_Frame packet has various frame structures according to the value of the Interactive Type field.

TABLE 25

Interactive Type

| Bits (0-2) | Description |
| --- | --- |
| 000 | Request Join Network |
| 001 | Response Join Network |
| 010 | Request Charge |
| 011 | Response Charge |
| 100-111 | Reserved |

Referring to Table 25, when the value of the Interactive Type field is '000', the Interactive_Frame packet is a packet Interactive_Request_Join_Frame. The Interactive_Request_Join_Frame packet is used when the receiver 20 asks the transmitter 10 to join it in wireless charging networks.

FIG. 93 is a view showing a structure of a packet Interactive_Request_Join_Frame according to the present invention. The Interactive_Request_Join_Frame packet is transmitted to the transmitter 10 by the receiver 20 which can't be assigned a Short ID, so that the Short ID field is set to '0000' for transmission. The ID Size Type field is of a 2-bit length and shows the length of the ID field. Table 26 defines the value of the ID Size Type.

TABLE 26

ID Size Type

| Bits (3-4) | Description |
| --- | --- |
| 00 | 4 Byte |
| 01 | 8 Byte |
| 10 | 12 Byte |
| 11 | Reserved |

The receiver 20 fills its own load properties in the 1 Byte Load Characteristic field. The ID field is filled with a unique receiver ID. The transmitter 10 having received the value of the ID field maps and manages the values of the ID field, a short ID assigned by itself, and other management parameters for the receivers 20 in its memory.

When the value of the Interactive Type field is 001, the Interactive_Frame packet is a packet Interactive_Response_Join_Frame. The Interactive_Response_Join_Frame packet is used when the transmitter 10 having received the Interactive_Request_Join_Frame packet sends the receiver 20 whether the receiver 20 joins wireless charging networks.

FIG. 94 is a view showing a structure of a packet Interactive_Response_Join_Frame according to the present invention. The Interactive_Response_Join_Frame packet is sent to the receiver 20 which is not assigned a Short ID by the transmitter 10, such that the Short ID field is set to '0000' for transmission. The 1 bit Permission field shows whether the transmitter 10 permits the receiver 20 to join networks. If this field is set to '0', permission is denied; while if the field is set to '1', permission is accepted. The Allocated Short ID field is of a 4-bit length and includes the address that the transmitter 10 assigns to the receiver 20. If the Permission field is set to '0', the Allocated Short ID is blank to be set to '0000'. The Short ID means Slot Number also.

For example, it is assumed that one receiver 20 is assigned Short ID of '0011' and Slot Time of 5 ms. This receiver 20 transmits Report_Frame after receiving Notice_Frame and waiting 10 ms as in Equation 23.

$$(\text{Slot\_number}(3)-1) \times \text{Slot\_time}(5 \text{ ms}) = 10 \text{ ms} \tag{23}$$

When the value of the Interactive Type field is '010', the Interactive_Frame packet is a packet Interactive_Request_Charge_Frame. The Interactive_Request_Charge_Frame packet is the frame which is sent by the receiver 20 having received a packet Interactive_Response_Join_Frame or Notice_Charge Start. The Interactive_Request_Charge_Frame packet includes the charging properties of the receiver 20 and is transmitted to the transmitter 10 to request charging. FIG. 95 is a view showing a structure of a packet Interactive_Request_Charge_Frame according to the present invention. Power Characteristic is of a 3-byte length and includes the reference current, the reference voltage, and the reference efficiency of the receiver.

When the value of the Interactive Type field is '011', the Interactive_Frame packet is a packet Interactive_Response_Charge_Frame. The Interactive_Response_Charge_Frame packet is the frame which is sent by the transmitter 10 having received the Interactive_Request_Charge_Frame packet. The transmitter 10 informs the receiver 20 by this frame whether charging is permitted. FIG. 96 is a view showing a structure of a packet Interactive_Response_Charge_Frame according to the present invention.

If a 1 bit Permission field is set to '0', charging is not permitted; if it is set to '1', charging is permitted. The Reason field is of a 3-bit length and includes the reason for charging permission or prohibition. Table 27 defines the value of the Reason field.

TABLE 27

| Bits (4-6) | Reason Description |
|---|---|
| 000 | Permission |
| 001 | Over Node |
| 010 | Over Power |
| 011-111 | Reserved |

Figure 97:
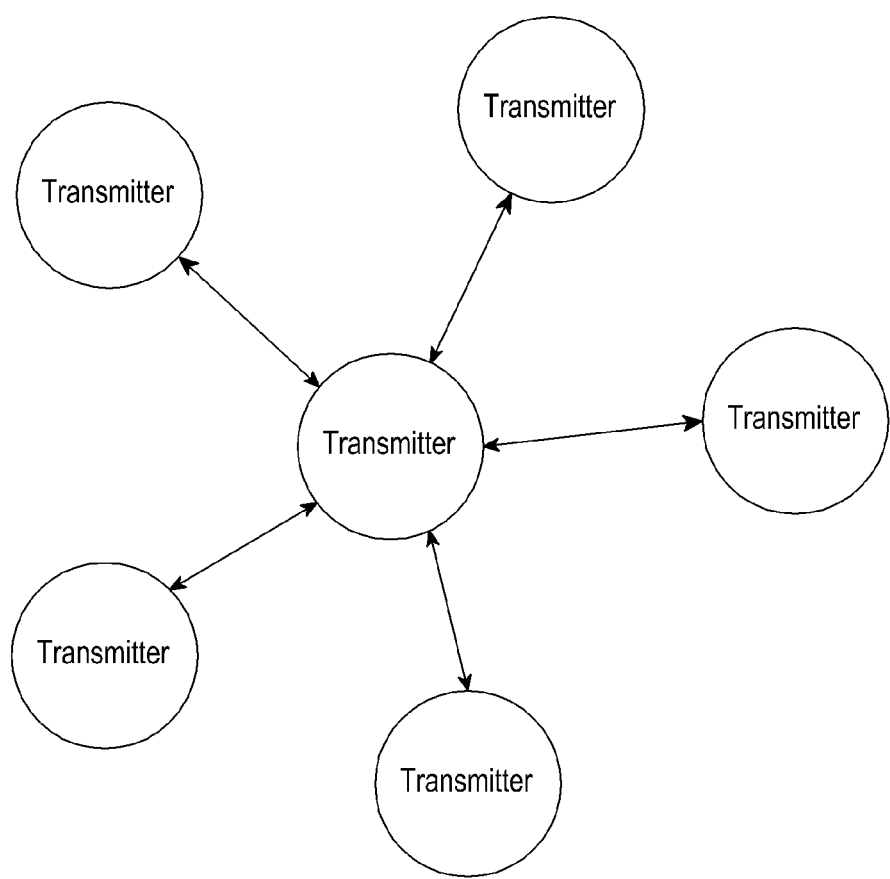
FIG. 97 is a view showing a star topology in a wireless power transmission system according to the present invention.

The network of the wireless power transmission system according to the present invention includes the transmitter 10 supplying the power and the single receiver or multiple receivers receiving the power. The transmitter 10, by the Report_Frame packet, collects the information of the receivers, decides the required power, and supplies the power to the receivers 20. The receivers 20, by the Notice_Frame packet, periodically transmit their information to the transmitter 10 and periodically receive the information for the synchronization and the network management from the transmitter 10. For these characteristics of traffic, a star topology is desirable for networks of the wireless power transmission system according to the present invention. FIG. 97 is a view showing the star topology in the wireless power transmission system according to the present invention.

According to the present invention, a transmitter and a receiver in a wireless power transmission system having high resonance characteristics and a wireless power transmission and reception method for these devices can be provided.

While a detailed embodiment of the present invention has been described, various modifications can be carried out without departing from the scope of the present invention. Therefore, the scope of the invention is not defined by the foregoing embodiment of the invention, but should be defined by claims and equivalents thereof.

What is claimed is:

1. A method of a transmitter, the method comprising:
   transmitting a detection power;
   detecting a variation of a load impedance, the variation being greater than a predetermined value;
   receiving, from a receiver, a first signal including an identifier and a load characteristic of the receiver, the load characteristic including load information indicating the variation of the load impedance;
   transmitting, to the receiver, a first response to form a communication connection with the receiver based on the first signal;
   receiving, from the receiver, a second signal including required power information of the receiver;
   determining whether power is available to the receiver based on the required power information; and
   transmitting, to the receiver, a second response including permission information indicating a standby mode or a charging mode based on a result of the determining.

2. The method of claim 1, wherein detecting the variation of the load impedance further comprises:
   monitoring the variation of the load impedance; and
   if the variation of the load impedance is detected, determining that the receiver is detected.

3. The method of claim 2, wherein transmitting the first response to form the communication connection with the receiver based on the first signal comprises:
   supplying first power larger than the detection power to the receiver.

4. The method of claim 1, wherein the second signal further includes at least one of a voltage, a current, a state of the receiver, and a temperature of the receiver.

5. The method of claim 1, further comprising:
   transmitting, to the receiver, the power for charging the receiver; and
   if a message for notifying completion of charging is received from the receiver, completing transmission of the power for charging the receiver.

6. The method of claim 1, further comprising:
   transmitting, to the receiver, the power for charging the receiver; and if a message for notifying an occurrence of an error is received from the receiver, terminating transmission of the power for charging the receiver.

7. The method of claim 6, wherein the error includes at least one of over current, over voltage, and over temperature.

8. A transmitter for transmitting wireless power to a receiver, comprising:
a communication interface for:
receiving, from a receiver, a first signal including an identifier and a load characteristic of the receiver, the load characteristic including load information indicating the variation of the load impedance, and
receiving, from the receiver, a second signal including required power information by the receiver;
a resonator;
a power supply; and
a processor configured to:
control the power supply to transmit a detection power through the resonator,
detect a variation of a load impedance, the variation being greater than a predetermined value,
control the communication interface unit to transmit, to the receiver, a first response to form a communication connection with the receiver based on the first signal,
determine whether power is available to the receiver based on the power information, and
control the communication interface to transmit, to the receiver, a second response including permission information indicating a standby mode or a changing mode based on a result of the determination.

9. The transmitter of claim 8, wherein the processor is further configured to:
monitor the variation of the load impedance, and
if the variation of the load impedance is detected, determine that the receiver is detected.

10. The transmitter of claim 9, wherein the processor is further configured to:
control the resonator to supply first power larger than the detection power to the receiver.

11. The transmitter of claim 8, wherein the second signal further includes at least one of a voltage, a current, a state of the receiver, and a temperature of the receiver.

12. The transmitter of claim 8, wherein the processor is further configured to:
control the resonator to transmit, to the receiver, the power for charging the receiver, and
if a message for notifying completion of charging is received from the receiver, complete transmission of the power for charging the receiver.

13. The transmitter of claim 8, wherein the processor is further configured to:
control the resonator to transmit, to the receiver, the power for charging the receiver, and
if a message for notifying an occurrence of an error is received, terminate transmission of the power for charging the receiver.

* * * * *